United States Patent
Rice, III

(10) Patent No.: US 7,424,543 B2
(45) Date of Patent: Sep. 9, 2008

(54) SYSTEM AND METHOD OF PERMISSIVE DATA FLOW AND APPLICATION TRANSFER

(76) Inventor: James L. Rice, III, 2208 W. 21st St., Minneapolis, MN (US) 55405

( * ) Notice: Subject to any disclaimer, the term of this patent is extended or adjusted under 35 U.S.C. 154(b) by 1134 days.

(21) Appl. No.: 09/866,454

(22) Filed: May 25, 2001

(65) Prior Publication Data

US 2002/0174010 A1  Nov. 21, 2002

(51) Int. Cl.
G06F 15/16  (2006.01)
(52) U.S. Cl. ............... 709/229; 715/744; 348/734
(58) Field of Classification Search .......... 709/206, 709/226, 218, 203, 205, 225, 217–220, 231, 709/246, 227, 223; 713/201, 184; 379/88, 379/265, 93; 455/515, 419; 715/744, 760; 707/2, 103
See application file for complete search history.

(56) References Cited

U.S. PATENT DOCUMENTS

| | | | |
|---|---|---|---|
| 5,757,925 A * | 5/1998 | Faybishenko ............... 709/203 |
| 5,761,485 A | 6/1998 | Munyan |
| 5,793,966 A * | 8/1998 | Amstein et al. ............. 709/203 |
| 5,819,092 A | 10/1998 | Ferguson et al. |
| 5,823,879 A * | 10/1998 | Goldberg et al. ............. 463/42 |
| 5,854,897 A | 12/1998 | Radziewicz et al. |
| 5,864,676 A * | 1/1999 | Beer et al. .................. 709/229 |
| 5,905,866 A * | 5/1999 | Nakabayashi et al. ....... 709/223 |
| 5,914,713 A | 6/1999 | Nario et al. |
| 5,923,736 A * | 7/1999 | Shachar ................... 379/93.17 |
| 5,946,684 A | 8/1999 | Lund |
| 5,950,172 A | 9/1999 | Klingman |
| 5,983,004 A * | 11/1999 | Shaw et al. ................. 709/227 |
| 6,005,568 A * | 12/1999 | Simonoff et al. ............. 715/744 |
| 6,012,067 A * | 1/2000 | Sarkar ..................... 707/103 R |
| 6,037,934 A * | 3/2000 | Himmel et al. ............. 715/760 |
| 6,052,730 A * | 4/2000 | Felciano et al. ............. 709/225 |
| 6,076,166 A * | 6/2000 | Moshfeghi et al. ............. 726/4 |
| 6,125,383 A * | 9/2000 | Glynias et al. .............. 709/202 |
| 6,181,781 B1 * | 1/2001 | Porter et al. ............. 379/88.17 |
| 6,192,407 B1 | 2/2001 | Smith et al. |
| 6,195,694 B1 * | 2/2001 | Chen et al. .................. 709/220 |

(Continued)

OTHER PUBLICATIONS

CCI-Based Web Security: A Design Using PGP; www.w3.org/Conferences/WWW4/Papers2/245.html.*

(Continued)

Primary Examiner—Thong Vu

(57) ABSTRACT

A computer system and computer control software is provided which allows for secure document delivery between remote parties, and control by the sender of the further distribution and handling by the recipient of an electronic document or other computer file. A file in an application may be stored on a server and manipulated by the file's native application. The recipient of the file information is given preferably automatic operation to view the user output of the server application, via a thin-client system. The recipient of the file is thus limited, as dictated by the sender, as to the operations it can perform on the document via the server application. Files attached to electronic messages may also be removed and stored on a server, thus eliminating any possible effect on the recipient machine by the computer file. Also provided for is an adaptable thin-client system which adapts to local environmental and use conditions to provide the correct degree of thin-client or local application reliance.

64 Claims, 49 Drawing Sheets

U.S. PATENT DOCUMENTS

| | | | |
|---|---|---|---|
| 6,199,099 B1 * | 3/2001 | Gershman et al. | 709/203 |
| 6,211,871 B1 * | 4/2001 | Himmel et al. | 715/744 |
| 6,219,694 B1 * | 4/2001 | Lazaridis et al. | 709/206 |
| 6,223,213 B1 * | 4/2001 | Cleron et al. | 709/206 |
| 6,226,642 B1 * | 5/2001 | Beranek et al. | 707/10 |
| 6,256,620 B1 * | 7/2001 | Jawahar et al. | 707/2 |
| 6,295,551 B1 * | 9/2001 | Roberts et al. | 709/205 |
| 6,304,898 B1 * | 10/2001 | Shiigi | 709/206 |
| 6,324,568 B1 * | 11/2001 | Diec | 709/203 |
| 6,351,777 B1 * | 2/2002 | Simonoff | 709/250 |
| 6,359,892 B1 * | 3/2002 | Szlam | 370/401 |
| 6,360,138 B1 * | 3/2002 | Coppola et al. | 700/231 |
| 6,411,685 B1 * | 6/2002 | O'Neal | 379/88.14 |
| 6,421,781 B1 * | 7/2002 | Fox et al. | 713/201 |
| 6,437,836 B1 * | 8/2002 | Huang et al. | 348/734 |
| 6,463,463 B1 * | 10/2002 | Godfrey et al. | 709/206 |
| 6,480,901 B1 * | 11/2002 | Weber et al. | 709/246 |
| 6,542,740 B1 * | 4/2003 | Olgaard et al. | 455/515 |
| 6,553,410 B2 * | 4/2003 | Kikinis | 709/218 |
| 6,587,684 B1 * | 7/2003 | Hsu et al. | 455/419 |
| 6,618,752 B1 * | 9/2003 | Moore et al. | 709/217 |
| 6,629,143 B1 * | 9/2003 | Pang | 709/226 |
| 6,654,784 B1 * | 11/2003 | Wei | 709/203 |
| 6,711,682 B1 * | 3/2004 | Capps | 713/184 |
| 6,744,877 B1 * | 6/2004 | Edwards | 379/265.02 |
| 6,857,008 B1 * | 2/2005 | Shenefiel | 709/219 |
| 2002/0135678 A1 * | 9/2002 | Bacus et al. | 348/143 |
| 2003/0191877 A1 * | 10/2003 | Zaudtke et al. | 710/72 |
| 2005/0044486 A1 * | 2/2005 | Kotler et al. | 715/503 |
| 2005/0235031 A1 * | 10/2005 | Schneider et al. | 709/203 |
| 2006/0031550 A1 * | 2/2006 | Janik et al. | 709/231 |

OTHER PUBLICATIONS

INFORMATION; www.ftc.gov/bcp/conline/pubs/buspubs/dotcom/index.pdf.*

Supporting Ongoing User Involvement in Development via Expectation-Driven Event Monitoring www.ics.uci.edu/~dhilbert/papers/EDEM-UCI-ICS-97-19.pdf.*

Experience With Top Gun Wingman: A Proxy-Based . . . —Fox, Goldberg . . . (1998); now.cs.berkeley.edu/~gribble/papers/wingman.ps.gz.*

Transformation Proxy Support for Thin-Clients—Parris, Dennis ;www.cs.berkeley.edu/~xjam/metaserver.ps.gz.*

The Thinnest Of Clients: Controlling It All Via Cellphone—Stajano, Jones (1998); ftp.orl.co.uk/pub/docs/ORL/tr.98.3.ps.Z.*

Virtual Network Computing—Richardson, Stafford-Fraser, Wood . . . (1998) ; www.uk.research.att.com/pub/docs/att/tr.98.1.pdf.*

Neoware Systems, Inc., Neoware System Administrator Guide, netOS Setup Application, 1998.

* cited by examiner

| APPLINK PROPERTIES |
| --- |

Business Plan.doc AppLink #3

Applink name. You may want to rename the Applink to something meaningful if you receive email notice of its use.

⊙ This Applink is Active
○ This Applink is Inactive. Check to Activate.

URL: http://freedesk.com/al/85R55d444ABC567k3344

| ACCESS PERMISSIONS |
| --- |

156 — ⊙ Full:         Recipient can download the file.
    ○ Limited:     Recipient cannot download the file.

Note: If recipient is behind a firewall, port 3144 must be open. If it is not recipient will have no way to access the file, unless given the ability to download the file through "Full" permissions.

158

153 — ☐ Access will require a password: [ no password is currently required ]

Note: Password should be sent separately to the intended recipient.

Number of Accesses   ⊙ Unlimited
155 — ○ Limited to this number of total accesses: [0]

| DURATION |
| --- |

⊙ Unlimited
154 — ○ From: Day [12▼] Month [January▼] Year [2000▼]
      Until: Day [12▼] Month [January▼] Year [2000▼]

| NOTIFICATION OF USE |
| --- |

When the Applink is accessed, send me an email notification.
⊙ Yes
○ No

| RECIPIENT'S WEB PAGE |
| --- |

The recipient will view an introductory web page before accessing this AppLink. The page will include:

☑ Document Details    Comments to include in the recipient's web page:
☑ Sender's Name
☑ Sender's Email

[ OK ]    [ CANCEL ]

Fig. 6

| BUSINESSPLAN.DOC APPLICATION INTERFACE | | |
|---|---|---|
| FILE USAGE: | PRESENTED TO APPLICATION AS THIS USER: | INTERFACE REQUIREMENTS: |
| APPLINK FILE TO CAPITALCO. | APPLINK_CAPITALCO | VIEW AND WINDOW MENU ONLY. STANDARD TOOLBAR ONLY, WITH VIEW COMMANDS ONLY |
| FILESHARING WITH USER A | FILESHARE_USERA | ALL MENUS AND TOOLBARS |
| FILESHARING WITH USER B | FILESHARE_USERB | ALL MENUS AND TOOLBARS EXCEPT THE FILE MENU |

610

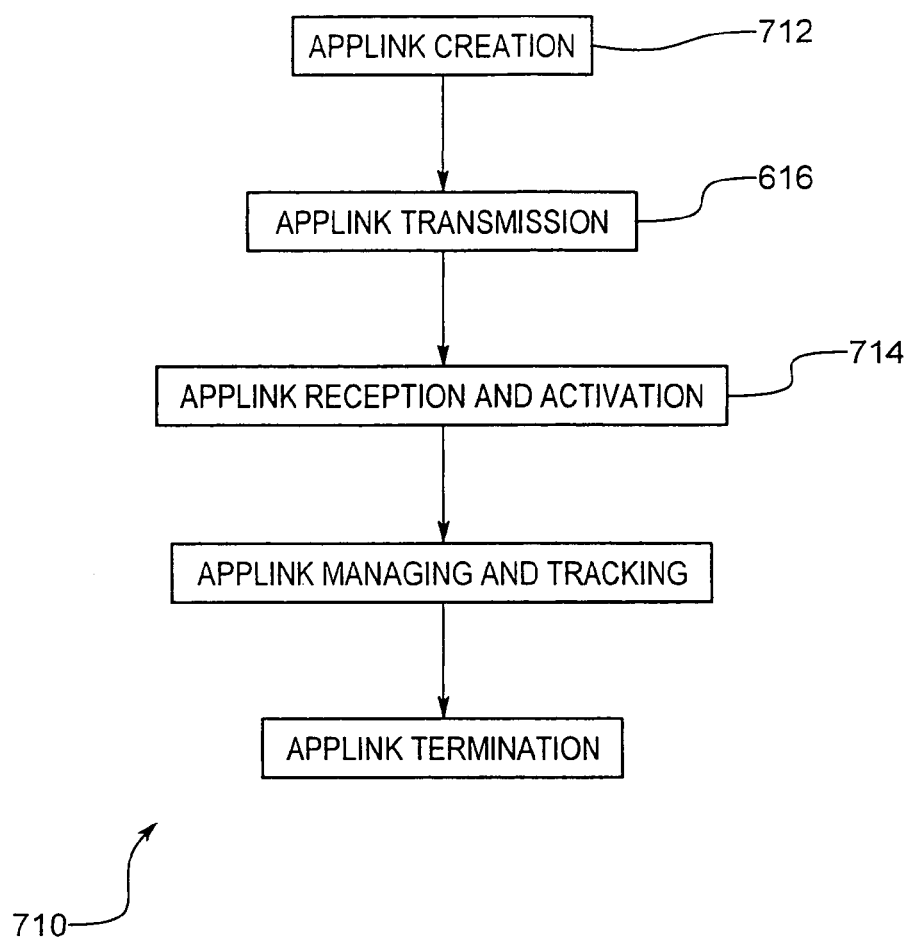

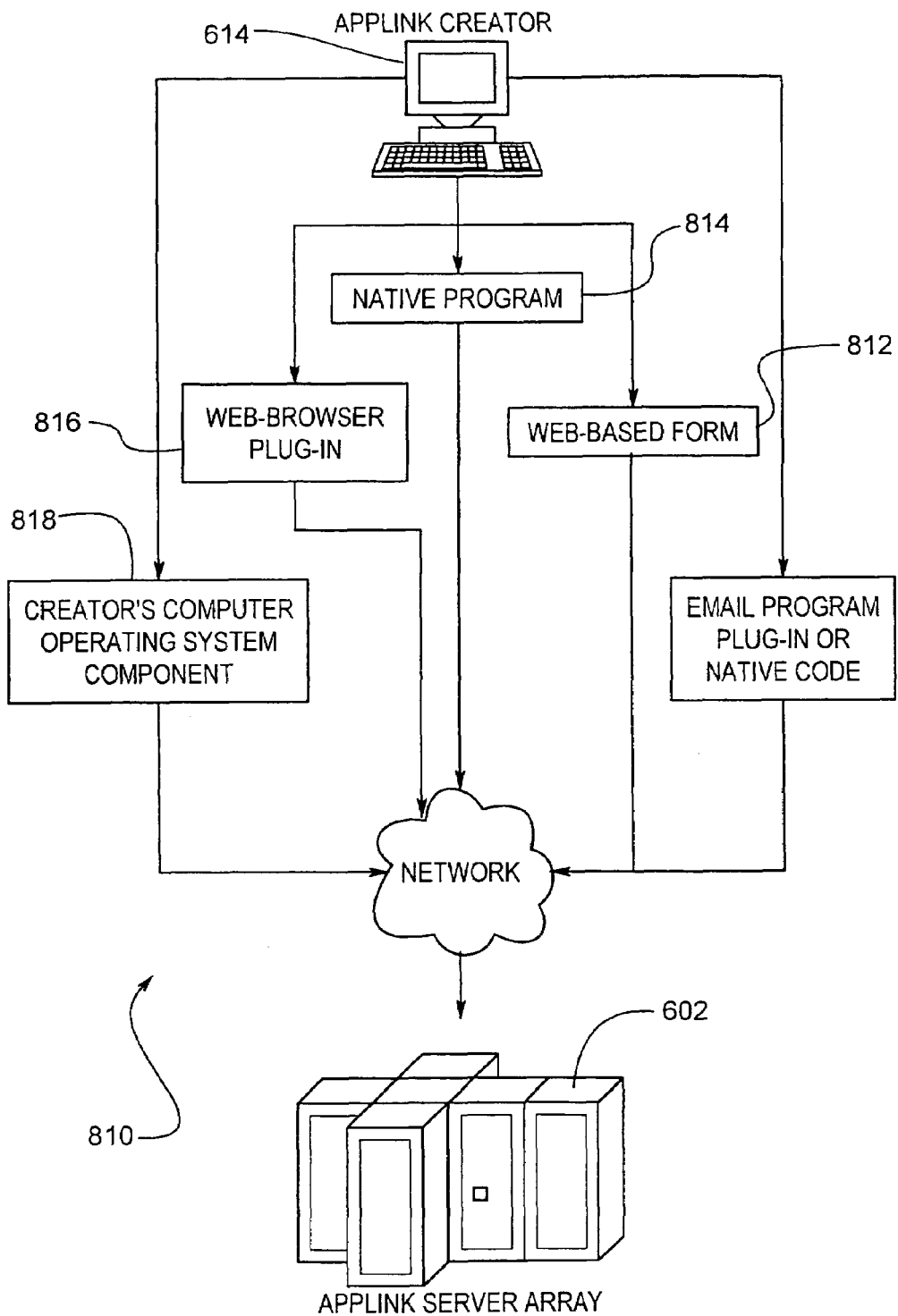

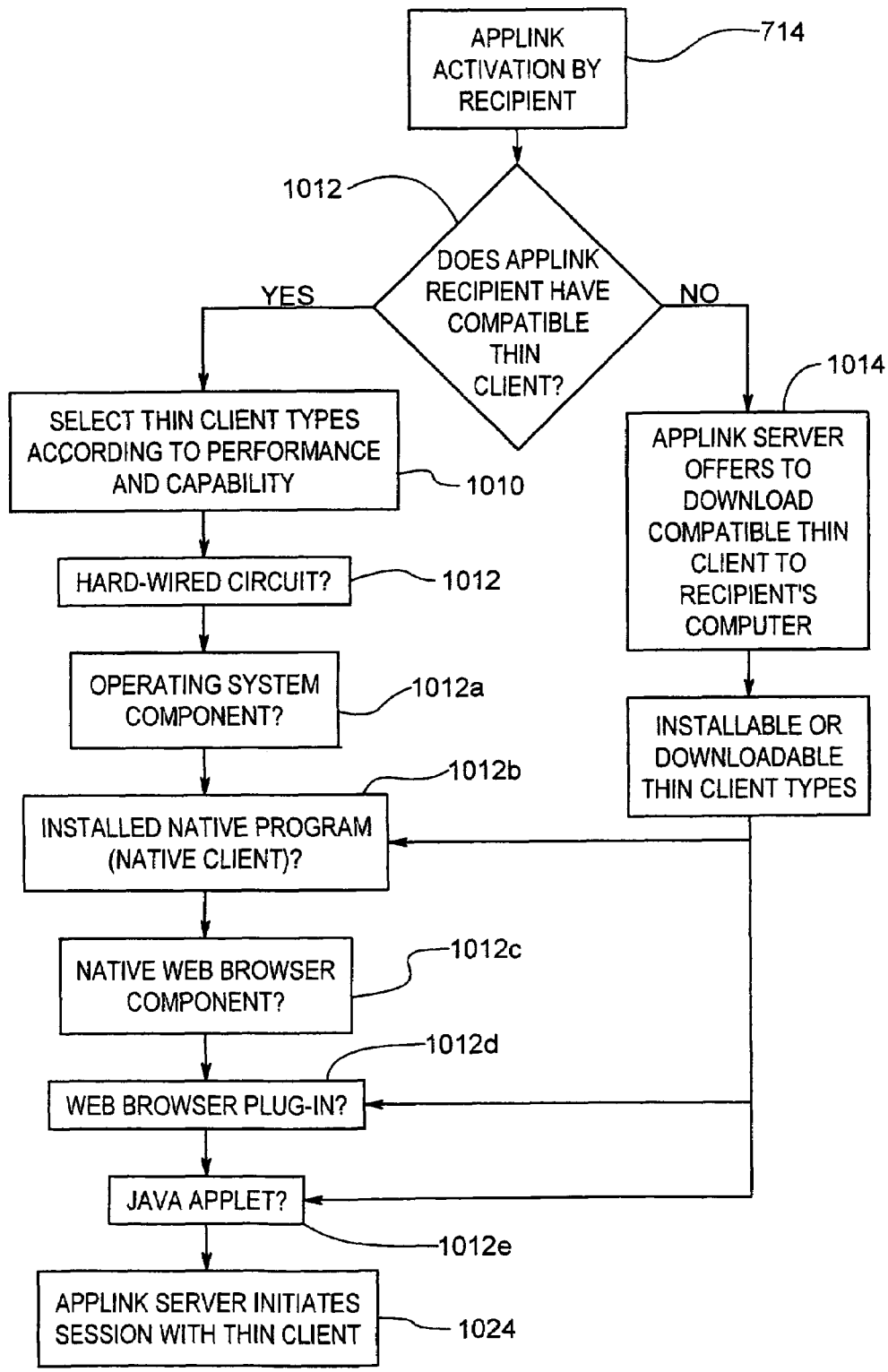

| FREE DESK | | | HELP  LOGOUT |
|---|---|---|---|

List of your AppLinks

To see and edit an Applink's properties, click on the AppLink name.

To delete an AppLink, click check box.

| AppLink Name | File | Status |
|---|---|---|
| ☐ Business Plan Three - AppLink to CapitalMax | Bizplan3.doc | ☑ Active |
| ☐ Annual Report Draft | Report2001.doc | ☑ Active |
| ☐ English Patient II - The Payback! (script for review) | Script.doc | ☐ Active |

[ DELETE CHECKED LINKS ]   [ OK ]   [ CANCEL ]

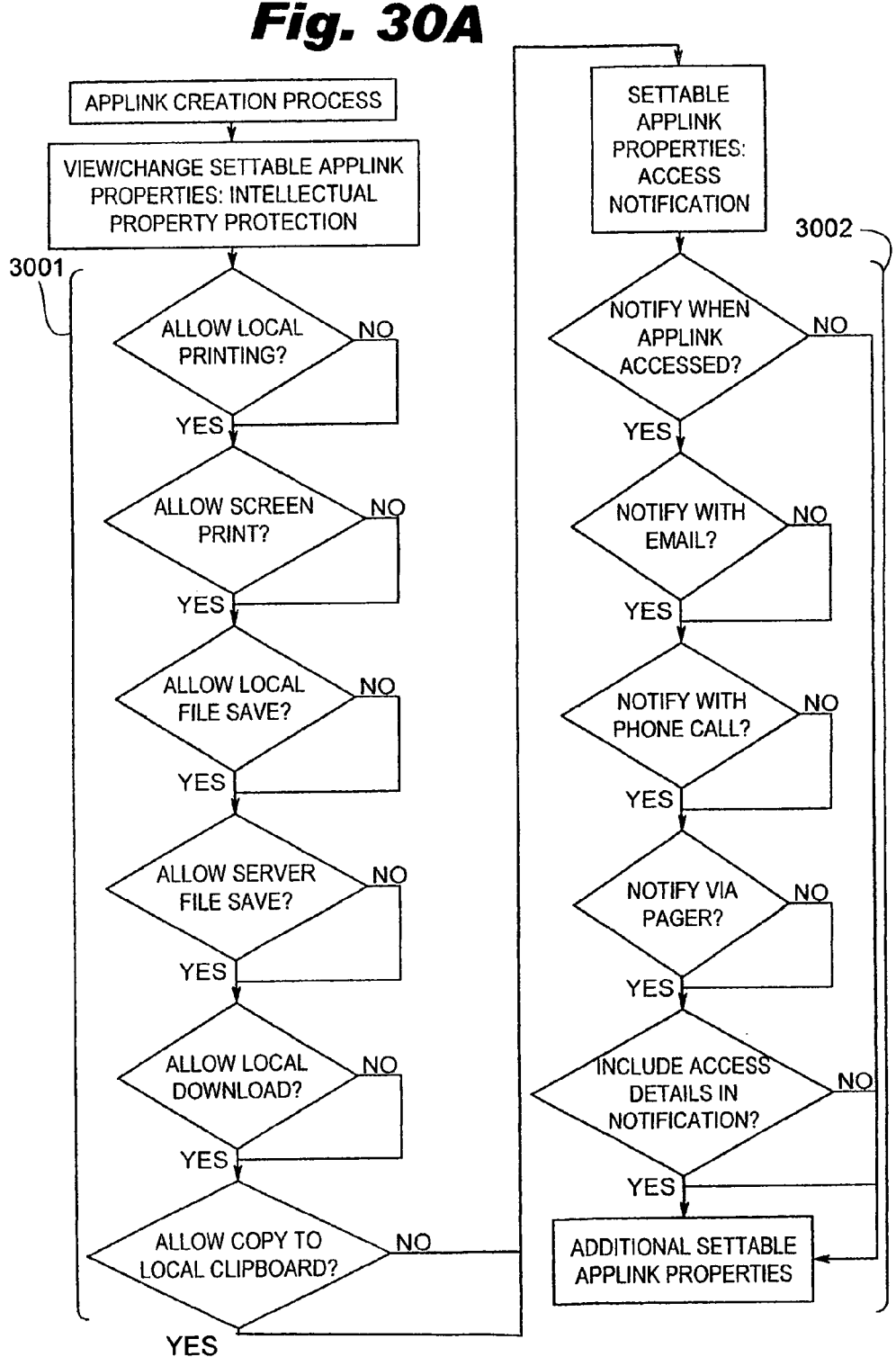

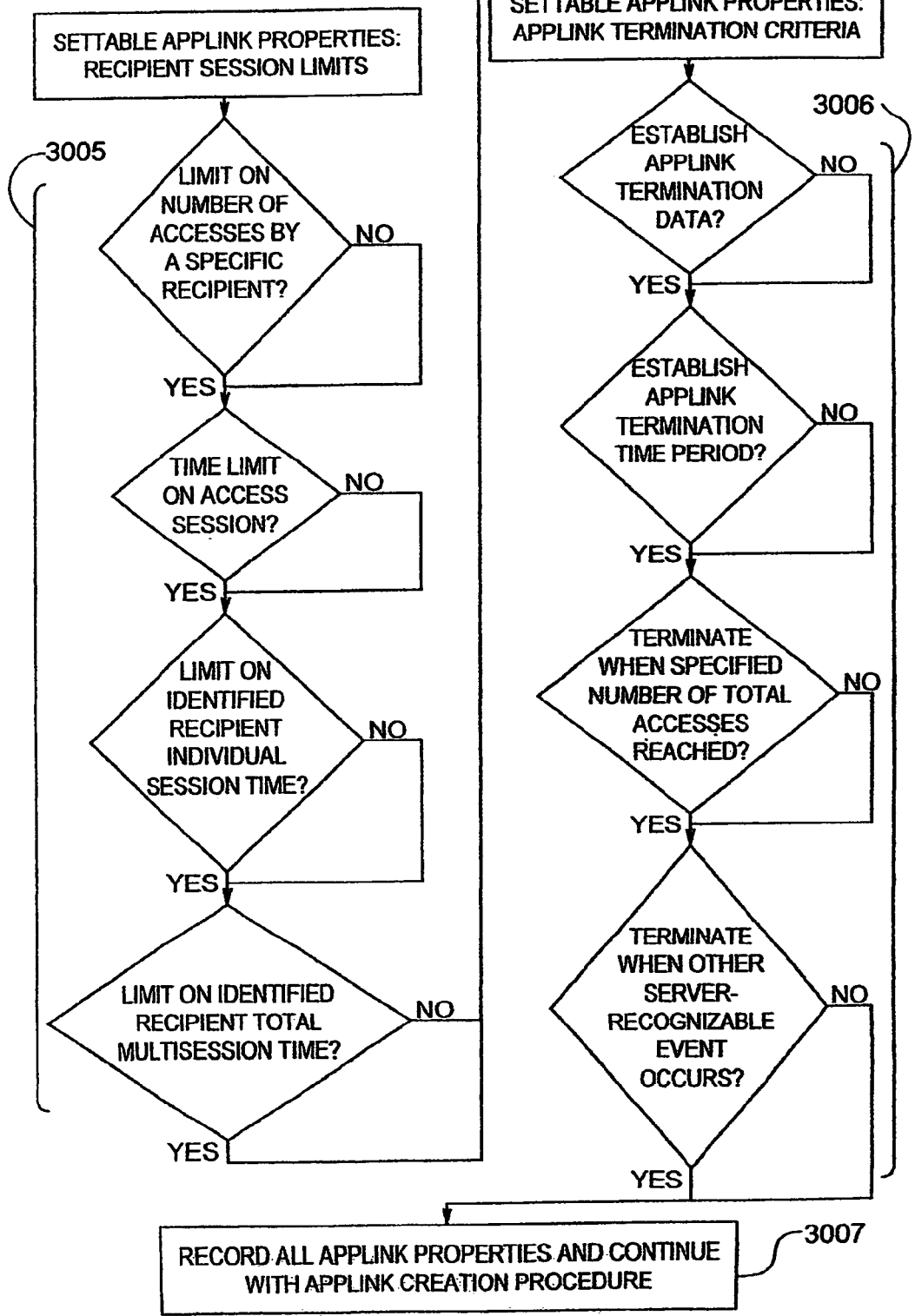

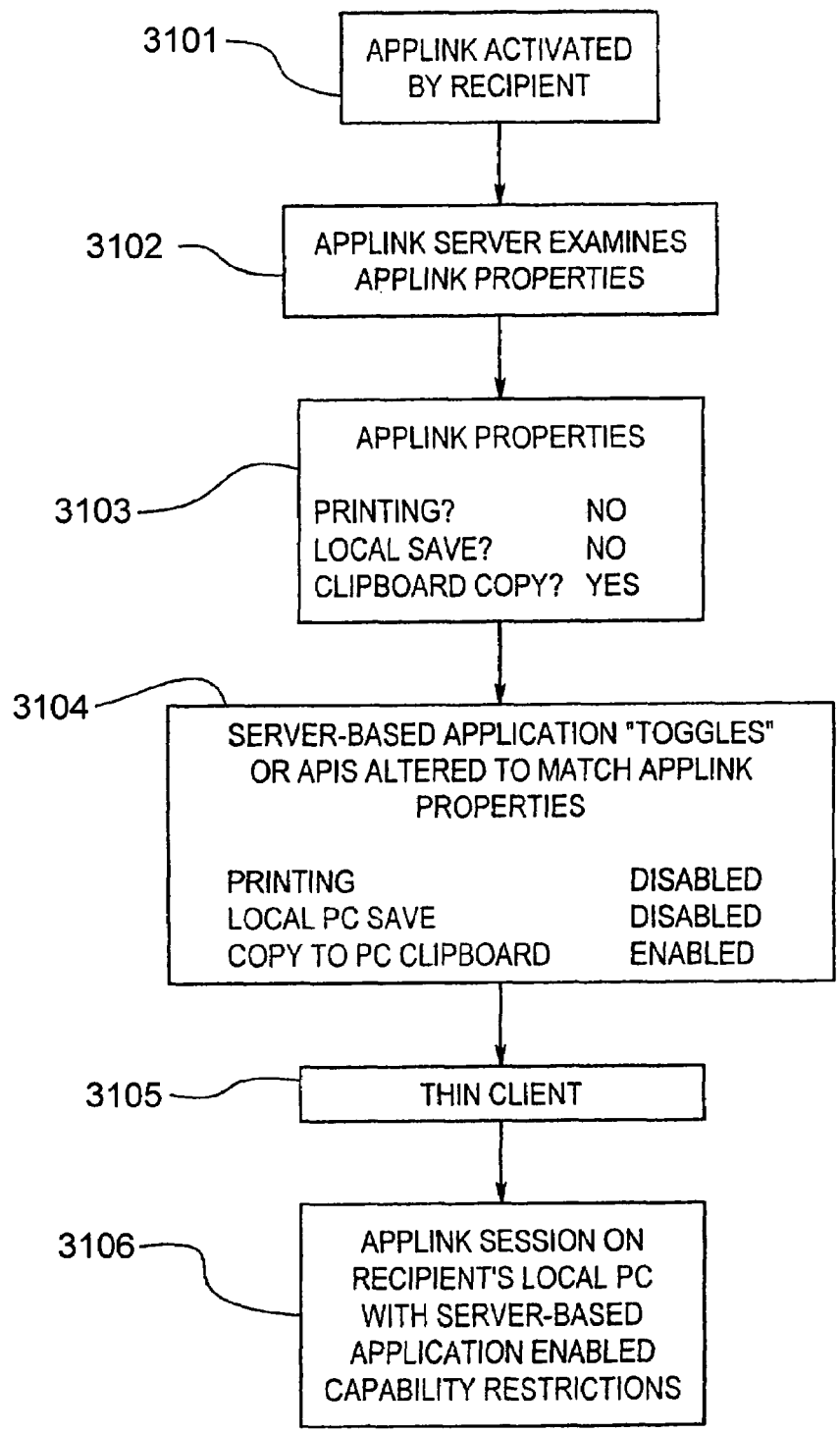

Fig. 33
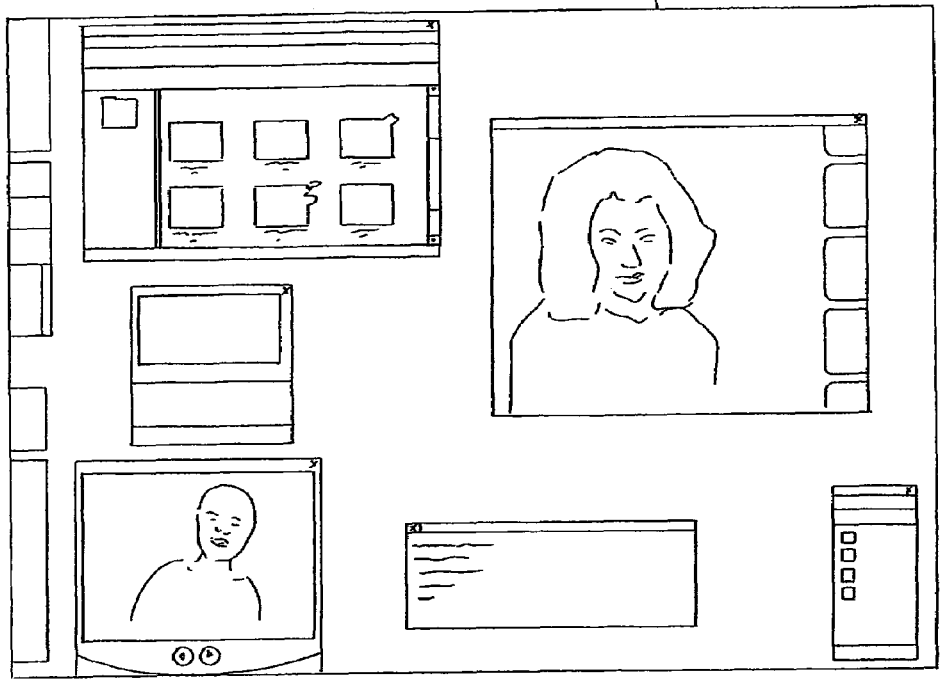
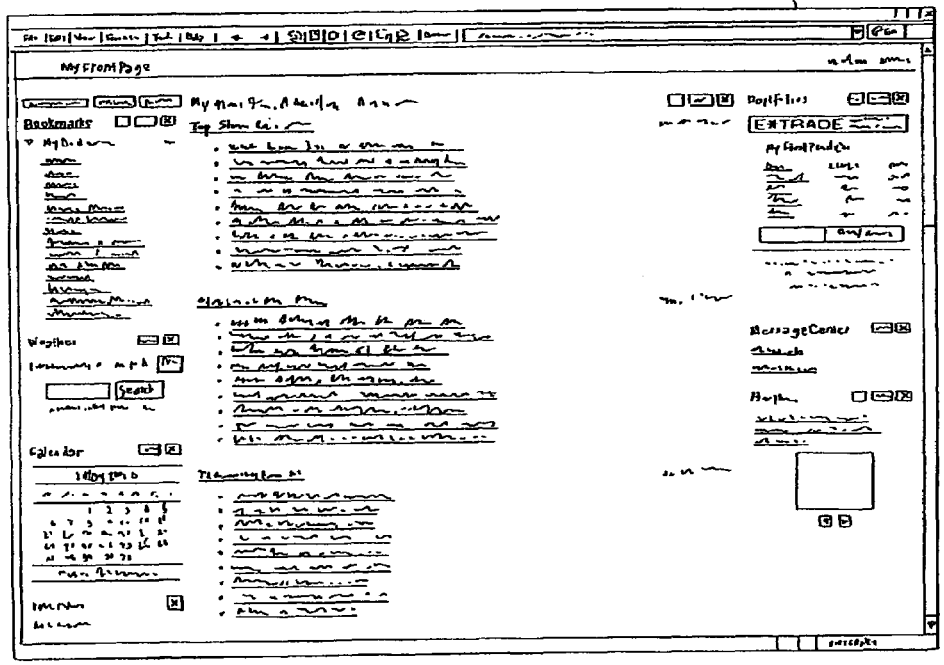

Fig. 34

FREE DESK            HELP   LOGOUT     — 3410

You have created an Applink to the document "Architect Sketch.doc".

This AppLink:
   is Active.
   Recipient can download the file.
   Will NOT require a password to access.
   Will last from 3/22/01 to 4/22/01.
   Will send you email notification.
   Will show the recipient:
      Document details
      Your name
      Your email address

[MAIL THIS APPLINK] — 3412     This creates an email containing the AppLink. Put the desired recipients on the email and you're done.

[EDIT] — 3414     To change the AppLink's properties, click here.

[CANCEL] — 3416     Cancel sending this AppLink and return to the File Manager.

View the list of all your AppLinks

Fig. 35

FREE DESK  HELP  LOGOUT

You've received an AppLink!

When you click on the "Open AppLink" button, a secure Java program will temporarily download and display the document.

You may also download the document. Do this if the AppLink fails to open.

Password [_____]  [ OPEN ]

DETAILS

Document: Architect Sketch.doc    Size: 44.2 MB
Sender: Jim Rice
jim@freedesk.com

MORE INFORMATION

What is an AppLink?

Technical Requirements for using AppLink

Instant Networking: Secure AppLinking. Learn more about FreeDesk!

Fig. 36

AppLink

Sorry! You have clicked on an AppLink that is no longer active. We can't open the file it is linked to.

When you click on an AppLink, a small, secure Java Applet client downloads, and a designated file opens on your computer within a program running on our servers.

If you would like to see a demonstration of an AppLink, please click on the type of file you would like to see demonstrated below.

Word Document
Excel Spreadsheet
Powerpoint Presentation

| JOIN FREEDESK AND SEND YOUR OWN APPLINKS | TECHNICAL REQUIREMENTS |
|---|---|

SYSTEM AND METHOD OF PERMISSIVE DATA FLOW AND APPLICATION TRANSFER

CROSS-REFERENCE TO RELATED APPLICATIONS

This application claims the benefit of U.S. Provisional Application No. 60/152,721, filed Sep. 8, 1999, U.S. Provisional Application No. 60/152,756, filed Sep. 8, 1999, and U.S. Provisional Application No. 60/193,599, filed Mar. 31, 2000, and PCT application PCT/US00/247190, filed Sep. 8, 2000.

FIELD OF THE INVENTION

The invention relates generally to data flow among computing devices and networks, and more particularly to techniques for improving the flow of information, especially applications, among the computing devices and networks.

BACKGROUND OF THE INVENTION

Within the field of computing devices and software generally, there is a desire to provide greater access to data for an ever-increasing volume of users.

Personal computer and desktop devices, as well as laptop devices, are not capable of executing very large scale computer applications consisting of millions of lines of source code. Because of their size, such applications require large amounts of memory and relatively high cycle speeds of CPU operation in order to run satisfactorily. However, in the 1980's and 1990's, with the popularity of the Internet and worldwide web, there has also arisen a general desire to have dramatically improved interoperability between systems, as well as improved simultaneous communications interfacing and network among an increased number of users.

Unfortunately, the ultimate providers of the marketing information, i.e., the members of the population consisting of the owners of the desktop and laptop PCs in the worldwide economies, are generally enslaved by the operating systems or application programs they run. This is due to a cost dominance which makes it impractical for most users to switch from one system to another once purchased and installed or used in each individual's computing device. Similarly, the vendors of the legacy programs, which typically require large investment costs to purchase, and may require unique operating systems, have tended to maintain user loyalty by coercive practices which provide limited choices to customers. What is needed is a way in which various computing platforms may operate in a unified environment.

Computing systems or interfaces have been devised which operate in a so-called "thin client" mode, i.e., one in which a user terminal or computer may be relatively less powerful than a typical existing PC. The thin-client mode of operation may provide for all application execution to take place at the server. In this type of thin client, the client acts essentially as a terminal emulator, using a commercial network such as the Internet, to submit input to the application running at the server level, and displaying the output of the executable resident on the server. This mode of operation is comparable to a mainframe terminal.

The efficiencies of the thin client mode of operating a computing device stem from the manner in which a large size program may be accessed remotely, with the large size program not being downloaded to the computing device of the user. Instead, the large program is accessed remotely by that computing device user (and likely by other users simultaneously as well). Applications have historically been delivered to users over a network by means of a thin client. Files have also been transmitted to users over a network via various systems such as FTP, or as attachments to an e-mail. Links to web pages or file downloads have similarly been practiced. What would be desirable is a system using familiar user modalities to provide a richly functioning interactive and collaborative communications media based at least in part on a remotely-executing application.

An additional problem occurs when computer users in locations remote from each other attempt to share data files, e.g., word processing "document" files, among themselves. Many viruses are spread via e-mail attachments, particularly where the native application for the attachment file utilizes macros, i.e., executable code running within the native application that is embedded within a data file. Accordingly, as a securing precaution many companies have prohibited all e-mail attachments. Furthermore, many Internet Service Providers have file attachment size limits of from one to five megabytes, to reduce strain on their infrastructure. It would be desirable to provide remote user access to data files of arbitrarily large size without sending the file itself, and without the necessity of the recipient ever downloading the file. In addition, application interface settings can be customized by the individual, but those settings are the same for all documents that person works on. This is depicted in FIG. 3c, (Example of existing Windows Application Interface Customization). It would be desirable to provide the ability to associate custom interface settings with each file. Finally, large file transmission is impractical for users with relatively low-bandwidth connections to a network, such as the Internet, particularly when these files do not admit of significant compression. For example, a typical analog connection may provide transmission of 56 K/second. However, an AutoCAD® file for a bridge design might be several hundred megabytes. To download that at 56 K would actually take days.

The originators of some data files may wish to restrict the ability of file recipients to change a document. Currently, software exists, e.g. ADOBE®'s Acrobat PDF (portable document format) software and client viewer software, and other page-description systems that allow data files of certain types to be transmitted in a format which restricts the ability of a recipient to make changes to the data file. This file is then sent as an attachment or download to the recipient, who then views it if he has the PDF viewer installed on his computer. PDF is essentially a "picture" of a document, meaning that the recipient cannot change it. However, a data file originator may wish to restrict use or access of a document in other ways in addition to restricting modification of a data file. For example, a data file originator may wish to restrict the number of times a remote user may view a document, or restrict the ability of a remote user to even save the document. It would be desirable to provide a system by which a data file or "document" originator may restrict access or permissions to a data file in ways other than merely restricting modification.

Finally, with regard to data file and "document" file sharing, a file originator cannot always be certain, without prior consultation with a document recipient, whether the recipient has the necessary software, i.e., the data file's native application of the same version used by the originator, to view the data file as it appears to the originator. A document originator will wish to be sure that a recipient will be able to view, and perhaps work with a data file, regardless of whether the recipient has a program capable of opening that file installed on his or her PC. This is the function of ADOBE®'s PDF (portable document format). With PDF, a PDF file is derived from a document by the ADOBE® conversion utility. However, even with document formats such as PDF, the originator does not have complete control over the use put to the document. For example, it may be saved by the remote viewer. Also, with PDF, a recipient cannot alter the document in any way.

It would be also desirable to provide a thin client computing environment in which collaboration between users may take place, i.e., one in which various users may simultaneously view a single data file using a thin-client application.

SUMMARY OF THE INVENTION

A method is provided by which a user, e.g. a remote user, may access remote files and applications in thin client mode by accessing a hyperlink to a URL or network location. This hyperlink may be referred to generally herein by the generic term Application File Hyperlink, or by the name used in trade "AppLink".

In a preferred embodiment of the subject invention, the enabling code provides a terminal emulator by which the client computer may access application software resident on a server. Preferably, the server computer which executes the application program transmits presentation data to the client computer on an instantaneous or near instantaneous basis, so that the terminal emulation is transparent to the client user, i.e., so that the experience of the user is similar or identical to using a fat client executable application.

Also provided within an embodiment of the present invention is a system for distribution of data files between and among remote users. In a preferred embodiment of the invention, information about the location of a remote server may be embedded in a web page viewed with the WWW application, or through e-mail, e.g. the SMTP protocol. Within these communication media would also be embedded information about the remote file to be accessed by the recipient of the communication, and the server application to which the remote file is native. The file, residing on a central server or being uploadable to the server, will also preferably contain information regarding permissions granted to various remote users, including modification, saving, and viewing permissions, together with duration parameters.

BRIEF DESCRIPTION OF THE DRAWINGS

FIG. 3b is an alternate implementation of the screen view of FIG. 3.

FIG. 6 is a table demonstrating the use of false identities to achieve optimum application interfaces under various file access scenarios.

FIG. 7 is a depiction of the temporal process in the creation of an application link according to an embodiment of the present invention.

FIG. 8 is a depiction of the data flows relating to part of the creation of an application link according to one embodiment of the present invention.

FIG. 10b is a depiction of the process flows relating to another part of the activation of an application link according to one embodiment of the present invention.

FIG. 26 is a depiction of a user interface for managing the application links of the present invention.

FIG. 30 is a process flow diagram depicting the setting of application/file hyperlink properties, according to one embodiment of the present invention.

FIG. 30a is a process flow diagram depicting the setting of further application/file hyperlink properties, according to one embodiment of the present invention.

FIG. 30c is a process flow diagram depicting the setting of further application/file hyperlink properties, according to one embodiment of the present invention.

FIG. 31 is a process flow diagram depicting the implementation of application/file hyperlink recipient properties by online application variables, according to one embodiment of the present invention.

FIG. 33 is a depiction of an existing html-based web portal home page, and an alternative to that page, according to one embodiment of the present invention.

FIG. 34 is a depiction of a user interface according to an embodiment of the present invention.

FIG. 35 is a depiction of a further user interface according to an embodiment of the present invention.

FIG. 36 is a depiction of another user interface according to an embodiment of the present invention.

DETAILED DESCRIPTION OF PREFERRED EMBODIMENTS

Figure 1:
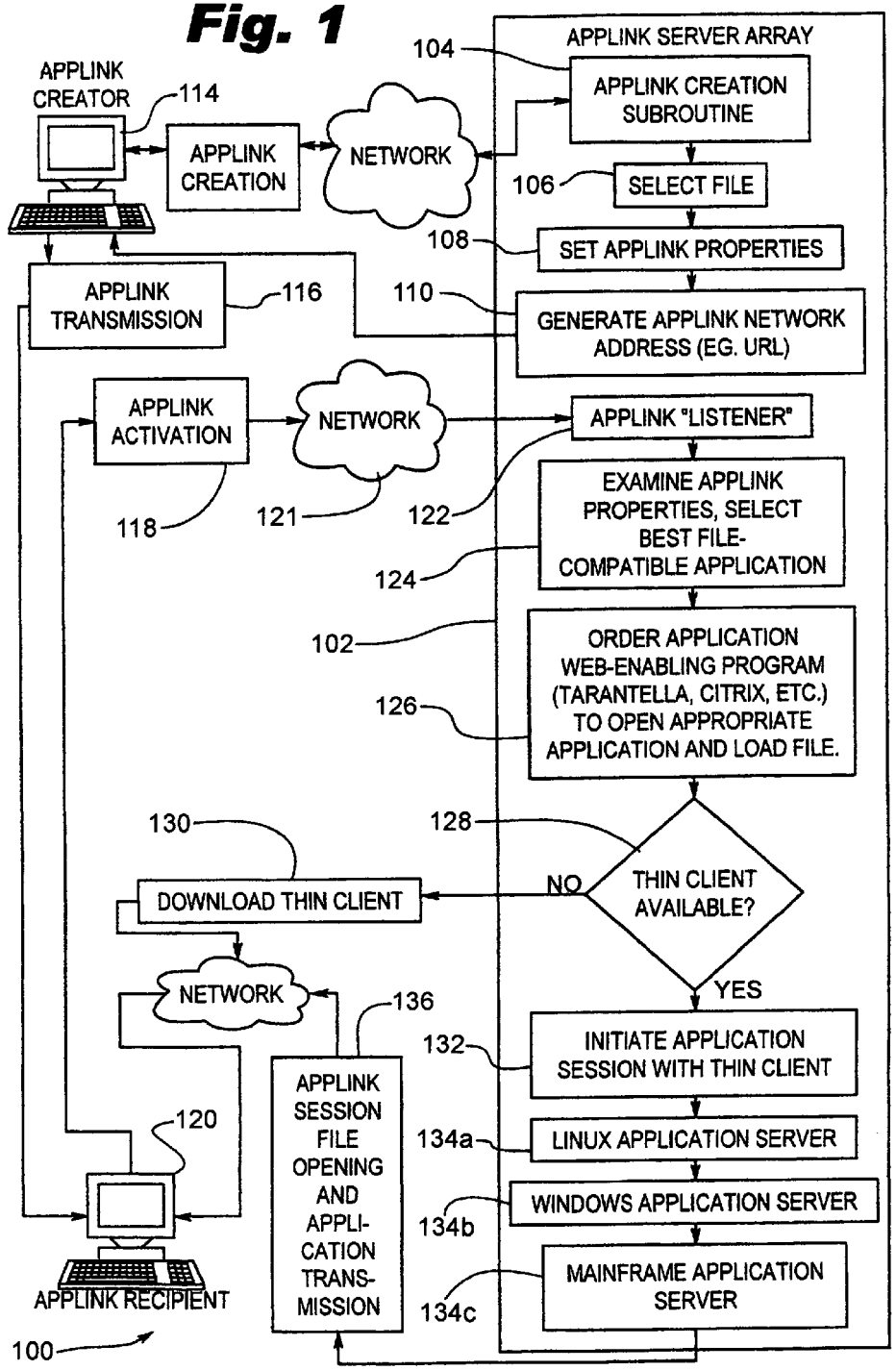
FIG. 1 is a depiction of the process flows in creation of an application link according to one embodiment of the present invention.

In one embodiment of the present invention, it is desired to provide a common enabling code means for rapid download from communications nets, such as internets, the worldwide web, or other providers of such communication download services. Such enabling code means is designed to provide a facility for download and upload of data from such communications nets to and from desktop, laptop, hand held, or other computing devices of various sizes and capacities. However, such enabling code means is designed with substantial commonality and interoperability with vast amounts of application and other types of software which is freely available on such communication nets.

As is known in the art, terminal emulation software is available for several popular computing platforms, including the Wintel (Windows operating system, Intel CPU) platform. Terminal emulation software permits a remote client computer to access a server computer and receive GUI or other interface output from the server computer to reflect the operation of an executable application, e.g., a word-processing application or CAD program. If the bandwidth of the communication network connecting the client and server computers is sufficient, the user at the client computer may use the remote application almost as if the application was resident on a local hard drive, and was being executed by his local CPU. This, of course, is the traditional mode of program execution by a PC owner who purchases off-the-shelf software, and then installs it on his machine for use.

A collaboration session is preferably initiated by various users accessing a single computer data file, such as a word processing document file. The document file, and any software required to view or edit the document file may be requested by a remote user by, for example, activating a hyperlink by clicking on a document name in an HTML document within the WWW application over the http protocol. This link would prompt the remote server to preferably download to the requesting user thin client software which, in combination with the information on the server pointed to by the AppLink about which file and application to open, allows the user to cause the server to start a file-compatible application, open the data file, and present the application to the remote user in thin-client mode according to the permissions granted to the user by, for example, the originator or other administrator of the document permissions information. The permissions granted to a user may preferably be altered on a dynamic basis, for example, where several users view a document at one time. In this instance, one user preferably will be granted write permission to the data file while all other users are granted a lesser form of permission such as "read". This provides version control to the data file and avoids problems with inconsistencies between what is ostensibly the same data file from the point of view of the users. In addition to limitations on user's rights to write, modify, or delete data files, the present invention preferably may be configured by a data file originator or administrator to allow other users to view a document, but withholding permission to the other user's to save the data file. The user may be presented with a screen showing various options for security and access provisions for a data file, e.g., a word processing file, spreadsheet file, or CAD drawing.

In an alternate embodiment of the present invention, a thin-client is provided without a corresponding fat client mode, but data file collaboration and other related file transfer techniques are available to thin client users. This embodiment would allow users to use alternate terminal emulation hardware, including, but not limited to, web appliances, personal digital assistants, palmtops, and any other devices which are web- or Internet-enabled, or may operate over TCP/IP, as is known in the art.

In an alternate embodiment of the subject invention, upon execution of a hyperlink request for a document by a remote user, the user may be presented with a thin client executable code which permits viewing and editing of the data file in its native format, replacing the prior modes of data submission such as CGI forms. The data file submitting by a remote user in this way may later be viewed and edited by other remote users, the form originator, or the user submitting data through the native thin-client executable.

A definition of thin client as intended by this invention may be useful. This terminal emulation may proceed by input at the client machine being transmitted as instruction requests to the server. Upon execution of the instruction request at the server application level, the server web-enabling application may modify the GUI or other interface state of the remote user's data file, as returned by the "user application" running on the server, i.e., the application that the remote user wishes to use for manipulation of a certain data file. In other words, the user's input on the client machine is transmitted to the server, executed on the user application running on the server, and the output of the user application is sent to the client machine, basically, as a "picture" of the server's executable user application output. Because this picture is preferably changed very frequently, the experience of the client user is substantially the same as if the user was inputting commands to executable code resident on the client machine. This "picture" repeatedly sent to the client user may be termed the "GUI state" of the application executing on the server. The executable code which allows the client machine to emulate a terminal, i.e., allows the client machine to send instructions to the server machine, and display the GUI or other output of the client machine, may be considered a component of enable code, and is called commonly a "thin-client". If a client machine already has the terminal emulation thin client software installed, the enable code downloaded to the client machine may consist solely of the server-based application's "GUI State".

Thin-client mode, as described above, depends on a communications link between client and server which is essentially constant in its availability, if the client user is not to experience inconvenient delays in execution of input and output feedback. If communications are terminated abruptly, preferably the server will automatically save any data file being modified by the client user, as well as several past versions, according the client user the opportunity to discard changes saved to the data file.

The advantages of using the systems and methods described herein include resource savings including financial savings, time savings, ready access throughout the world, minimization or eradication of synchronization problems in various interface scenarios, improved data security due to a reduction in data resident to highly portable and easily lost or stolen portable computing devices, enhanced team productivity among multiple users, dramatically improved session persistence of users, ready access at one logon or communications step to vast stores of information which may have previously required multiple communication access steps and other advantages. The experience of a user under this communication system thus duplicates a virtual private network, and may be experienced as fully interconnected network 190 of FIG. 4.

One embodiment of a server system that may implement an embodiment of the present invention is depicted in FIG. 1 at 110. FIG. 1 is a depiction of the process flows in creation of an application link according to one embodiment of the present invention. According to this embodiment, a local network-connected computer or computing device may serve as an interface to a separate server or server array, which may be generally termed the AppLink Server 102. The AppLink Server 102 may be comprised of a server which operates an AppLink Generation Procedure 104, which following file identification 106 and AppLink property setting 108 accords to the sender's 114 selections, generates at 110 a unique hyperlink designation, e.g., a URL location over an IP network such as the Internet, which is associated with (1) a particular file or document which is stored on the computer, or a file for which the location is known, and (2) a file-compatible server-based application that is the preferred application to be used to open the file. This AppLink can then be transmitted by a sender (which could be the AppLink creator 114) to a recipient by any suitable means 116, including SMTP, IP messaging, embedding a link in a web page, or other communication media, even POTS. When activated at 118 by the recipient 120, the AppLink connects to the AppLink Server 102, which is periodically polling or "listening" for the AppLink's activation over the network 121 depicted by process 122. While the communications are depicted in this embodiment as taking place at least in part in a network environment, e.g. 121, other implementations are possible, e.g., dedicated connections or secure lines.

The AppLink Server or Server Array 102 will preferably include an application remote-operation enabling middleware program, or application web-enabling program, such as Tarantella™ or Citrix™, along with associated application servers running various operating systeMs. When the AppLink Server "listener" function 122 detects the activation 118 of the AppLink, i.e., the execution of the hyperlink representing the AppLink, it locates the AppLinked file, examines the file's properties at 124, and commands the web-enabling program to begin at 126. This portion of the AppLink Server initially checks at 128 whether the recipient computer has a thin client program which can display the server-based application's GUI to the recipient. If the recipient does not already have the requisite thin client middleware on his computer, the client program is preferably automatically downloaded at 130 and installed on the recipient's computer. Alternatively, the user may be prompted to permit or initiate the download, and optionally designate a target directory for the download's local storage. When or if the recipient has the thin client installed, the web-enabling program then initiates an Application session with the thin client at 132, by commanding a remote application server 134a, b or c of the AppLink Server Array to start up a file-compatible software application and load the AppLinked file into the application. The web-enabling program initiates a communications link with the thin client program at 136 and displays the GUI for the application to the AppLink recipient. The recipient 120 is then free to view and interact with the file as if it were in a program running on his local computer, albeit according to the restrictions placed on the application by the file's owner or administrator as set at 108.

Figure 2:
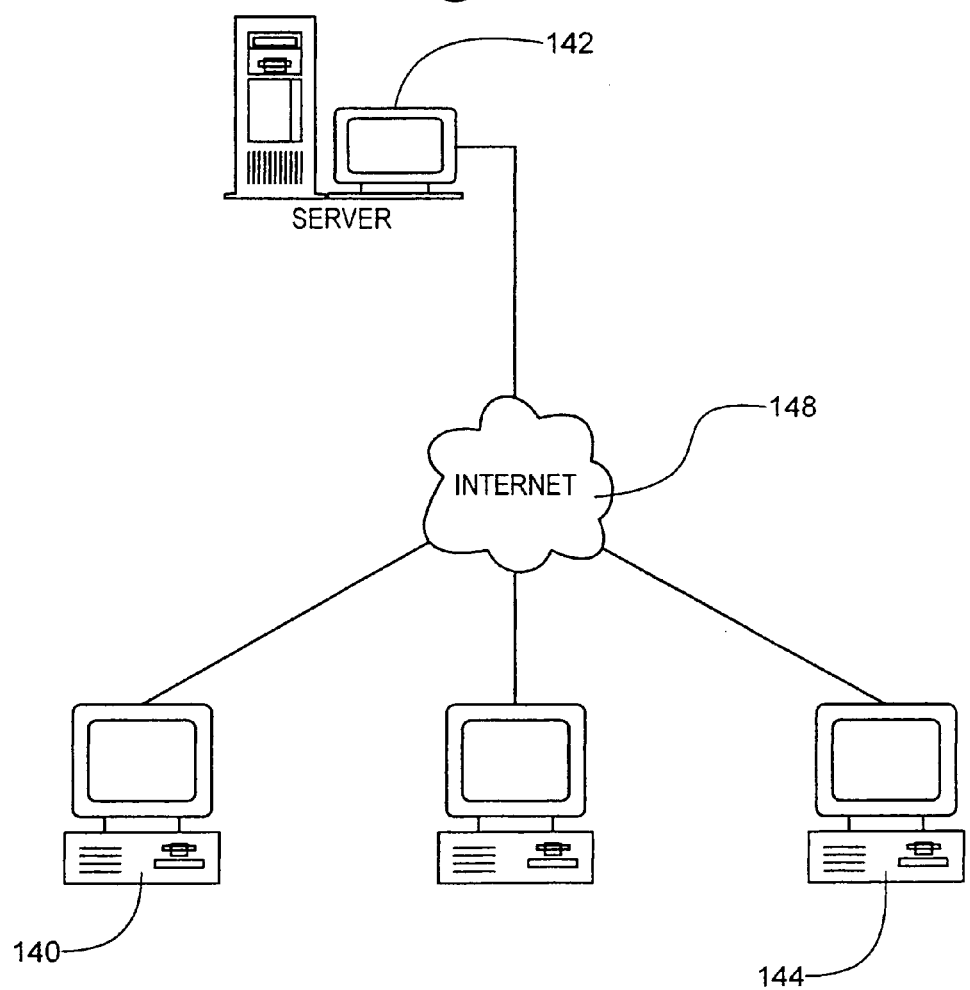
FIG. 2 is a schematic illustration of a network according to one embodiment of the present invention.

FIG. 2 is a schematic illustration of a network according to an embodiment of the present invention. As depicted in FIG. 2, an e-mail or a web page can have a hyperlink to a particular application file or document stored remotely on server 142 or remote machine 144. The machines form a virtual network linked by the Internet or other communications network indicated by network cloud 148. When the recipient or user using client computer 140 clicks on or executes the link, information embedded therein directs the client computer to a server computer 142 on which a data file and user application reside, a thin-client is automatically downloaded to the user, and the application or program associated with the file (typically the application that was used to create it, i.e., the data file's native application) is started on a remote application server computer 142. The specific file designated by the link is then opened by the user application, and the thin-client displays the file on the user's computer 140 within a thin client window which contains the application's graphical user interface. The user is then free to interact with the file as if it were running inside an application running on the user's client PC 140. Alternatively, a remote file on a different remote computer 144 may be accessed by a user application running on server 142.

According to an embodiment of the present invention, a method is provided by which a user, e.g. a remote user, may access a remote document in thin client mode, by accessing a hyperlink to a URL or network location at which an application accessing the remote file may be remotely manipulated and operated. This hyperlink may be referred to generally herein by the generic term Application File Hyperlink, or by the name used in trade "AppLink".

Figure 3:
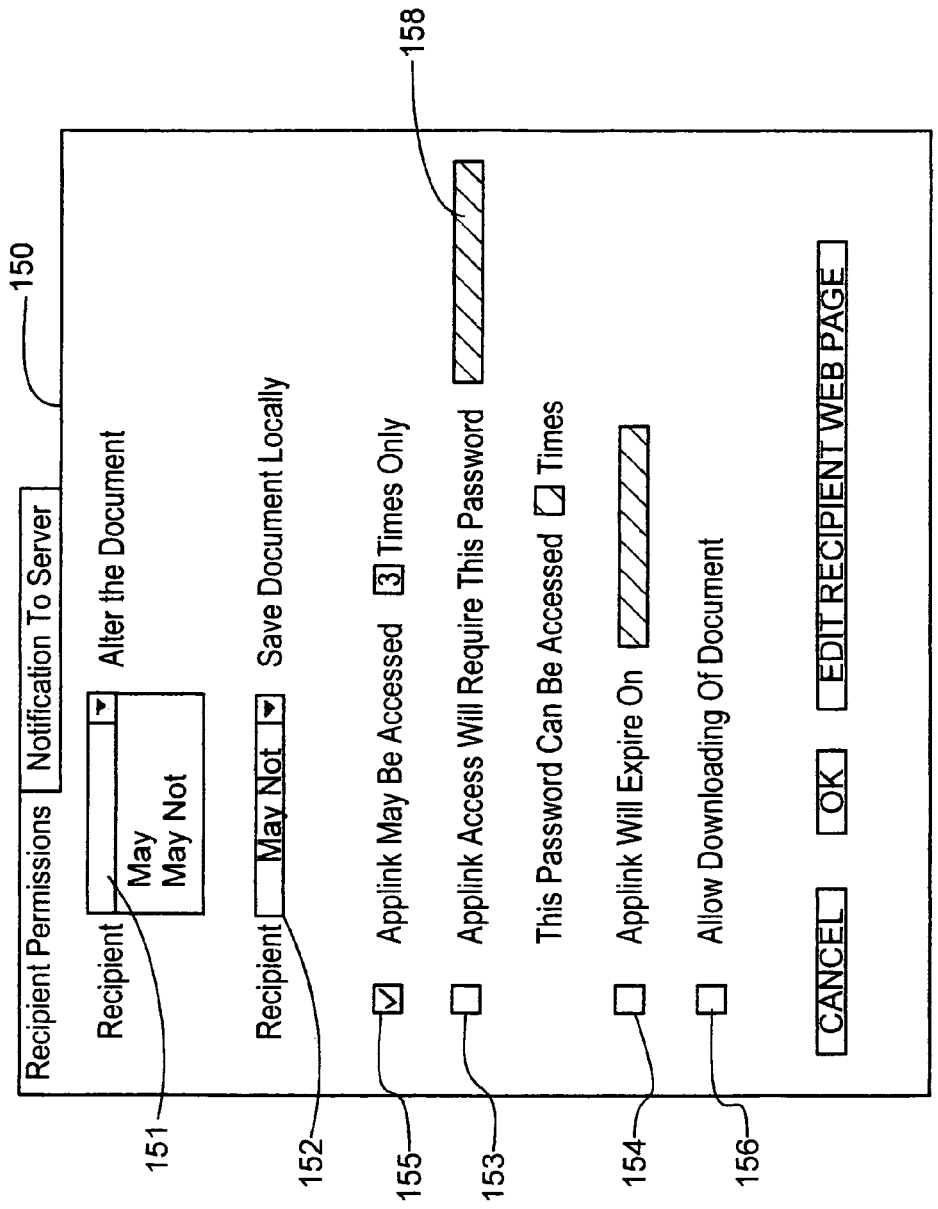
FIG. 3 is a screen view of one embodiment of a computerized method according to the present invention.

FIG. 3 is a screen view of one embodiment of a computerized method according to the present invention. A hyperlink according to the present invention may be created in a GUI environment such as that depicted in FIG. 3, showing a screen shot 150 of a GUI allowing a user to create a hyperlink to a server-supported AppLink. Alternatively, a user may create a hyperlink according to the present invention by executing a GUI icon representing the link-creating application. A client user may create a server application link by specifying a file resident on a local client machine, e.g., client machine 140 or FIG. 2, a server 142, or a remote client machine 144 which may establish from time to time a direct or indirect link to the server 140. A hyperlink to the server-supported application may contain an embedded URL of a server application or protocol which may execute a series of instructions to download middleware, or web-enabling client code, to the machine 140 from which the hyperlink is accessed. In addition, the hyperlink may contain embedded information, or the URL of a protocol file containing information as to the executable code to run on the server 140, as well as a particular data file to open within the executable application being run on the server 140. This application's output may then be sent as a "picture" by the server middleware to a web-enabling client resident on the client local machine 140, as depicted by process 130 of FIG. 1. In other words, upon execution of the hyperlink by a remote client 140, a process will be executed by the server 142 by which a remote client 140 will have a thin-client process loaded onto it, and then access the remote data file, while the native application of the data file runs on the server. The remote user interacts with the server application using middleware server and client components resident on the respective machines.

In a preferred embodiment of the present invention, an originator of a document, in creating a server-supported application file hyperlink, or AppLink, to a data file such as a "document" file, may specify recipient permissions and other access parameters, such as through a GUI screen as depicted in FIG. 3 as screen 150. In FIG. 3, the originator of a document AppLink may specify, for example, whether a remote client accessing the document may alter the document, selected in pull-down list 151, whether the remote client may save the list locally (pull-down list 152), and whether a password will be required in order to access the data file being linked (check box 153). In addition, and as depicted in the GUI 150 of FIG. 3, the originator may specify whether the AppLink through which the file is being accessed will be subject to an expiration date (check box 154) or a maximum number of accesses (check box 155) and whether the document may be downloaded to a recipient's local computer (check box 156). An alternate embodiment of a suitable AppLink origination screen, with corresponding elements, is depicted in FIG. 3b.

One advantage of sending this hyperlink to a recipient in an e-mail compared to the alternative of simply including the file as an attachment to the e-mail is that there is no computer virus danger for the recipient. Many viruses are spread via e-mail attachments, and many companies have prohibited all e-mail attachments as a security risk. The thin client software required on the recipient's computer can be a "signed" Java applet, meaning that a central certifying authority has certified the thin client to be virus-free, and this single program is downloaded only once, versus multiple download/run cycles for e-mail file attachments. The application file hyperlink is a way to allow an employee of such a company to view and work with a file without having to receive the file in an attachment, or download it. Another advantage of this method for giving a user the ability to view and work with a file in a server-based application is that the originator can then be sure that the recipient will be able to view and work with the file, regardless of whether the recipient has a program capable of opening that file installed on his or her PC, since a server-based file-compatible application is, in a sense, sent along with the file. Viewing a file regardless of the application used to create it is also the function of ADOBE's PDF document format. With PDF, a PDF file is derived from a document by a conversion utility. This file is then sent as an attachment or download to the recipient, who then views it if he has the PDF viewer installed on his computer. PDF is essentially a "picture" of a document, meaning that the recipient cannot change it. With an application file hyperlink, the recipient has full capability to interact with the file. For example, a spreadsheet may have several embedded "macros" which would be inaccessible to a person viewing a PDF file. Or, a presentation delivered via AppLink can have full animation and sound. With PDF, a file is transferred to the recipient. With AppLink, no file is transferred, and it is not necessary that the recipient have a viewer installed on his machine, although he will need a compatible thin client. Another advantage is that access to data files of arbitrarily large size can be given to the recipient without sending the file itself, and without the necessity of the recipient ever downloading the file. Many Internet Service Providers have file attachment size limits of from one to five megabytes. An application file hyperlink bypasses that limit, since no file is sent. The thin client applet is typically under three megabytes in size. There are emerging numerous file conversion utilities and services which will convert various document formats into HTML, and display the document to the viewer in the form of a web page. This has the advantage of not sending the file to the recipient, but at a cost of removing any functionality from the document. This "HTML-Viewer" technique has problems with "multi-paged" files, such as a Microsoft Excel spreadsheet with 20 pages.

Since the file is not sent, the originator of the hyperlink retains control over that data file as implemented and controlled in GUI screen 150. The originator of the hyperlink can set varying permissions to accomplish various goals. The originator can make the file "read-only", meaning that the recipient can view and work with the file but not change it permanently, e.g., through pull-down menu 152 of FIG. 3. The originator can prevent the file from being saved locally onto the recipient's PC, e.g., through pull-down menu 154. This results in the recipient being able to view and work with a file in native format, but not possess a digital copy of the file, meaning that the recipient cannot copy the file or re-send it to others. Full control of the file remains in the hands of the originator, even after the hyperlink has been sent or accessed. In fact, the originator can change the file after the hyperlink has been sent, unlike simply sending the file itself. For example, the originator can cancel the hyperlink after it has been sent if he changes his mind about the message a file may contain. The originator can specify that a hyperlink will only be active a specified number of times, e.g., through check box 155. If this number is set to 'one', for example, the document becomes, in effect, a self-destructing message. The originator can specify that he receive notification each time the hyperlink is accessed, telling him that the file has been viewed or worked with, along with data such as the time it was accessed, and for how long. In contrast, under the prior art simply sending an e-mail attachment tells the sender nothing about whether the attachment was ever viewed by the recipient. The originator can allow the file to be downloaded or prohibit this through checkbox 161 on a radio button pair specify that an originator-specified password be required from the recipient before file access is granted, e.g., through check box 153 and corresponding text box 158, ensuring that the hyperlink is not used by an unknown person. Different passwords could be given to different people, allowing the originator to get notification of which person accessed the file.

In addition to e-mail, a hyperlink could be included on a web page. Clicking on a link on a financial adviser's web page might bring up a spreadsheet file within the spreadsheet application, with a template for a prospective customer to enter personal information, and perhaps run macros to see how much money the financial adviser could save him if he employs the adviser. This is much more robust and reliable than simply converting a spreadsheet to a web page, since the full functionality of the spreadsheet remains available to the viewer.

In one embodiment of the present invention, a utility for modifying an application's interface settings as specified by a particular file's metadata is provided. The ability to send someone an AppLink to a file or to share files online using server-based applications turns server-based applications into a means of communication. There is a need, therefore, to modify applications for their new communications role. The application interface which the AppLink or shared file recipient sees will preferably be optimized for the particular purpose that the AppLink sender or file sharer has in mind.

Figure 3C:
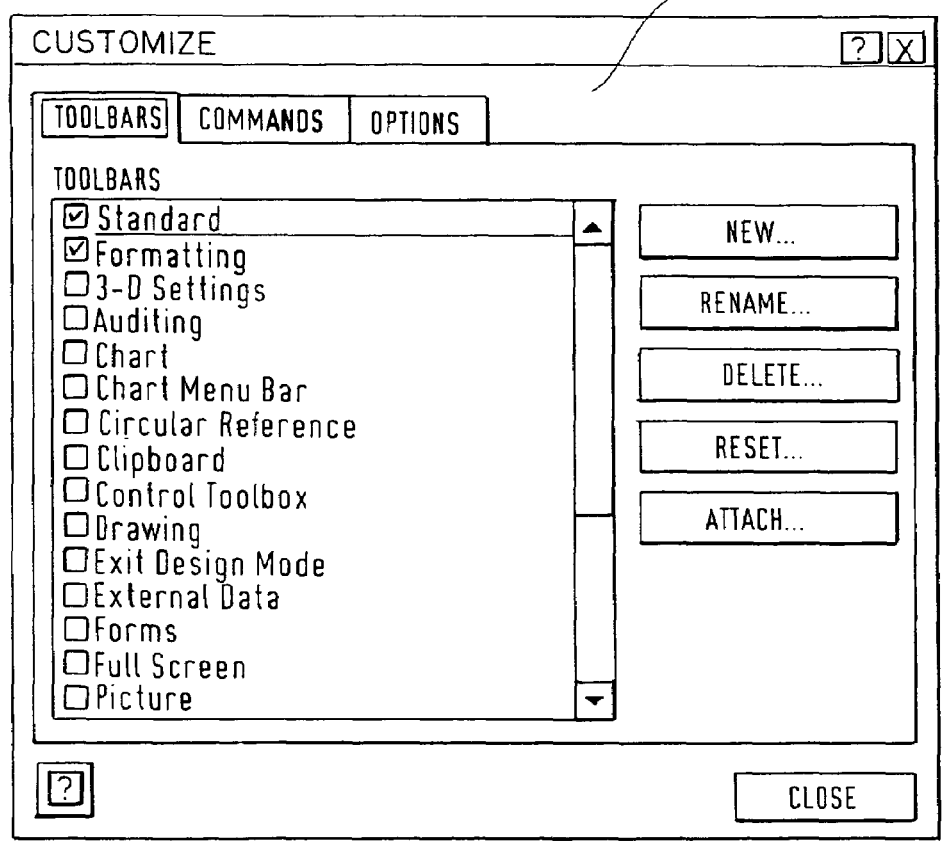
FIG. 3c is a depiction of an application interface selection interface according to the prior art.

FIG. 3c is a depiction of an application interface selection interface according to the prior art. Currently, application interface settings can be customized by the individual, but those settings are the same for all documents that person works on. This is depicted in FIG. 3C, which depicts a common existing Application Interface Customization Interface 170. According to an embodiment of the present invention, the ability to associate custom interface settings with each file is provided, by means of file metadata. Such metadata can contain the actual application interface settings for that file, or user-specified metadata "key words", which point to application settings for all files whose metadata contains those key words. Examples of this type of metadata might be the key words "presentation for customer" or "document for internal use", etc. Another user accessing the file through an AppLink would be limited to the application interface specified by the author. Multiple interface settings could apply to a single file, if it is used in multiple ways. Multiple interface settings could be linked to the role of the document at the moment, such as "being created or edited", or "being viewed by a customer". These settings could also depend on the identity or role of the viewer, such as "document creator", or "viewer".

An example would be an AppLink to a presentation file, such as Microsoft PowerPoint. The file would have metadata which specified that the presentation program presenting the file would have only the presentation playing controls, and no editing controls. Another example which would use the same interface would be if that file was "shared" with a coworker (not AppLinked) for comments, but the creator wanted to reserve making the actual changes to himself. Another example would be the removal of "file>>save" commands for restricted documents. However, the originator of the file would have an interface setting that specified full editing and saving functionality.

Figure 3D:
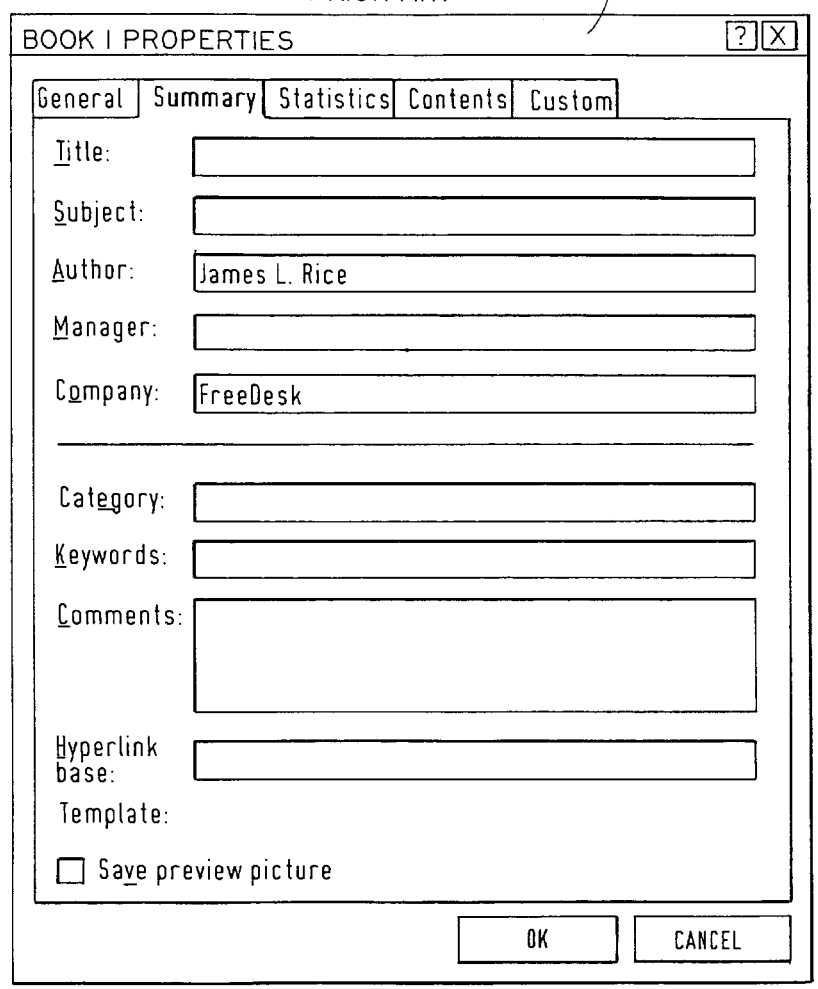
FIG. 3d is a depiction of a file metadata interface according to the prior art.

The file application interface settings would be stored in the form of file metadata, which is normally not seen by the user, but can be created or modified when necessary. The metadata could be stored with the file itself or separately in a file metadata database. This file metadata could additionally have an additional association with a person or group, so that when that person or group opens the file, they get a particular interface optimized for that person or group as that general metadata is automatically applied to files that the group member accesses. FIG. 3d is a depiction of a file metadata interface according to the prior art. FIG. 3d depicts the existing File Metadata Interface 180.

Altering application interfaces according to file metadata or user role may require rewriting the applications to respond to the interface specifications contained in the file metadata. However, there is a method to get this capability immediately by "fooling" the applications with false users, and using existing application interface modification capabilities. By having the file metadata present itself to the application as different users, and then using the application's existing interface modification capability to produce different user interfaces associated with each false user, it will be possible to use the existing personalization features of many programs to achieve different interfaces and functionality, which can then be directed to each user according to the user's permissions or security settings. For example, a file's application interface may have several optimal interfaces, depending on whether it is used in an AppLink, or which user accesses it. Each of those interfaces could be associated with a false user. This may be seen in FIG. 6, showing applicable relationships between file usage, the false username associated with a particular interface, and the particular interface requirements.

In this way, the various recipients' access to, and control over, the distributed .doc document file can be tightly controlled.

Figure 4:
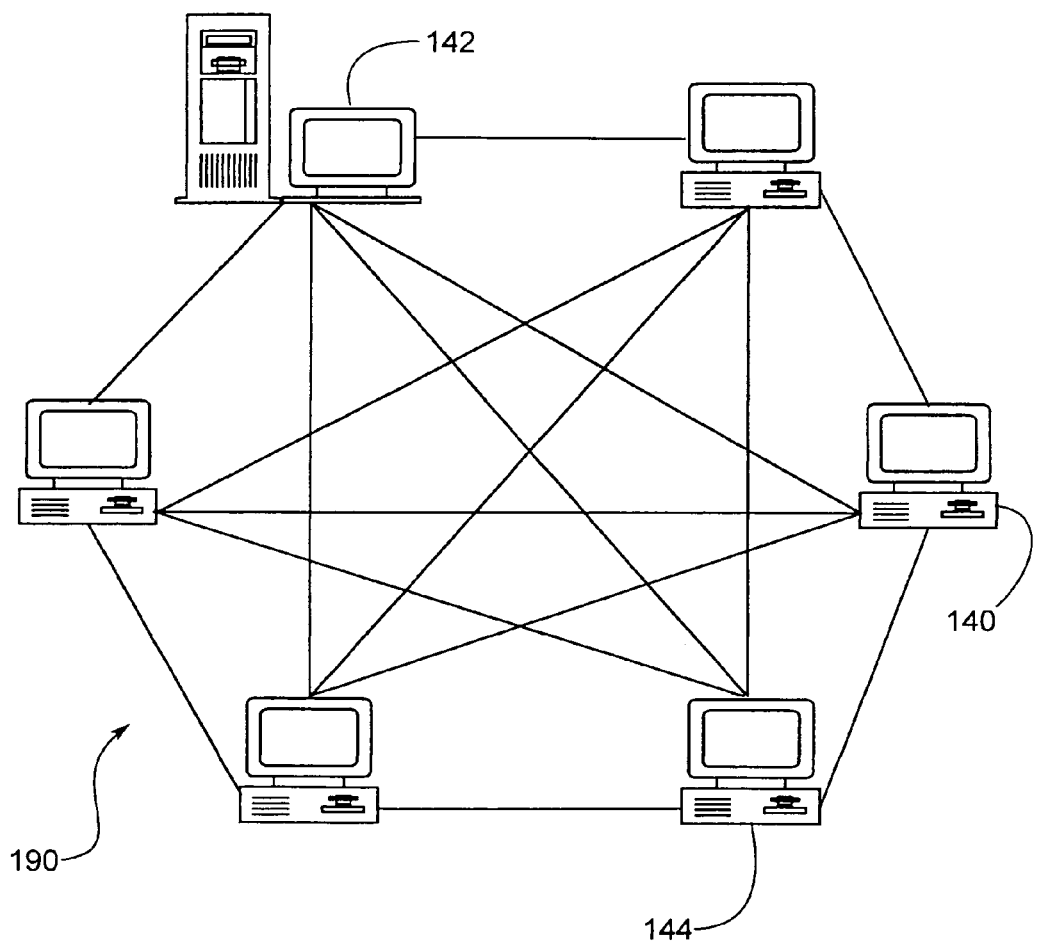
FIG. 4 is a schematic illustration of the network of FIG. 2, as perceived by a user according to the present invention.

FIG. 4 is a schematic illustration of the network of FIG. 2, as perceived by a user according to the present invention. The present invention, in several embodiments, may be used to effect collaborative communications sessions, which may or may not focus on a particular computer file that is the subject of the collaborative effort. In this way, the distributed public network of FIG. 2 may be rendered transparent to the users, to effect a virtual private network akin to that depicted in FIG. 4. FIG. 4 depicts generally a fully interconnected network 190, including a document server 142, and various interconnected remote computers, e.g., remote computers 140 and 144. The users of remote computers 140 and 144, by accessing a central system implementing an embodiment of the present invention, may collaborate by both viewing a computer file open on a central server 142, such as an application server as described elsewhere herein. Users using remote computers 140 and 144 may both view, edit, and comment on a computer file being administered and stored at the central server 142. The location of the file is transparent to the user, and the effect of the collaboration as experienced by the users of remote computers 140 and 144 is akin to the effect of discussing the application on a centralized virtual bulletin board, where each party may post, react, and watch other users' post their own comments and suggested comments.

Figure 5:
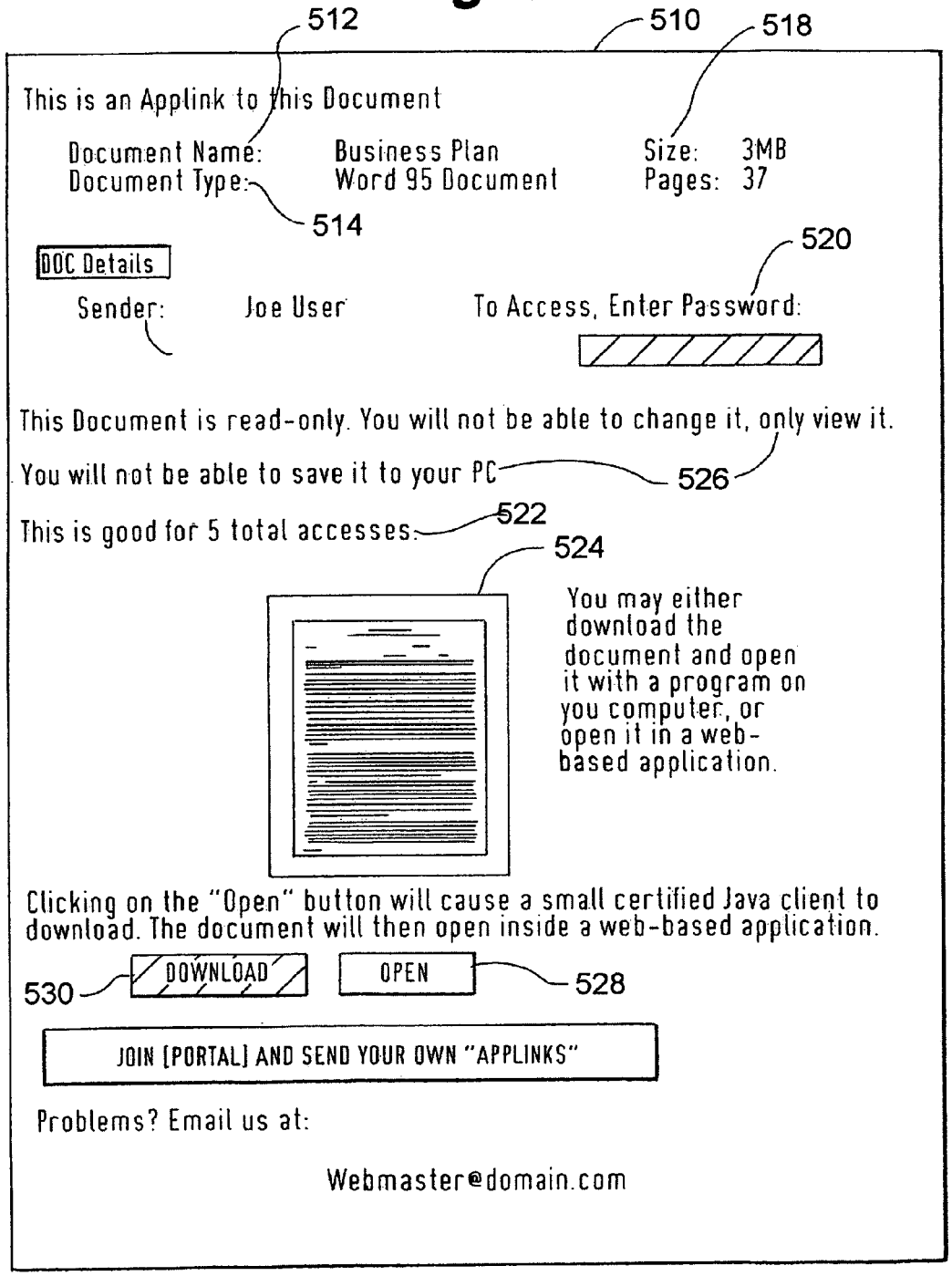
FIG. 5 is an interface screen capture of a computerized method according to one embodiment of the present invention.

FIG. 5 is an interface screen capture of a computerized method according to one embodiment of the present invention. FIG. 5 depicts a GUI screen 510 according to one embodiment of the subject invention, suitable for notifying the recipient of an server-supported application link as to the status of the data file they may view in thin-client mode as provided by the present invention. Upon clicking on a server-supported application link, or AppLink, which may preferably appear as a standard hyperlink in an e-mail communication or HTML web page as described below, GUI screen 510 is presented to the recipient at computer 146 of virtual thin-client network 190 in FIG. 4. Recipient user operating client machine 140 may access a document stored on server 142, or any other data file residing on a machine of the virtual thin-client network collaboration group 190 when such machine is presently linked through a communication network to server 142. GUI screen 510 of FIG. 5 tells the recipient at machine 140 the name of the data file, e.g., a "Business Plan" word processing document, as indicated at 212, the user application to which the data file is native, e.g., "WORD 95" as indicated at 514. The GUI screen 510 also indicates the originator of the data file, e.g. "Joe User" at 516. The "sender" of the data file corresponds to the data file originator, and this user or registrant operates machine 144 in virtual network 190.

Figure 5B:
FIG. 5b is an alternate implementation of the screen capture of FIG. 5.

Other data file parameters to be communicated to the recipient are indicated in GUI screen 510 including size at 518, and a text box 520 to enter an access password, if required by document originator 144 of network 190. The GUI screen 510 may also indicate the parameters of access as shown at 522 of screen 510, a thumbnail view or preview of the data file in its native application at 224, and whether saving has been permitted by the originator, indicated at 526. The recipient of the server-supported application hyperlink may then open the document on server 142 of virtual network 190 of FIG. 4 by executing the Open button 528 of GUI screen 510. Downloading or saving to local machine may be effected by GUI button 530, when enabled by the document originator at machine 144 in FIG. 4. An alternate implementation of a suitable GUI is depicted in FIG. 5b with corresponding elements labeled.

In a representative embodiment of the present invention, an application hyperlink may be used to implement an intellectual property and confidentiality protection program within an organization, providing an effective enterprise-level system for the control and management of Intellectual Property and other sensitive information, for example, employee records, medical records, or other information the access to which must be controlled or monitored. Under the application link made possible by the present invention, and according to an additional embodiment, a file control system is implemented by which no file, sometimes referred to generically here as a "document," ever enters or leaves an organization without permission. In this embodiment, all internal documents or files are stored in on a central server, and possibly encrypted. Accordingly, the native files are not resident anywhere in the organization on local computers, and, if encrypted, would be unintelligible if accessed directly. Users can fully interact with the documents via thin clients on their local computers.

The authorized AppLink accesses may be monitored and logged, making it possible to determine at any later time whether any accesses were improper in themselves, or were indicative of prohibited behavior or misconduct as part of a pattern of access. This may be referred to as "prohibitive monitoring". In addition, "encouragement monitoring" may be effected, by which all accesses can be reviewed to ensure employees have read critical documents such as SOP manuals, policy manuals and procedures, and the like. In a preferred embodiment, not merely the fact of a document or file access is monitored, but because the screen view sent to a remote terminal may be monitored, a log may specifically track whether each relevant portion of a file was displayed for an amount of time consistent with the document being read. The application link of the present invention may also provide a document management and/or archiving system, by which all documents on the central server can be cataloged and searched by author, title, keywords, file numbers, or other relevant fields entered for each document.

In addition to the control of sensitive documents vis-à-vis employees, the application link of the present invention is preferably implemented in a manner by which the document control, e.g. as part of an IP management system, is extended to outside parties such as contractors or investors. Accordingly, in a preferred embodiment of the present invention, the application link is paired with an application link e-mail gateway to external parties. The application link e-mail gateway is preferably implemented to interface with several popular e-mail, or SMTP applications, e.g., Microsoft Exchange. The gateway is preferably configured to be consistent with both outgoing and incoming e-mails. The gateway according to the present invention may effect security functions in both outgoing and incoming e-mail. With regard to incoming mail, as depicted in the process flow of FIG. 27, preferably all attachments 2702 contained in e-mails 2701 are intercepted by the application link e-mail gateway 2703 and stored to a central server 2704. Ingoing message attachments are scanned for possible viruses. A dynamically created AppLink, which could be a URL, pointing to the attachment file on the server is inserted into the e-mail. The e-mail (without the attachment) is then forwarded to the recipient. To view and interact with the attachment via thin client, the recipient clicks on the AppLink and the attachment file is opened in a compatible server-based application.

For outgoing messages, the file security level is retrieved from the file metadata, as discussed above, and the appropriate restrictions are added to the application link. The recipient clicks on the application link hyperlink and the file is opened with the proper server-based application from the application link e-mail gateway server. The recipient then interacts with the file via thin client. The present invention assures that no files enter or leave an organization without authorization or central control. This is because external users accessing an application link only receive screenshots of the file and application. The file itself never leaves the corporate network, or preferably, the central server itself. Preferably, the application links are created automatically, so that end users do not have to change their behavior (e.g., with regard to sending attachments), and the centralized control afforded by the present invention cannot be defeated. As discussed above, access restrictions and application functionality restrictions can be created automatically based upon the file security level contained in the file metadata. This security level may, in turn, be tied to the sender's or recipient's job title or security clearance, in addition to file-specific criteria. Where multiple restriction criteria apply, the most restrictive choice can be made. For example, normally a document might have minimal restrictions, but because it is being sent to a potential competitor, access is severely limited.

The central file control afforded by the present invention may be used to effect internal IP control and document control. According to the present invention, an organization or individual may implement document security in a centralized manner. All sensitive files may be stored on one or more central servers. When accessing files, users click on a hyperlink to open the document in the proper application. Each user may be granted a security clearance level, for example, based upon rank, position, department, or other criteria. In addition to the user security level, each file preferably will also have a security level. The combination of the file security level and user security clearance level determine which files are available and the user's level of access. For example the user may or may not be able to edit, save, save as, print, copy, or the like, depending on their access. Similar security classifications may also be effected at the directory, or "folder" level. Directories of the files that are available, based upon the user's security clearance level or department, may be made available to the sending party, or the recipient or accessing party, to determine the files that the recipient may link to. Therefore, the invention will preferably provide for storage navigation tools, e.g., a file manager or the like.

Preferably, in the event that a recipient does not have proper security classification for a document they are sent, a workflow component would be available for users to request increased access rights to a document from the sender or from another party with a suitable higher clearance level, for example, a supervisor or administrator.

In a preferred embodiment, efficient document searching is provided by an indexing system. Thus, the document library on the central server would be indexed so that a document may be searched by author, title, keywords, the permitted actions per security level, and the like. The documents in turn may be cataloged by similar or corresponding fields.

In a file distribution system according to the present invention, no files are ever stored on a user's PC or network access device. Instead, users of the AppLink Document Library only receive decrypted screenshots of the file and application. The file itself is never stored on their network access device/PC. This is linked with a dynamic security model determined by combination of file security level and user security clearance level.

According to one embodiment of the present invention, the Document Library utility tracks all accesses of documents. All accesses, both internal and external, may be logged to create an audit trail, e.g., in the event of misconduct. This may also be used, for example, to ensure that employees read critical documents, or at least that the documents were accessed for an amount of time that would admit of reading the document. For example, it could ensure that all aircraft mechanics read the latest aircraft maintenance policies and releases.

For those files and applications for which the user's security admits, files and their native applications can be accessed by a central corporate office, a remote office, employees working from home, and traveling employees. In all cases, full security and encryption measures are in effect, which can be tracked and confirmed, and it may be ensured that derivative copies are not created. In a preferred embodiment, it is also possible that the "Save As" functionality of an application will not allow the user to create a new file, e.g., a document, that will have less restrictive security applications per user security level than the parent file.

Because the central server is the repository for all files in their native format, all files stored on the central server can be encrypted. In addition, all data, such as files, applications, and screen views of the remotely running application, that are delivered over the network to users can be encrypted. Delivery of files and applications over the network can be accomplished via a middleware environment comprising a middleware web-enabling application, e.g., Tarantella or Citrix, and application servers. Preferably, end-users receive primarily or solely, the screen shots of the document and application, the application executing on a central server. The AppLink security mechanism will interface with existing security approaches including existing or future encryption methods, such as PKI, 3DES, AES, or the like. These encryption methods may be symmetric or asymmetric. The AppLink security will also preferably be compatible with various user authentication or validation methods, including but not limited to passphrases, smart cards, token, fingerprint, retinal scan, or other biometric data.

Each file has metadata associated with it that specifies the security level of the file. Each user, in turn, has a specified clearance level. The file security level and the user clearance level interact or are compared in order to determine the user's access and privileges with the individual file. Applicable application functionality restrictions may include the following: read/write, read-only, no printing, no editing, no copying, or various other restriction on application functions as applied to the particular file. The restrictions may also be event or time-based, e.g., there may be a restriction that a user may access the file a certain number of times, view until a particular date. The access may also be based on the access location of a remote user, e.g. a user may only access the file from a certain IP address or modem phone number, or conversely, may NOT access the file from certain IP addresses or phone numbers. This may prevent unauthorized access when authentication information is compromised, or during a duress situation, or to prevent applications from being used in countries where export laws prohibit use. In addition to business applications, allowing implementing organizations to ensure the confidentiality of internal or client projects, the present invention also admits of certain military and government applications. For example, the present invention may be used to prevent cases of espionage, or the unauthorized access or downloading of files in excess of one's authority. As another example, documents may be securely maintained on a central server, thus eliminating the problem of a stolen or misplaced laptop, for example, compromising the security of documents on the laptop. In the healthcare arena, the present invention may be used to implement the patient data protections mandated by the HIPAA statute and regulations. Data may be viewed securely by authorized users, without allowing the viewing, downloading, or further transmission of unauthorized patient information, thus aiding in compliance with regulations governing the security of individually-identifiable patient information.

The AppLink system according to the present invention provides for the creation of an application file hyperlink, which links a remote file and a compatible server-based application, generates a link to the remote file/application combination, and delivers files via server-based applications to a broad range of recipients of the link, including recipients unknown to the sender. Preferably, this access to the remote resources may be provided to other users, particularly remote users, with no registration or sign-up required of the recipient of the AppLink. According to the present invention, this provides a means of communication based on the application and file delivery method.

AppLink allows the delivery of files and applications to a much broader range of recipients than a normal ASP model which requires recipients to be members of or subscribers to a service. AppLink extends the utility of e-mail and the web to software applications. That is, AppLink makes it as easy to send an application and a file as it is to send a standard SMTP e-mail, or publish a web page. In contrast to application provision of the prior art, the present invention provides a new way to communicate by combining the following elements: An application file hyperlink, or AppLink, is created to a file which, when activated by a recipient, is loaded into a server-based application and presented to the recipient via a thin-client interface. In this manner, the file remains on the server, and control of the file is maintained by the sender. There is no need on the part of the participant to share compatible applications. This is in contrast to e-mail attachments of the prior art, in which the recipient needs a compatible application on a local computer in order to open the file. In addition to controlling the capabilities of the recipient with regard to file access and modification, usage of the file can be tracked by the sender. In addition, the present invention admits of a static AppLink even when the document is changed. In other words, the file can be changed at will by the sender, even after sending the AppLink, and the recipient will always see the latest version. An attendant benefit of the present invention is that the recipient of the AppLink is not exposed to a computer virus danger, because the application is running on a remote computer. Only the thin client is running locally. This thin client will preferably be either an installed program, or a "signed" Java™ applet, wherein a central authority certifies the applet's safety and authenticity. A further benefit of the AppLink according to the present invention is that the recipient can immediately work with the file without waiting for the file to download, because the subject file remains on the server. This is of particular benefit when files are very large, and the recipient is using a relatively low-bandwidth connections, say 56 Kbytes/second. According to the present invention, a recipient could be working with the file in seconds after receiving and executing the AppLink. The AppLink also avoids size restrictions that may be imposed on attachments, and generally may be expected in many instances to reduce strain on networks through smaller e-mail payloads, particularly public networks such as the Internet that may suffer from "tragedy of the commons" inefficiencies. Using AppLink, most files can stay where they are in large part. Therefore, the transmission of the entire file is unnecessary and is accordingly eliminated.

Furthermore, the platform, operating system, or resident applications of the recipient machine are immaterial. The recipient 120 of FIG. 1 could be running on a mainframe, a Unix server, a Microsoft Windows server, or other machine with a compatible thin client. Because all that is required on the recipient's machine is the relatively limited processing power required to run the thin client, the recipient may have virtual access to a relatively vast amount of processing capability—the application could be running on various configurations, for example, a mainframe, e.g., 134c of FIG. 1, parallel multiprocessor machine, or Unix cluster supercomputer. In fact, preferably both the sender of an AppLink 114 and the recipient 120 may create or execute the AppLink using a networked device with relatively meager computing power, e.g., a Web or Internet appliance device, Personal Digital Assistant, Television Set-Top Box for cable or satellite television, or any other network-connected or other computing device capable of data communication.

FIG. 7 is a depiction of the temporal process in the creation of an application link according to an embodiment of the present invention. A typical AppLink "life-cycle" 710 according to a representative embodiment of the present invention is depicted in FIG. 7, and may proceed as follows beginning with AppLink creation 712: The file to be linked must be identified by the AppLink sender, herein referred to as the AppLink creator 114. FIG. 8 is a depiction of the data flows relating to part of the creation of an application link according to one embodiment of the present invention. Various potential systems admitting of AppLink creation are depicted in FIG. 8. AppLink creation paths are depicted generally at 810. This may be, for example, the owner of the file, or another party with designated rights permitting distribution of the file to others. The application that will open the file must be identified by the AppLink Server. A unique AppLink identifier giving the network location of the AppLink data, for example, a URL or network location, must be generated. The AppLink data would include, at a minimum, the file location. It could also include information about compatible applications, or that could be determined by a software algorithm at the time of AppLink activation. At this time, as depicted in the process flow diagram 30a at 3001, the creator may be prompted for recipient file access and modification permissions, and may select a default permissions set according to or derived from the creator's permissions to the file, or according to the creator's personal preference default AppLink permissions. The creator may be prompted to specify limits on duration at 3006 and 154, or accesses to the file at 3005 and 153. The AppLink properties may include restrictions on all recipients, or on specific recipients. It could include restrictions on Recipient Session parameters, such as a limit on the number of accesses by a specific recipient; a time limit on any single or a single access session, a limit on identified recipient individual session time, or a limit on identified recipient total multisession time. Alternatively, the AppLink automatic termination may be based on AppLink Termination Criteria, such as an AppLink termination date; a termination time period; a total number of accesses reached; or termination if another server-recognizable event occurs. Similarly, AppLink usage tracking criteria may be designated and activated. Settable AppLink properties pertaining to access tracking may include, but are not limited to, recordation and/or notification of: each individual access or given number of accesses; the ID data of each accessor; the time of access of one recipient or the consolidated or average access time of a group of recipients; the AppLink session time; the file access and/or manipulation details; or the interaction playback of a recipient session.

Settable AppLink properties may alternatively, or in addition, be defined in terms of, or depend upon, Recipient Identification Options or Requirements. For example, prior to AppLink access, either at the point of thin client polling, thin client delivery, or file access via the AppLink and Application Server, Recipient identification may be required and/or tested, and the AppLink session may be terminated if identification fails. Suitable identification requirements include, but are not limited to, requirement of a digital signature, for example, that is tested against a certificate authority; requirement of a specific IP address set or prohibition of an IP address set, which may be down to any level of decimal bit or octet specificity, or of network or host specificity; requirement of a password, which may be linked to a user name; requirement of http authentication; or requiring an e-mail address and receipt of a confirming e-mail.

Figure 9:
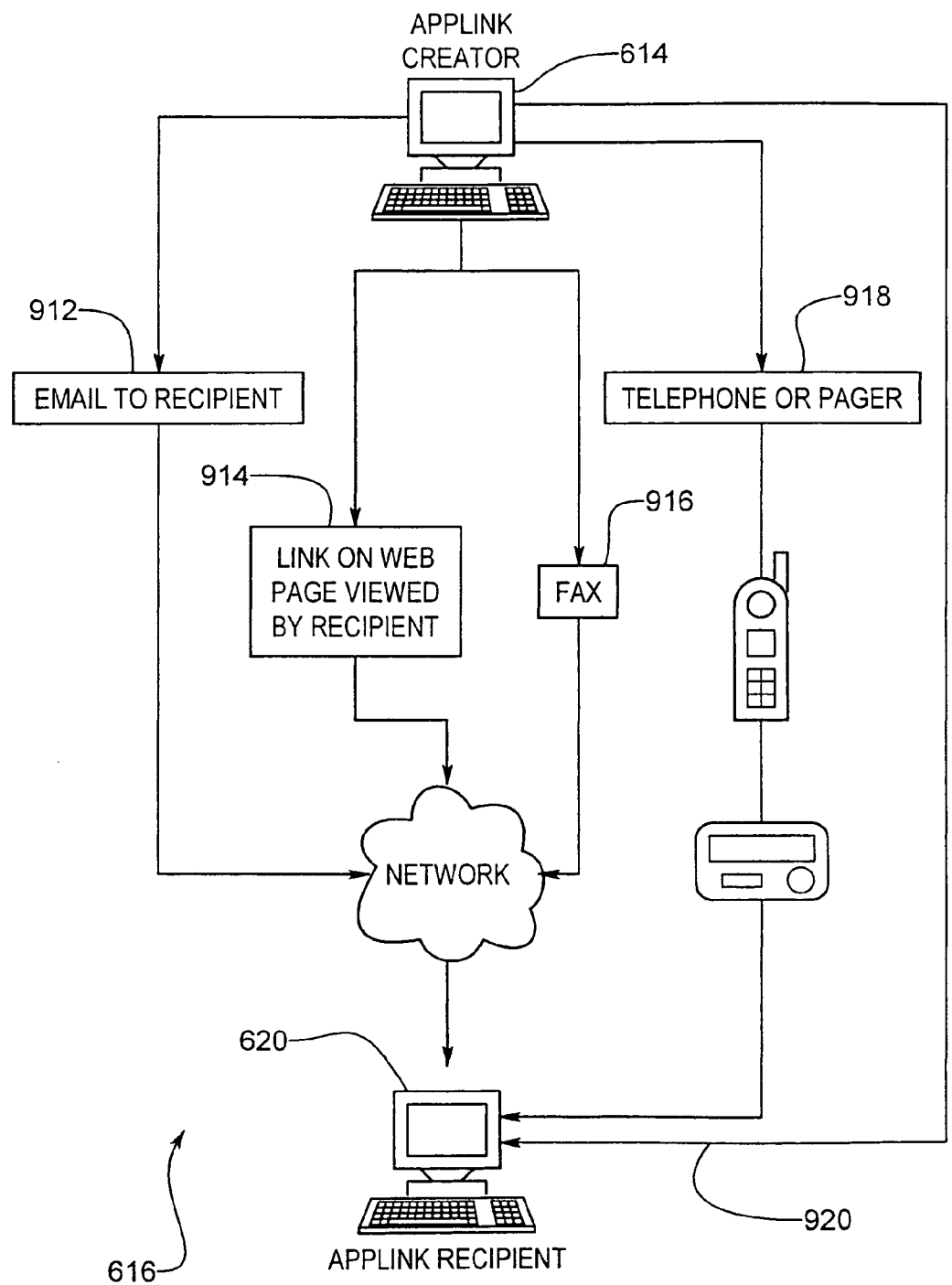
FIG. 9 is a depiction of the data flows relating to the transmission of an application link according to one embodiment of the present invention.

FIG. 9 is a depiction of the data flows relating to the transmission of an application link according to one embodiment of the present invention. Following the creation 712 of the AppLink as described above, the AppLink network location, or URL, can be communicated as shown at 116 to a recipient 120 by, for example, and as detailed in FIG. 9, including it in an e-mail 912, i.e., an SMTP transmission, such as in an e-mail either as a hyperlink or hyperlinked graphic, or embedding it in a web page 914, e.g., providing a hyperlink or hyperlinked graphic within a web page viewable by the recipient. Other ways in which the AppLink may be transmitted to a recipient include communicating it via fax 916, a POTS telephone message or page 918 or face-to-face conversation, or any other means of communication 920, including surface mail, media broadcast or dedicated line. The user interface for creation of the AppLink is preferably implemented as a web-based form generated by the AppLink Server depicted in FIGS. 3 and 3b above. Returning to FIG. 8, this web-based form 812 is used to communicate with the AppLink Server 102. Alternatively, a native program 814 capable of creating and/or receiving and viewing AppLinks may be resident and executed on the sender's local computer 114, as a part of an e-mail program, as a web browser plug-in 816 or a standard feature built into the browser, or as a component of the sender's local computer operating system. More broadly, the AppLink creator can use various means to communicate with the AppLink Server and create the AppLink. The recipient's thin-client can be made accessible to the recipient in various ways. A Java Applet or other download-and-run program could be downloaded just before use if the recipient does not yet have a compatible thin client available on his local computer. A software company may want to make a thin client an intrinsic part of a web browser or operating system, as shown at 818, in order to help ensure that its thin client design enjoys wide currency. A company might want to make the thin client a part of the circuitry of the client computing device for performance purposes, also helping to ensure that it cannot be easily changed by the user to the thin client offered by another company.

Figure 10:
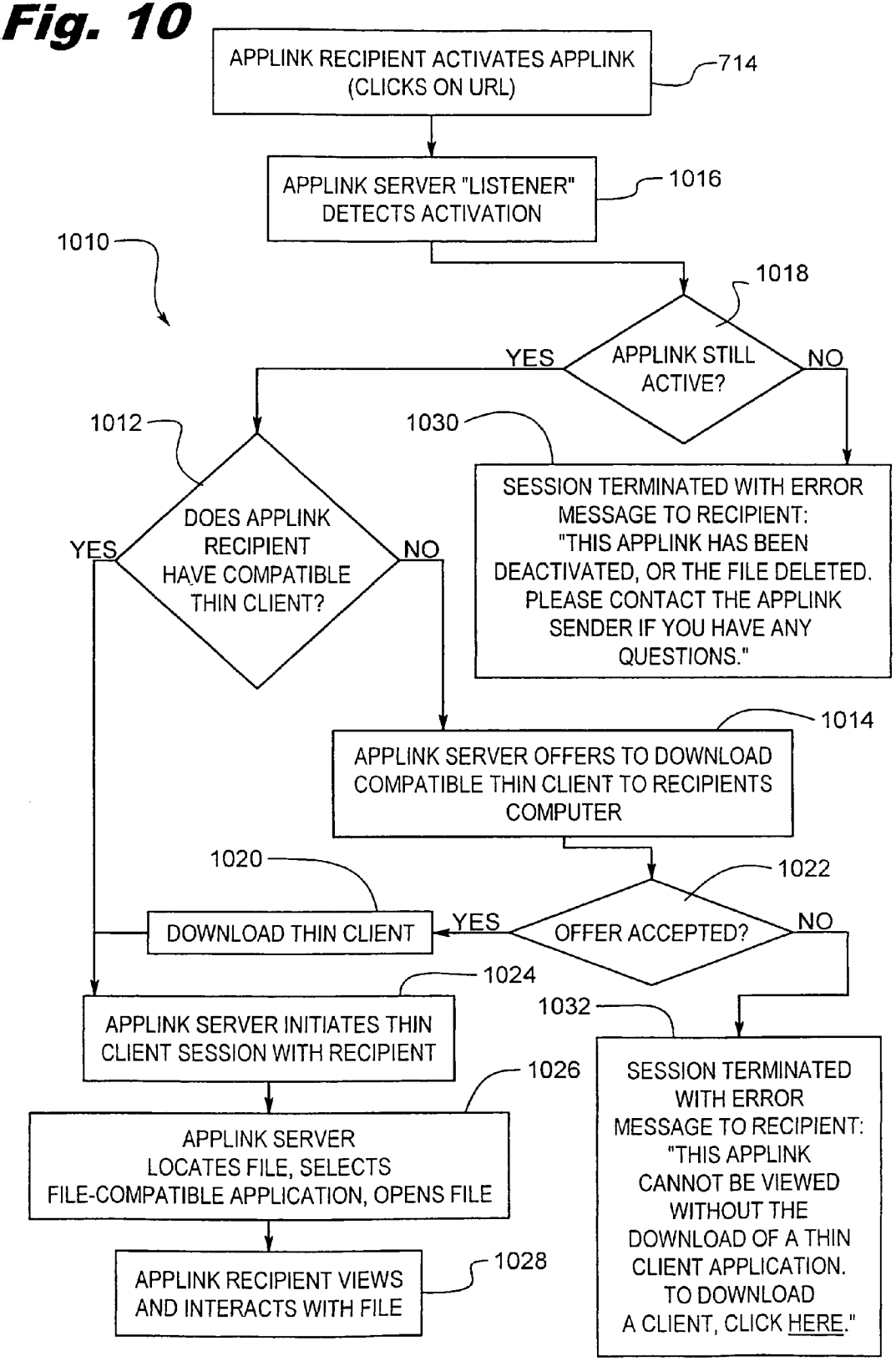
FIG. 10 is a depiction of the process flows relating to part of activation of an application link according to one embodiment of the present invention.

The AppLink executable may also be implemented over the operating system kernel as a component or feature of the operating system. At the recipient's end, the thin client may be implemented as, for example, a Java Applet or other program downloaded just before first use. Alternatively, the executable may be an installed native program optimized for or at least compatible with the user's operating system. The thin client may even be implemented as a feature, utility, or shell included with a computer's operating system. In an alternative embodiment that may be expected to increase the efficiency of the AppLink thin-client, and reduce overhead and make the thin-client nature of the file more transparent, the thin-client may be implemented in hardware on the recipient's computer 120. This may be expected to provide an optimized and very fast thin client. The thin client may also be implemented in multiple concurrent ways, preferably designed to be selected according to performance priority rules or user preferences as depicted in FIG. 10, at 1010, and in FIG. 10b. FIG. 10 is a depiction of the process flows relating to part of activation of an application link according to one embodiment of the present invention. FIG. 10b is a depiction of the process flows relating to another part of the activation of an application link according to one embodiment of the present invention. For example, the AppLink Server could look first, at 1012, for a compatible hardware implementation of the thin client in the recipient's computer, then for one embedded in the operating system, 1012a then for a native application 1012b for one embedded into the web browser 1012c, or as a web browser plug-in 1012d, then for one installed as a signed Java Applet 1012e. If it found none of these, it could initiate a download of a Java Applet Thin Client to the recipient's local computer at 1014. Alternatively, an AppLink Server might select a thin client based on the creator's restrictions on recipient capabilities. For example, an AppLink Server might download and use a Java thin client which has capability "toggles" as described in another embodiment of this invention, rather than use an already-installed native client which cannot be restricted.

Figure 11A:
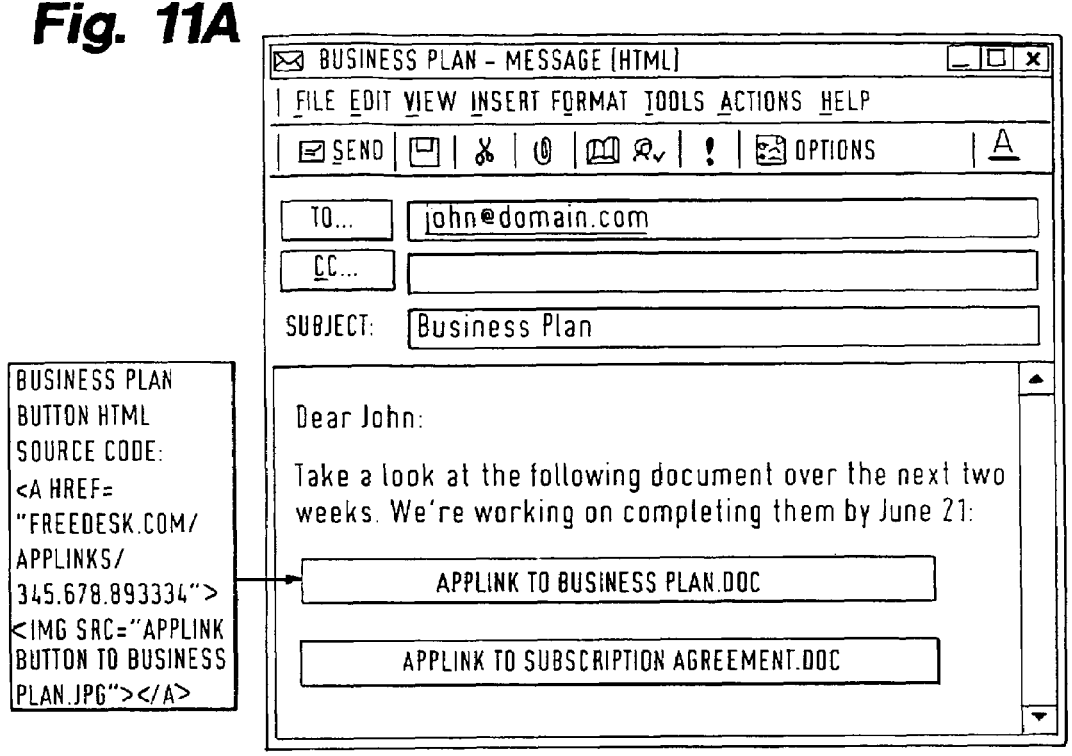
FIG. 11a is a depiction of a screen view relating to the transmission of an application link according to one embodiment of the present invention.
Figure 11B:
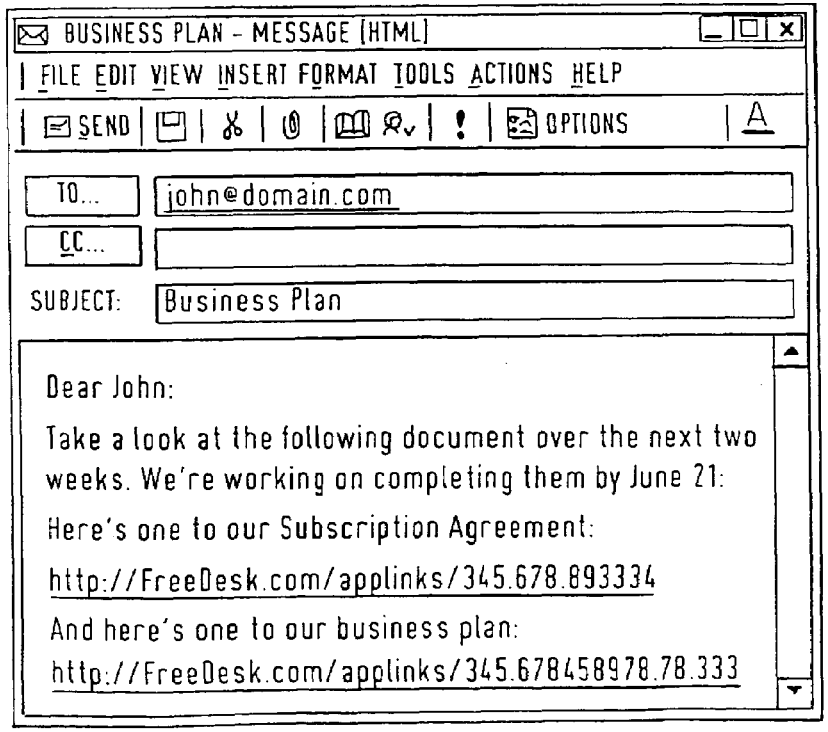
FIG. 11b is a depiction of a screen view relating to an alternate manner of transmission of an application link according to one embodiment of the present invention.

The recipient of an AppLink such as that of the alternative e-mail formats of FIGS. 11a and 11b, following reception, must activate or execute the link at 714, for example, if the link is a URL, by clicking on it with a cursor or otherwise executing the link, e.g., by pasting it into a browser target address field. The AppLink Server must detect the link activation at 1016, and after confirming that the AppLink is active 1018 poll the recipient's device at 1012 to detect whether a compatible thin-client application, applet, or other executable is resident on the recipient's computer. If not, a compatible thin client will be downloaded 1020, for example, after prompting for authorization and target directory from the recipient at 1022. The AppLink server will then initiate at 1024 a thin client session with recipient 120. The AppLink Server may then itself, or may direct an Application Server also remote from the recipient, to open a file-compatible application, and open the file in the application at 1026. The recipient will interact at 1028 with the file through the application user interface, as presented graphically to the recipient by the thin client executable.

The AppLink may be terminated in several ways at 1030. For example, as mentioned, automatic termination criteria could have been established by the AppLink creator, such as a specified duration. The AppLink could be deactivated by the creator at any time, or the AppLinked file could be moved, deleted, or destroyed. Following termination, a recipient clicking on an inactive AppLink may, according to the preferences of the creator, be presented with an explanatory "AppLink Not Active" message, perhaps giving reasons or expiration information if specified or authorized by the creator, rather than an unadorned 404 or similarly uninformative error.

FIG. 11a is a depiction of a screen view relating to the transmission of an application link according to one embodiment of the present invention. FIG. 11b is a depiction of a screen view relating to an alternate manner of transmission of an application link according to one embodiment of the present invention. In a preferred embodiment, a system is provided for managing and tracking the accesses to an AppLink. For example, a log of AppLink access data could be kept by the AppLink server. This may preferably be reviewed by the creator at any time, or made available according to the subscription level of the creator.

Preferably, a system according to the present invention may provide an interface to change an AppLink's permissions at any time after creation, for example, by extending a "drop-dead" time. FIG. 36 is a depiction of a user interface screen capture relating to an unavailable link according to an embodiment of the present invention.

Following termination, a recipient clicking on an inactive AppLink may, according to the preferences of the creator, be presented with an explanatory "AppLink Not Active" message as depicted in FIG. 36, perhaps giving reasons or expiration information if specified or authorized by the creator, rather than an unadorned 404 or similarly uninformative error.

Figure 12:
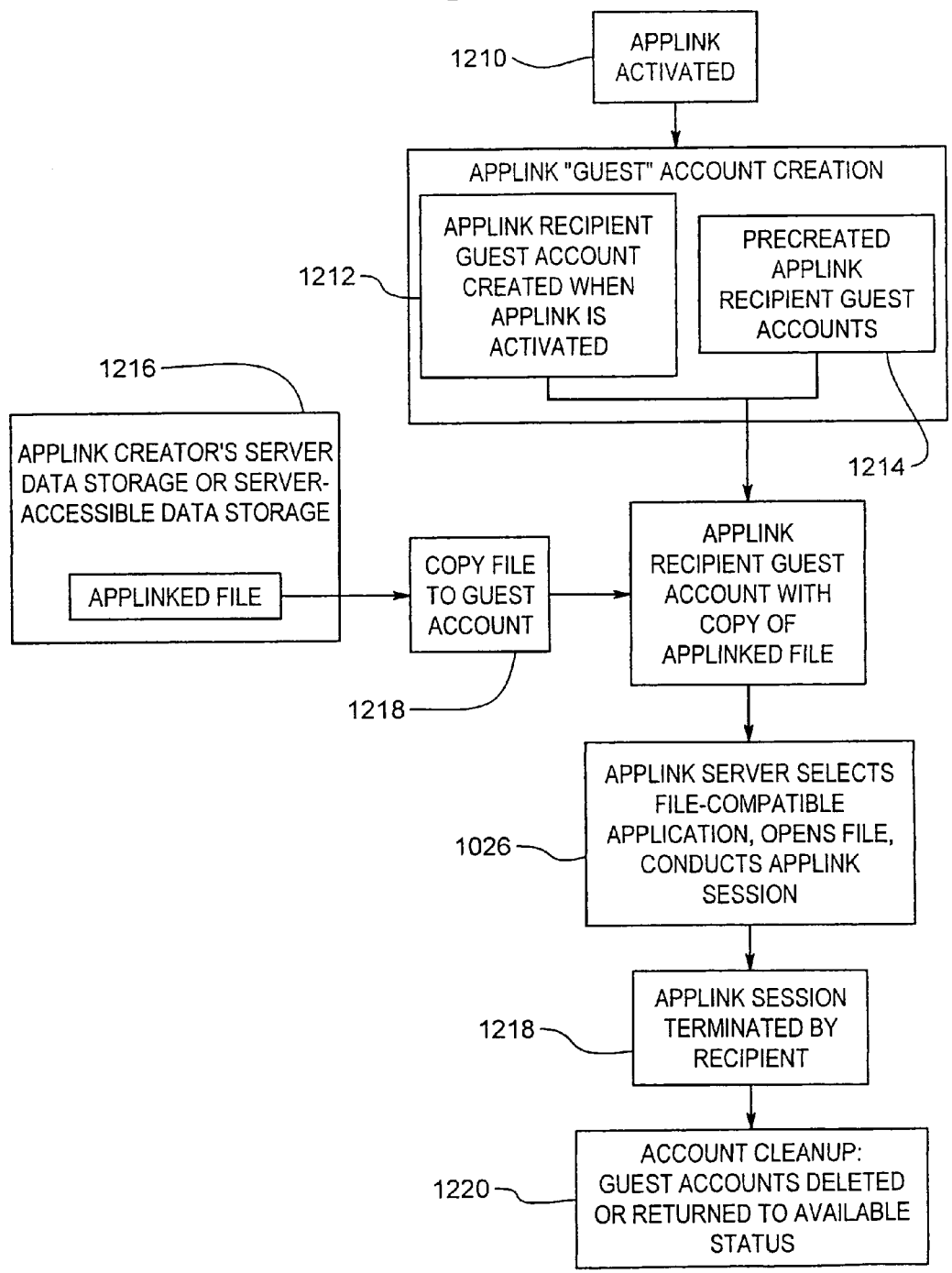
FIG. 12 is a depiction of a process flow relating to the creation of a guest account for access to application link according to one embodiment of the present invention.
Figure 29:
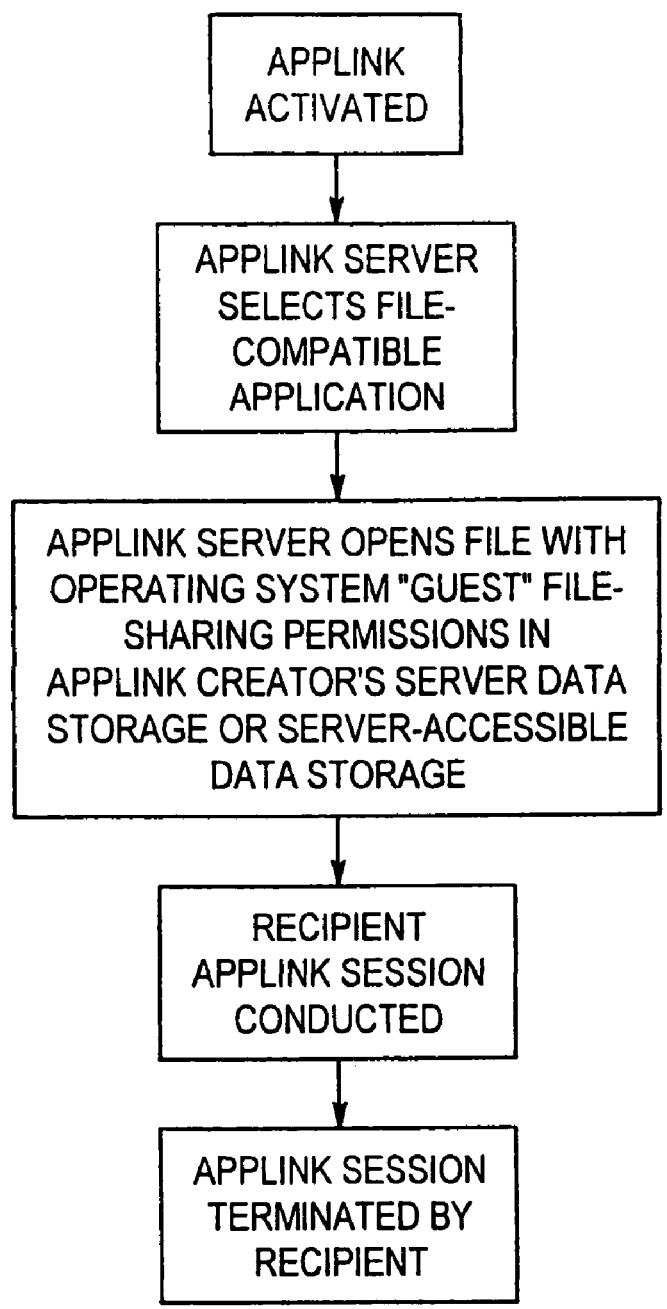
FIG. 29 is a process flow diagram depicting the opening of an application/file hyperlink in the sender's online file system, according to one embodiment of the present invention.

FIG. 12 is a depiction of a process flow relating to the creation of a guest account for access to application link according to one embodiment of the present invention. As depicted in FIG. 12, the recipient of an AppLink will preferably be granted access to a temporary guest account created upon execution of the AppLink at 1212, following AppLink execution 1210. Alternatively, multiple guest account may be created in advance and assigned to specific AppLinks as they are activated. The AppLinked file may be copied from server-accessible storage at 1216 into the guest account 1218, and a compatible application may then open the copied file in the guest account. The creation of guest accounts for AppLink recipients may be expected to create a more secure system than the alternative of opening the AppLinked file within the account of the sender, with restrictive "guest" file access permissions, as depicted in FIG. 29, although this alternative can be advantageous for collaboration since it facilitates the AppLink sender viewing a document altered by a recipient, because it is contained in his account's readily accessible data storage. Since AppLinks can be transmitted to a broad range of recipients, some of whom might not be known to the sender or particularly trusted, security is vital. Accessing an AppLink with a "dummy" user account rather than directly from the AppLink creator's account (with file access restrictions, of course), the damage which an unscrupulous, "hacker" AppLink recipient could do may be restricted. For example, there would be no way for such a recipient to access or delete other files contained in an AppLink sender's service account. The temporary guest account may be automatically deleted 1220 upon termination of the session 1222.

Figure 13:
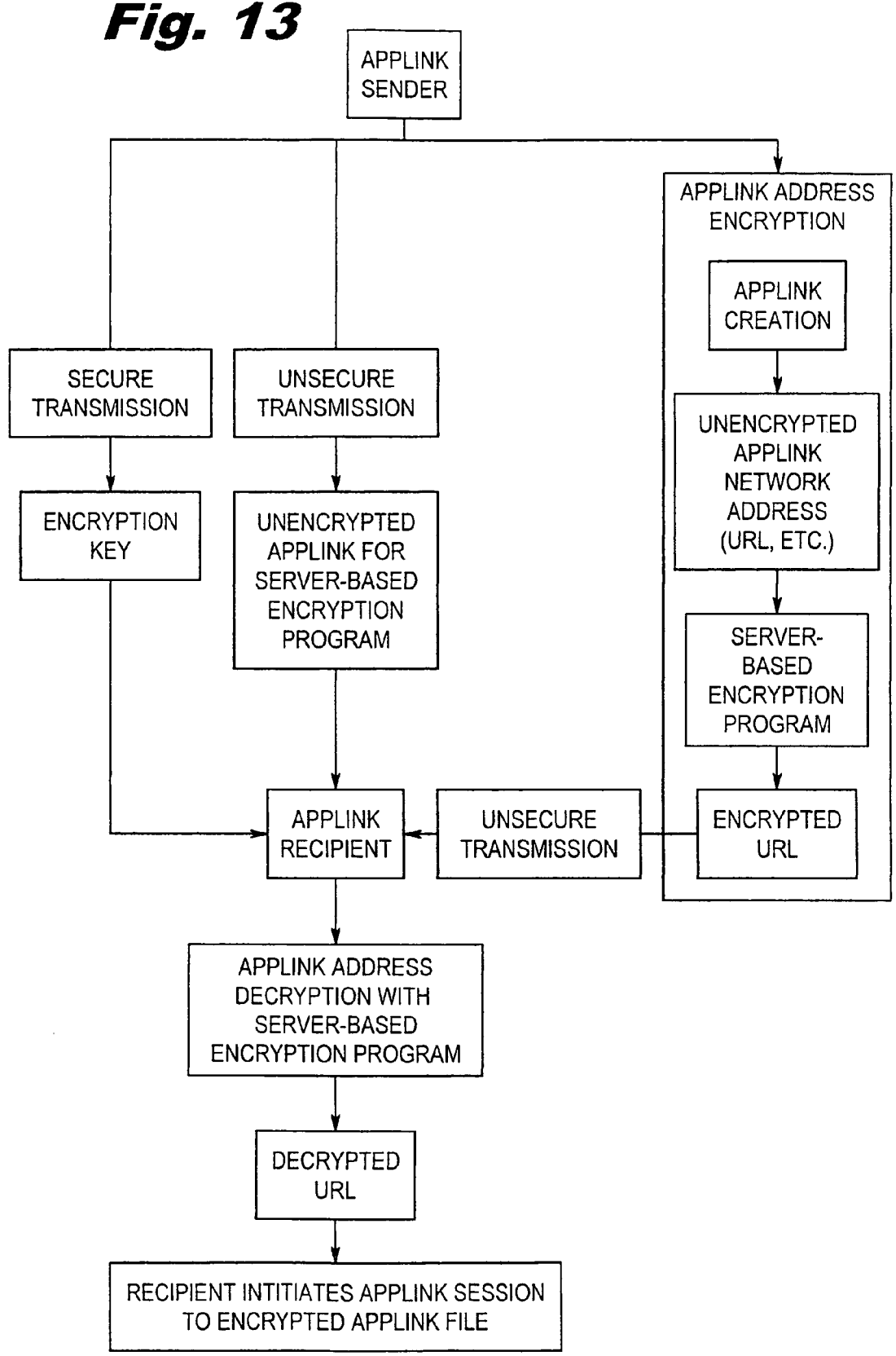
FIG. 13 is a depiction of process flows relating to the encrypted transmission of an application link according to one embodiment of the present invention.

A system implementing the present invention will also preferably permit encryption of the AppLink locator link prior to transmission to the recipient. In fact, the AppLinked program may itself be an encryption/decryption program. A suitable scheme for implementation of encryption is shown in FIG. 13. FIG. 13 is a depiction of process flows relating to the encrypted transmission of an application link according to one embodiment of the present invention. This would allow various items to be encrypted prior to being sent to the recipient. A recipient could be sent the encryption program URL, plus a password to access the encryption program, and/or a key to decrypt and encrypt files with the AppLinked encryption program. Then the recipient could be sent multiple encrypted files either as an AppLink to an encryption program that has file access to encrypted files, or as an e-mail attachment or via FTP, and could use the AppLinked encryption program to decrypt and view the files. Or the recipient could be sent encrypted AppLink URLs or AppLink passwords, and could use the AppLinked encryption program to decrypt the AppLink or AppLink passwords. In this manner, the present invention allows a single insecure transmission of a password to the recipient, who could then use it to decrypt and view files or AppLink URLs or AppLink passwords. The earlier described advantages of the present invention accrue to this embodiment as well, i.e., ensuring that the file is compatible with the program. In this case, both the decryption program and the program used to view an encrypted file are assured to be compatible with the encrypted file.

The present invention may also be implemented via an AppLink creator's own Internet-connected computer, with the creator's machine performing the functions of an AppLink Server and Application Server. In order for this implementation to be transparent to the recipient, this computer will preferably remain connected to the network at all times. Accordingly, ISPs and website hosting services, as well as entities or individuals maintaining their own internet servers, may in many cases implement this capability almost immediately. In the situation in which an AppLink incorporates a file not resident on the AppLink Server, e.g., the file is stored on a different Network-connected computer or data storage device than the AppLink Server, the AppLink Server preferably will record the location of the file at the time the AppLink is created, and will use a system to open it from that location, or it will upload a copy of the file to the AppLink Server. Preferably, an Application Server must be able to access the file being AppLinked in order to open and run it within an appropriate server-based application. If it is not stored on server-accessible data storage, the file must be capable of being opened from its current location, or uploaded onto the Application Server prior to the file being loaded into the AppLink application.

While in a representative embodiment of the subject invention, an AppLink is provided to a particular file native to an application, the present invention also permits of an AppLink to a specific application program rather than to a particular file. An AppLink to an application would allow the recipient to use the server-based application to create a new file, or just try it out, perhaps as part of an application demonstration. When combined with some sort of "Metafile System", this would allow a user to aggregate applications together regardless of their source, perhaps from different vendors.

A single AppLink may be hyperlink to a number of different files, such as a group of files relevant to a project. Suitable ways of implementing a multiple file AppLink include but are not limited to the following: A multi-file AppLink could simply bring the recipient to a web page that then has multiple links, one for each file. The recipient would then click on each individual link to view each file. Alternatively, a multi-file AppLink would open each file in its own application window all at once when it is activated. In yet another embodiment, depicted in the flow diagram of FIG. 28, a computer GUI "desktop" style interface is sent, rather than a particular file. The desktop-style work area may contain links to the relevant files within that GUI desktop. The linked "Computer GUI Desktop" work area 2808, could be, for example, a Windows Desktop or a Linux Gnome or Linux KDE Desktop. In a more specific embodiment, the AppLink Server may link to a web-enabled "Computer GUI Desktop" which contains access links to a specific file or files and to file-compatible applications, the AppLink is a link to one or more files in a Desktop. This embodiment of sending a file or files within a GUI desktop makes possible links that would otherwise be impracticable. For example, with some programs, such as Adobe Photoshop™ or the Linux GIMP image editing program, the program works with multiple windows, which can be minimized, moved, and resized, and serve various specialized functions, for example as tool and color palettes. Multiple windows cannot readily be web-enabled by existing web-enabling applications. Also, those web-enabling applications have some limitations on window sizes. For example, the Tarantella™ web-enabling application does not have infinitely resizable application windows for Microsoft Windows applications; it is limited to fixed, preset application window sizes (such as 800×100) as set by the Tarantella administrator. However, if Tarantella is used to web-enable a GUI desktop, then within the desktop any application windows are infinitely resizable. Also, all the advantages of a GUI desktop then become available to an AppLink recipient. For example, the Linux Gnome or KDE desktop has "virtual desktops," which extend the working area of the user's screen up to 32-fold. An application that is web-enabled directly, rather than within a GUI desktop, will typically have a working area limited to the application window size.

Figure 28:
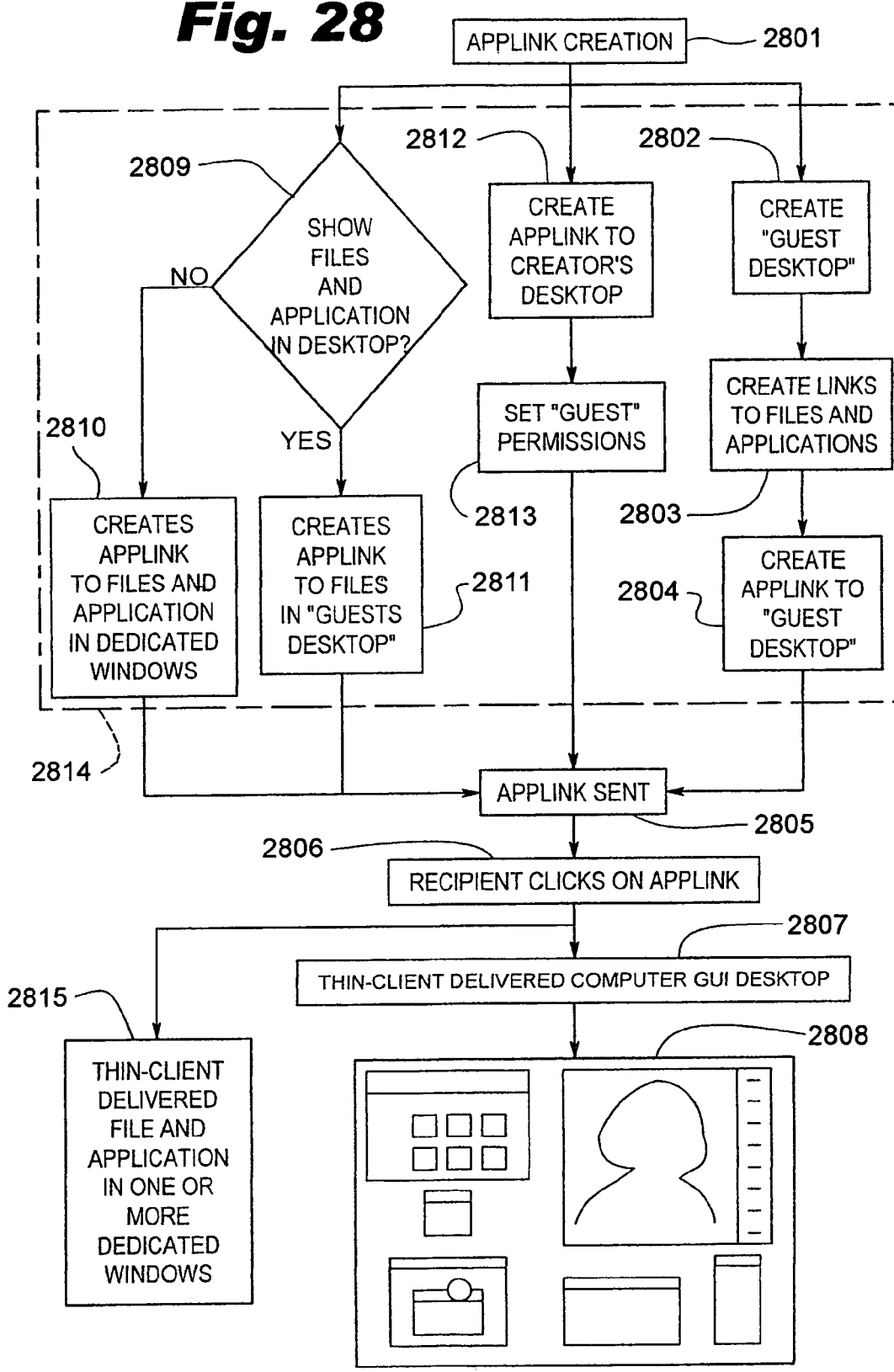
FIG. 28 is a process flow diagram depicting the creation of an application-file link interface according to one embodiment of the present invention.

In FIG. 28, at an appropriate point in the AppLink creation process 2801, the creator is presented with choices on how to present the files and applications. As indicated by 2802, he may create a completely new "guest" desktop 2808, or use one that he has already created. Such a guest desktop will have a completely separate data storage account, but one that the AppLink creator may populate by moving or copying files to and adding links to applications, as in 2803. He may then create an actual AppLink or network address or URL at 2804. Yet another alternative approach is shown in 2812, which is tantamount to giving a user access to your entire computer desktop, but with restricted permissions 2813, for example read-write permission only on the file the AppLink creator wishes to collaborate on, and no read permission for any other file. Alternatively, after deciding that a file or series of files would be best presented to a recipient in a guest desktop 2809, the AppLink creator may want to have the guest desktop automatically created for him, as shown in 2811. Or he may decide that a simpler "multiple file AppLink" 2810 would be more appropriate, wherein each file is presented to the user in a dedicated application window 2815. After the creator has decided on a method of file and application presentation, the AppLink is transmitted 2805, and the recipient clicks on it 2806. The AppLink Server starts running the appropriate GUI desktop in an application server, in this case a Linux server, since the desktop depicted 2808 is a Linux Gnome desktop. This desktop is delivered to the recipient via a thin client 2807. 2814 depicts the overall process of selecting the mode of file-application presentation.

In another embodiment of the present invention, the ability to create an AppLink to a computer "GUI Desktop" which is running on a remote application server allows that desktop to be used as a Web Portal Home Page, as shown in FIG. 33. This "GUI Desktop" 3301 could preferably include one of the open source Gnome or KDE desktops for Linux, since the required code is open to public access and free of charge, or one of the Microsoft Windows desktops (win 95, 98, Me, 2000, etc).

Personalized "home" pages, an example of which is shown in 3302, as generated by major web portals such as Yahoo™ have evolved over time to contain various features, including personalized news, weather, stock quotes, email, an instant messenger application, calendars, and file storage. These functions, although generally well designed, are limited by the functionality of the various web page languages such as HTML and JavaScript. If an entire web page refresh is not to occur every time a viewer initiates an action, JavaScript or it's equivalent must be written into the page itself to anticipate such an action and have instructions for generating a response. It is impossible to write into a web page with JavaScript the full functionality of a standard software application. Therefore, these web page functions are limited in functionality and poorly performing compared to native software applications. Also, generally a web page is a static thing, with the content unchanging until a user initiates a web page "refresh". With a (probably password-protected) AppLink to a computer's "GUI Desktop" work area, all of these limitations can be overcome. Applications can be fully-fledged programs, such as the Microsoft Outlook™ email program, rather than glorified web-based forms. Current events can be streamed to the user real-time by the program without refresh. Plus the Desktop can run major applications which have no HTML equivalent. The desktop can be customized by the user to a far greater extent than can the HTML version, as can be easily seen in FIG. 33.

Figure 14:
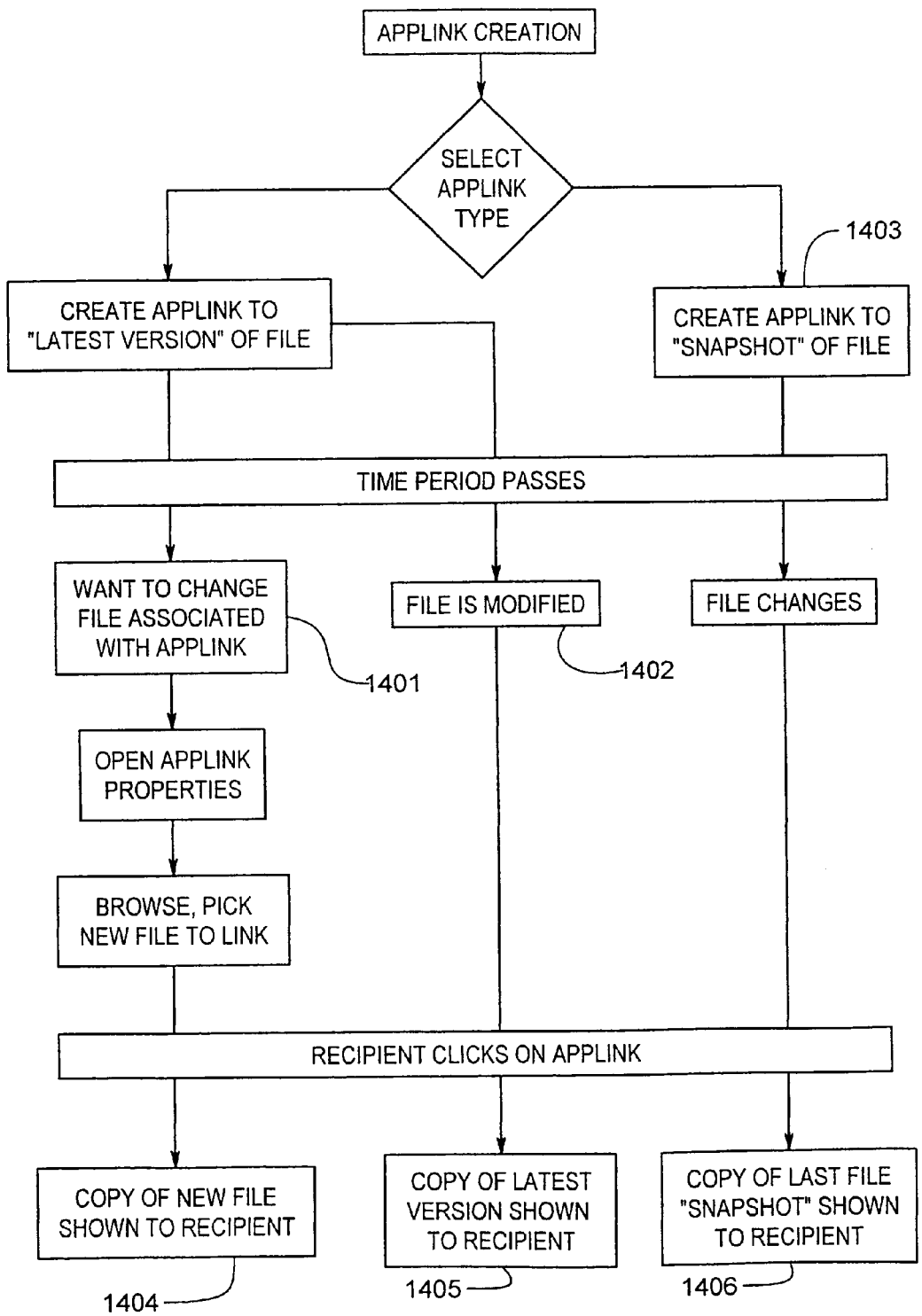
FIG. 14 is a depiction of process flows relating to dynamic changing of file accessed by an application link according to one embodiment of the present invention.

There will often be a need to change the document or file associated with an AppLink after the link is created. FIG. 14 is a depiction of process flows relating to dynamic changing of file accessed by an application link according to one embodiment of the present invention. Because the AppLink is server-based, it can be changed anytime, and the person viewing it always views the latest version. According to the instant invention, there are provided multiple ways to change the AppLinked file associated with a particular already-created AppLink, without changing the AppLink network address, exemplary ways being depicted in FIG. 14. One is to change the contents of the file without changing the file name, as shown by 1402 and 1405. Another is to change which file is associated with an AppLink after the AppLink has been created, i.e., a different file can be associated with a previously-generated AppLink URL or address after the AppLink has been created, as in 1401 and 1404. This would be useful when getting the AppLink into the hands of its intended recipients is expensive or time-consuming, or when the sender does not know who has received an AppLink.

Figure 15:
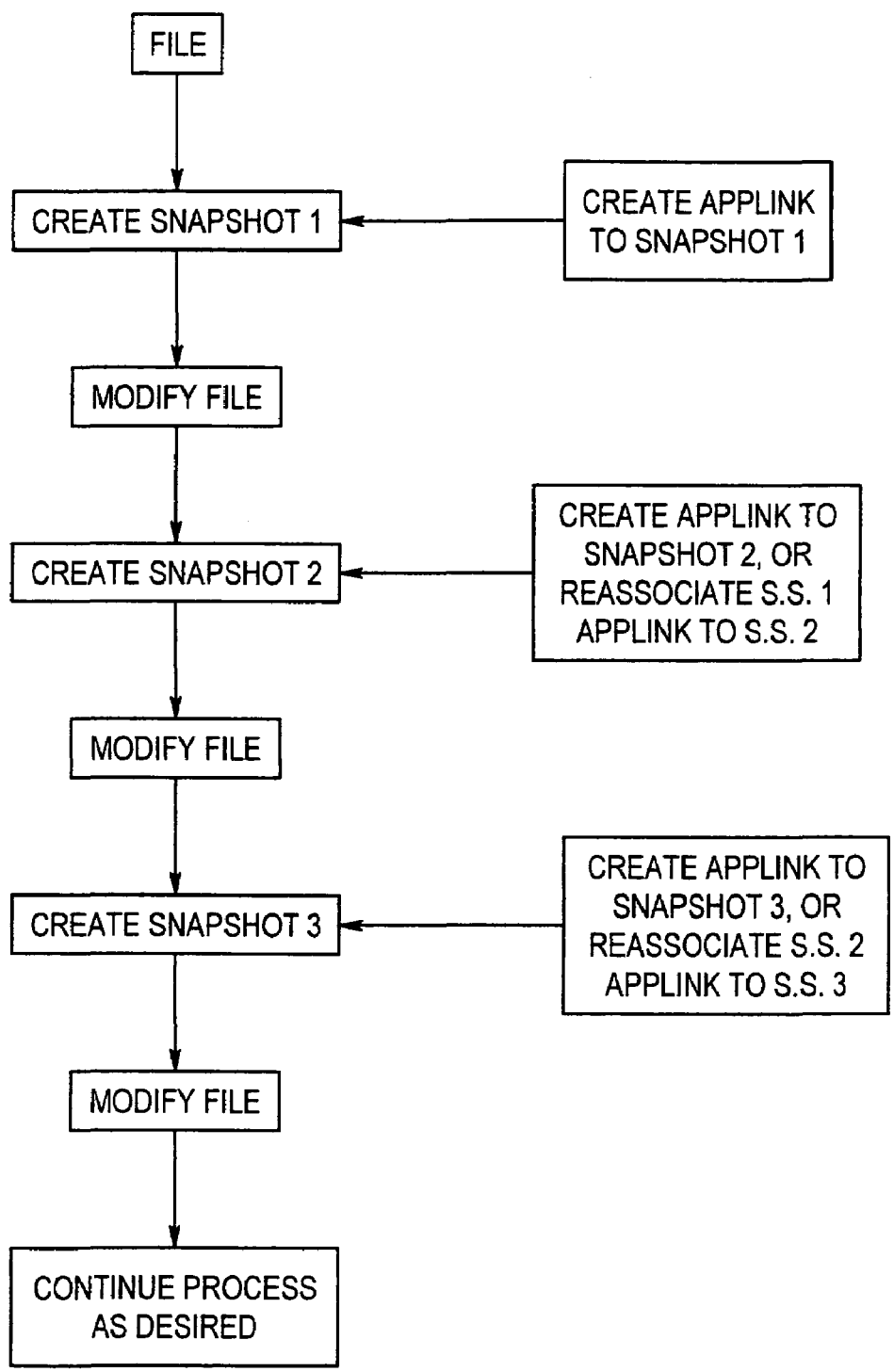
FIG. 15 is a depiction of a process flow relating to a file presented as static accessed by an application link according to an embodiment of the present invention.

An example of this would be the case where a number of people (unknown to the AppLink creator), after viewing an AppLink embedded in a web page, have added an AppLink URL to their web browser bookmark list. It would be impossible to send a new URL to these people. Similarly, a web-based newsletter publisher could send a single AppLink to his subscribers, instead of sending the subscribers a different AppLink every month. Each month he would associate that AppLink with a different document, that is, the latest newsletter, as depicted by 1401 in FIG. 14. He could cascade down the files associated with each AppLink, and label them accordingly. For example, the AppLink labels could be "current month's newsletter", "last month's newsletter", etc. In addition to dynamic file which can be accessed in their current state, the present invention also admits of a snapshot embodiment, by which a recipient may be presented with a file as it existed at a particular time in the past, even if the master file has been changed during that time. This embodiment is shown at 1403 and 1406, and is further depicted in FIG. 15. FIG. 15 is a depiction of a process flow relating to a file presented as static accessed by an application link according to an embodiment of the present invention.

Preferably, the AppLink utility of the present invention will provide settable variables, by which the AppLink sender or creator has the ability to set and change conditions associated with an AppLinked file (for example, file access and usage permissions), or any other variable (for example, the degree to which the AppLink usage will be monitored), for example, to facilitate protection of the AppLink creator's intellectual property (the AppLinked file). This ability to attach various conditions or enable various features for AppLinks is a central advantage that AppLinking has over other file transmission and access systems. The settable variables may depend on other criteria as well, by which any Settable AppLink Variable may be set and varied, for example, according to the specific identity of the recipient or the nature of the file, or whether the recipient is a member of a specific group of users, the recipient's location or country, as identified by his IP address, or any other relevant criteria. AppLink notification properties may be set as follows: The sender may be notified or not, and if notified, notification may be effected, for example, by e-mail/SMTP message, computer instant message, POTS call, voice mail, or pager alert. The notification may include access details as to recipient, access password used, time or occurrences of access, or the like.

AppLink restrictions on recipient actions may include the following: allow (or disallow) local printing; screen capture/print; local file save; AppLink server file save (modify base document); or allow/disallow local download. The settable variables may involve one or more of the following AppLink or file attributes, which may vary according to the degree of trust placed in the recipient, whether all recipients are known, the degree of sensitivity of the file, and the like. For example, variables may involve printing—the recipient may be allowed to print the file locally, in the case of a trusted recipient, or for an untrusted recipient, no printing is allowed. Similarly, the recipient may be allowed to use the "Print-Screen" capability of the local PC to print a screenshot of the file locally (trusted recipient) or not (untrusted recipient). The recipient may or may not be permitted to save the file locally or copy to a PC "clipboard" or similar memory utility. This ability to prevent saving and printing may be expected to enhance the ability of the AppLink creator to protect any intellectual property or security of the AppLinked file by restricting copying and redistribution. In addition to setting restrictions on local saving of the AppLinked file, the creator will also preferably be able to specify whether downloading to the recipient's machine is permitted. This may be distinguished from the saving variable discussed previously, i.e., saving from the server-based application. When downloading is enabled, a link to a simple file download utility may be permitted. Downloading a file and opening it with an application running on the AppLink recipient's local PC is for many purposes inconsistent with the AppLink system. However, this download option will ensure file accessibility, as a backup system, if the sender was uncertain about whether the recipient could operate the required thin-client, perhaps due to the recipient being behind an incompatible firewall, or the recipient possibly accessing the AppLink from a computing device that has no thin client support at the time. The download capability would ensure that the recipient would get the file, albeit at the cost of losing control of it, and losing the certainty of whether the recipient could open it in a compatible application. Therefore, the AppLink creator would have to balance the need to ensure the AppLink recipient gets access to a file with the requirement to retain control of a file. Naturally, this option would only be given to trusted AppLink recipients. Other variables include the capability to Save Changes onto the AppLink Server, i.e., whether the AppLink recipient may change the document permanently and save the changes on the server. This may be among the variable settings "read-write" permissions to a trusted recipient, or "read only" permissions to an untrusted recipient.

Figure 30B:
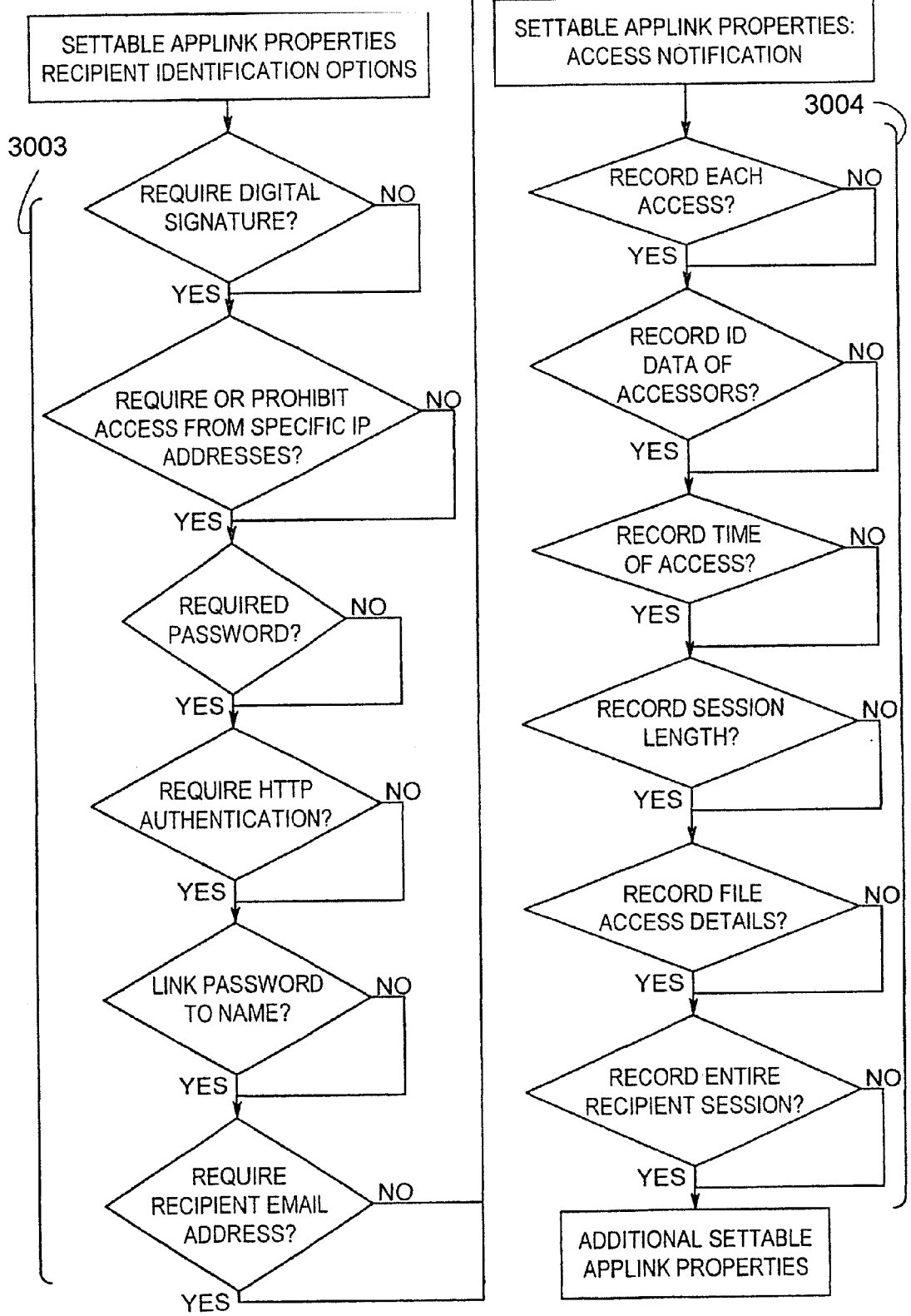
FIG. 30b is a process flow diagram depicting the setting of further application/file hyperlink properties, according to one embodiment of the present invention.

Restrictions and other characteristics associated with a particular AppLink as outlined above can be implemented at the time of AppLink creation or at any time thereafter via a series of AppLink "properties". As shown in FIG. 30, these options could be presented to the AppLink creator at the time of creation as a series of questions, as depicted for intellectual property protection 3001 and access notification 3002, and in FIG. 30b for recipient identification options 3003 and usage tracking 3004, and for recipient session limits 3005 and AppLink termination criteria 3006 in the flow diagram of FIG. 30c. At the conclusion of the property setting phase of AppLink creation, the process 4007 will record the results, associate them with the created AppLink, and continue the creation process.

AppLink properties would be set initially as a "best guess", probably most restrictive, configuration. The AppLink creator would modify these properties during the first creation process, and any modifications would then be implemented automatically for subsequent AppLinks. Additionally, the AppLink creator may modify the properties of existing AppLinks at any time.

Figure 16:
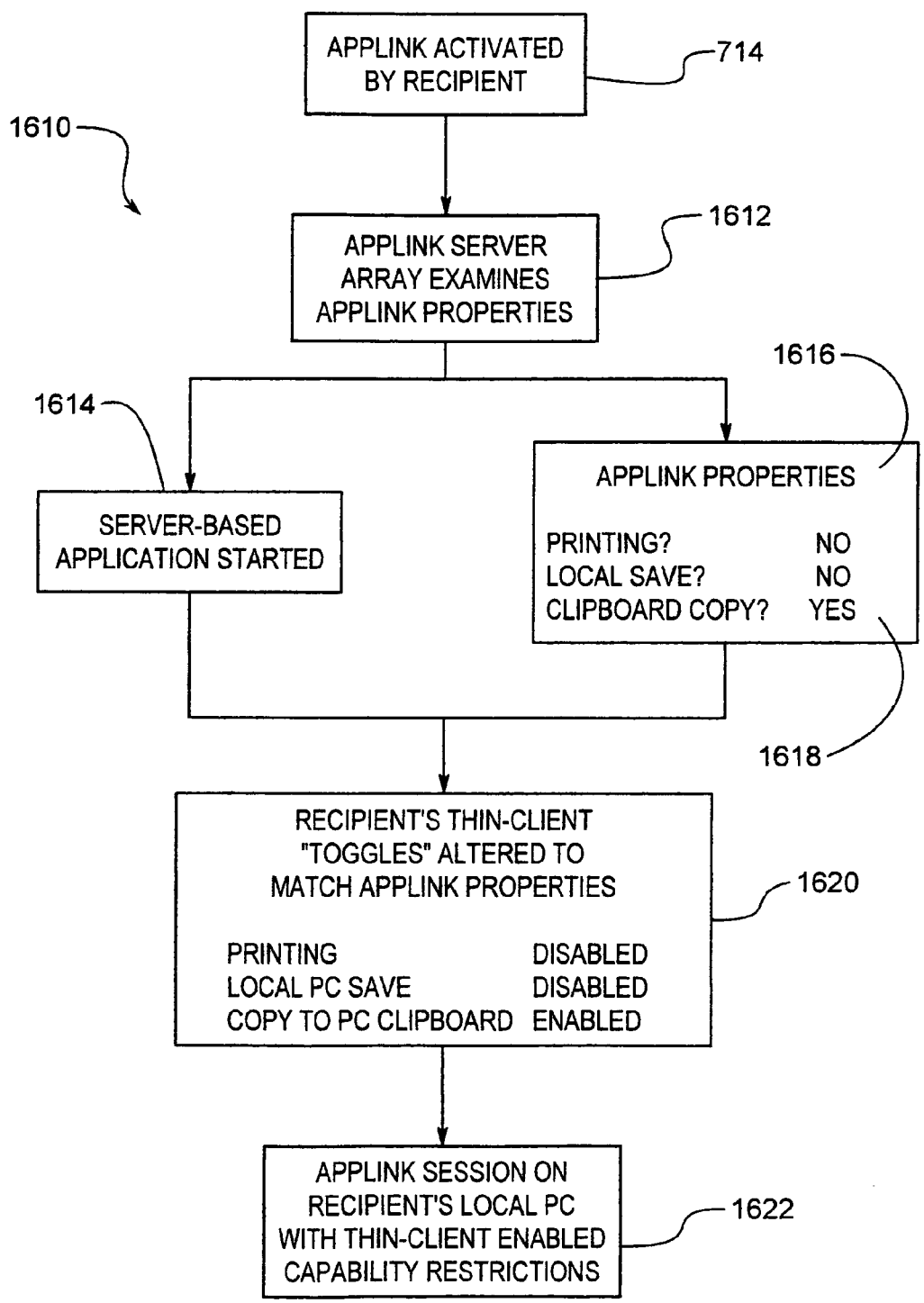
FIG. 16 is a depiction of process flows relating to the control of client capabilities for an application link according to one embodiment of the present invention.

A method to implement AppLink recipient restrictions may be provided which may be termed Thin-Client "Toggles," these are depicted in FIG. 16. FIG. 16 is a depiction of process flows relating to the control of client capabilities for an application link according to one embodiment of the present invention. This may be thought of as a "catch-all" access control variable. Because the thin client is the vehicle by which the application interacts with the AppLink recipient's local computer, some settable AppLink Variables, including recipient file permissions, can be done by building in APIs into the thin client termed "toggles" herein, which allow certain capabilities to be toggled on or off remotely by the AppLink Server. According to this variable, the thin client has built-in software "toggles" or APIs, which can be controlled remotely by the AppLink Server. These "toggles" control the recipient's local capabilities, including but not limited to the variables that have been discussed above, such as local file printing, save to local memory or "clipboard", save to local storage, or saving file changes onto the AppLink Server. Such toggles could be set by the AppLink server according to file permissions, recipient permissions, or both. These toggles may also be set or changed following the initial AppLink transmission, according to changed circumstances, by the AppLink creator. The toggle capability of an embodiment of the present invention is depicted in process flow diagram of FIG. 16, indicated generally at 1610. As shown, after an AppLink is activated 714 by the recipient, the AppLink server may examine the scheduled or specified properties of the AppLink at 1612. Following this assessment, the server-based application may be started on the Application Server as indicated at 1614. Approximately concurrently, the specific AppLink properties at 1616 are examined, in this instance that printing and local save will not be permitted, but a local memory "clipboard" copy will be permitted, indicated at 1618. The appropriate functions are then disabled, from the perspective of the user, as indicated at 1620, by acting on the recipient's thin client. The appropriate restrictions on the recipient user's capability are implemented in the thin-client environment, indicated at 1622.

As an alternative, the actual implementation of some settable AppLink Variables, including recipient file permissions, can be done through interacting with "toggles" or APIs to the on-line application that opens the file, as depicted generally in the flow diagram of FIG. 31. An AppLink is activated by the recipient 3101. The AppLink Server 3102 examines the AppLink properties 3103 or recipient properties for any restrictions on recipient access. If that application has no "print" capability, perhaps through deleting the "print" command from the file menu by activating a "no print" software "toggle", as shown in 3104, then the AppLink recipient cannot print locally as shown by 3106, even if the thin client 3105 otherwise has the capability to let the application do so. This is a very specific instance of the more general, "Application Interface Specified by File Metadata" embodiment. This is very similar to the flow for thin client "toggles".

As a third alternative, rather than changing the toggles of the thin client environment as at 3104, the toggles may be implemented so as to act on the Application Server directly. The thin client then functions normally with full functionality, and does not effect the disablement of any feature or function. Since the AppLink Server is the middleware that transmits data from the application servers to the thin client, a way to implement restrictions on AppLink recipient capability is to use the AppLink Server to not allow a prohibited function to be transmitted from the server-based application to the application or thin client.

Figure 17:
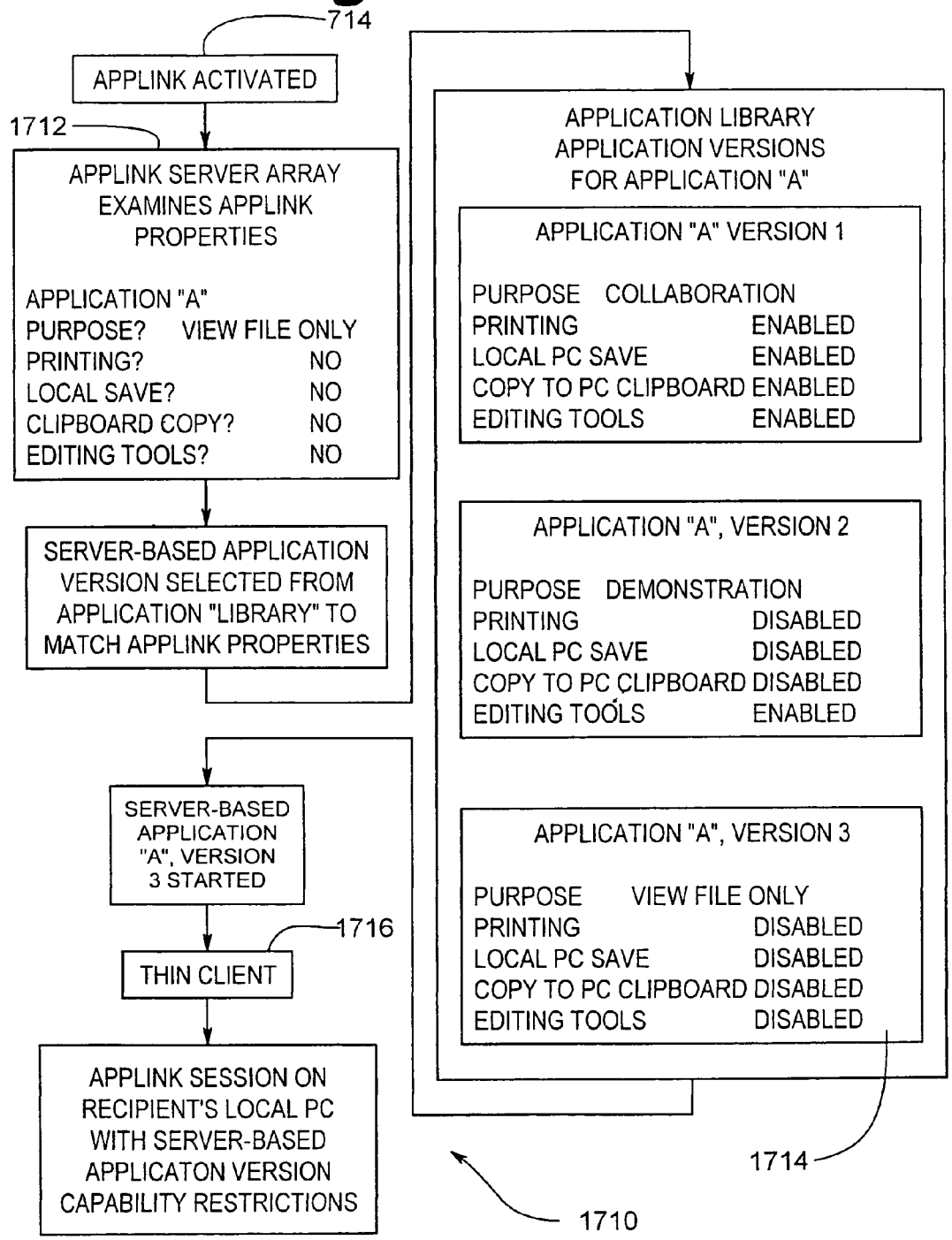
FIG. 17 is a depiction of process flows relating to an alternate manner of control of client capabilities for an application link according to one embodiment of the present invention.

In addition to application or thin client software capability "toggles", another way to achieve the same capability of limiting an AppLink recipient's file permissions is through Application Versioning, i.e., to create different versions of the application that have varying capabilities. FIG. 17 is a depiction of process flows relating to an alternate manner of control of client capabilities for an application link according to one embodiment of the present invention, showing a typical implementation of such a process. For example, if an AppLink recipient should not be able to print an AppLinked file, the specific thin client or application version downloaded would have this capability deleted. This procedure is indicated generally at 1710. The AppLink may call different versions of a thin client or on-line application which have varying capabilities for interacting with or manipulating a file. For example, application versions without certain key command menu items, such as "print", "save", or "copy" may be created prior to AppLink activation, and specified as the application that should be used to open the file upon AppLink use. For example, as depicted in FIG. 17, following activation of the AppLink at 714, the AppLink Server Array may examine the creator-specified AppLink properties at 1712. Based on these specifications, the server-based native application is selected that has functions corresponding to the specifications. In this example, native application "A" v. 3 is selected at 1714, which provides the appropriate functionality that the recipient can neither print, save locally, copy to the clipboard, or edit the file, per the specifications examined at 1712. The commands otherwise included in the application user interface may be "grayed out," or omitted entirely. The thin client passes on at 1716 all of the functionality provided by the application version selected at 1714, which in this case is limited. Similarly, specific Thin Client versions could be created that disable or omit the capability to print locally, or to access local storage of the AppLink recipient's local machine. The specific version of thin client or application (or both)

chosen by the AppLink Server to present an AppLinked file would be based on the AppLink recipient file permissions, as set by the AppLink creator.

If, due to changed circumstances, or otherwise at the discretion of the AppLink creator and/or file owner, it is desired to further restrict the access to a file associated with an already created and sent AppLink, the AppLink creator or sender can inactivate the AppLink after it has been sent. AppLink inactivation may also be done automatically, i.e., the creator or sender can have the AppLink Server inactivate an AppLink automatically according to an expiration condition or criteria. Example criteria might be, but are not limited to, the following: The passage of a specific time period, a specific date, a specific number of total accesses to an AppLink for all AppLink recipients or for a particular recipient, or the occurrence of some (any) event which can be recognized by the AppLink server, or which the AppLink server can be notified of via external input. The AppLink creator or sender may alternatively set a limit on AppLink file access time, either by individual session, in total, or both; for all AppLink recipients or for a particular recipient. For example, to protect intellectual property, the AppLink session could be limited in time, as shown in 3005, thus not providing the recipient with sufficient time to copy the information by hand. Normally, this limitation would be associated with allowing the recipient a single AppLink access, otherwise, the recipient could simply access the AppLink multiple times to allow sufficient access over several sessions. Or, if the total session time were limited, then the number of accesses would be irrelevant, since the time of access for each session would be added to that of previous sessions until the limit is reached.

According to the present invention, an AppLink is capable of being used in an anonymous mode, that is, unknown users can be given access to applications and files, as where an AppLink is published in a web page. However, because the AppLinked file remains on the AppLink server, using AppLinking for file transmission or communication can protect the sender's Intellectual Property or other confidential information (the AppLinked file) from being appropriated in unauthorized ways, IF it is combined with the ability to restrict access to an AppLinked file to authorized recipients. The authorized recipient could be identified by various systems 3003, including requiring entry of a recipient's name, a particular password, a digital signature, or an e-mail address that is authenticated to prevent spoofing. For example, after e-mail entry, a password could be e-mailed to the recipient's e-mail address to ensure that the e-mail address is valid. Similarly, a particular recipient could be restricted to accessing the AppLink from a particular IP address. An AppLink recipient may also be required to perform an action or give certain Sender-specified information via a web-based form or a server-based application (such as spreadsheet or database data entry template) in order to gain access to the AppLink. For example, the recipient may need to give their name and address, or authenticating information such as answers to specific questions posed by sender, as depicted 210 in FIG. 5b. This action or information entry may also be made optional by the AppLink creator.

While an AppLink is capable of being used in an anonymous mode, the AppLink sender may want to restrict access to a file to one or more particular individuals, and may want to track that individual's usage of a file. That recipient could be identified by giving the recipient a unique password, which is linked to the recipient's name by the AppLink Server. In one embodiment of the present invention, the AppLink creator may link a password to a particular entity, e.g., a natural person or company, etc., which then allows the sender to identify the use of the AppLink by that entity. When the password is used to access an AppLink, the user knows that it is probably the entity he sent the password to that has accessed the AppLink. For example, the AppLink sender associates the password "XXYY" to access a particular AppLink with John Smith. The sender then transmits the password to Mr. Smith. He associates the password "1122" to access the same AppLink with Mary Jones. Someone accesses the AppLink using password "XXYY". The sender can therefore be reasonably sure that it was Mr. Smith, even though the access was otherwise anonymous.

Other authentication methods may be implemented according to an embodiment of the present invention, as depicted at 3003 in FIG. 30b. For example, the recipient may enter a password to the AppLink Server prior to AppLink access via the HTTP authentication protocol. A Recipient Digital Signature may also be used, wherein a particular recipient must be identified by the AppLink Server by their valid and unrepudiated Digital Signature prior to AppLink access. Identification of an AppLink Recipient may also proceed by restricting access to an AppLink to certain recipient IP or IPv6 addresses, or other suitable network location indicia.

Figure 18A:
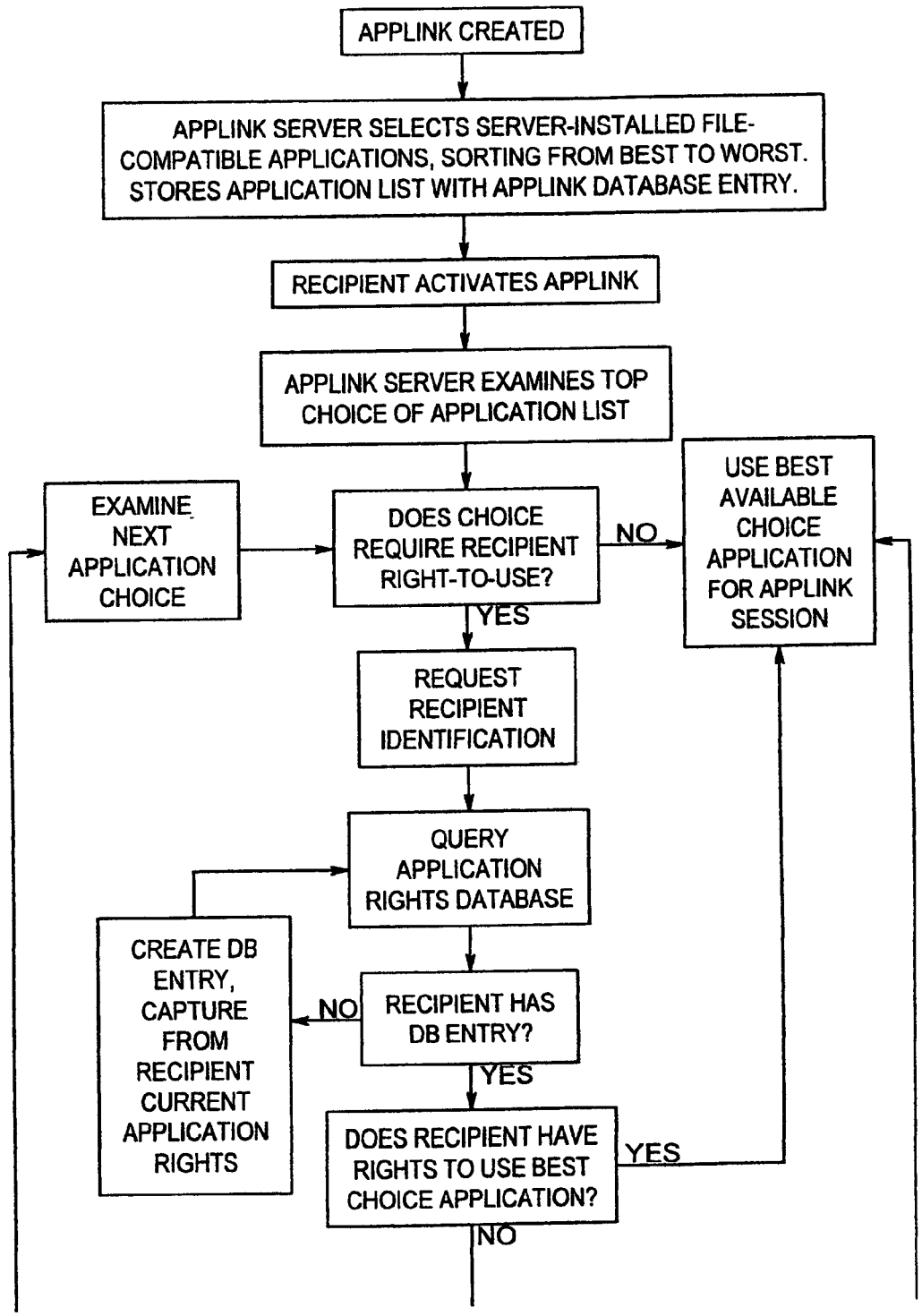
FIG. 18 is a process flow diagram for a software rights control system according to an embodiment of the present invention.
Figure 18B:
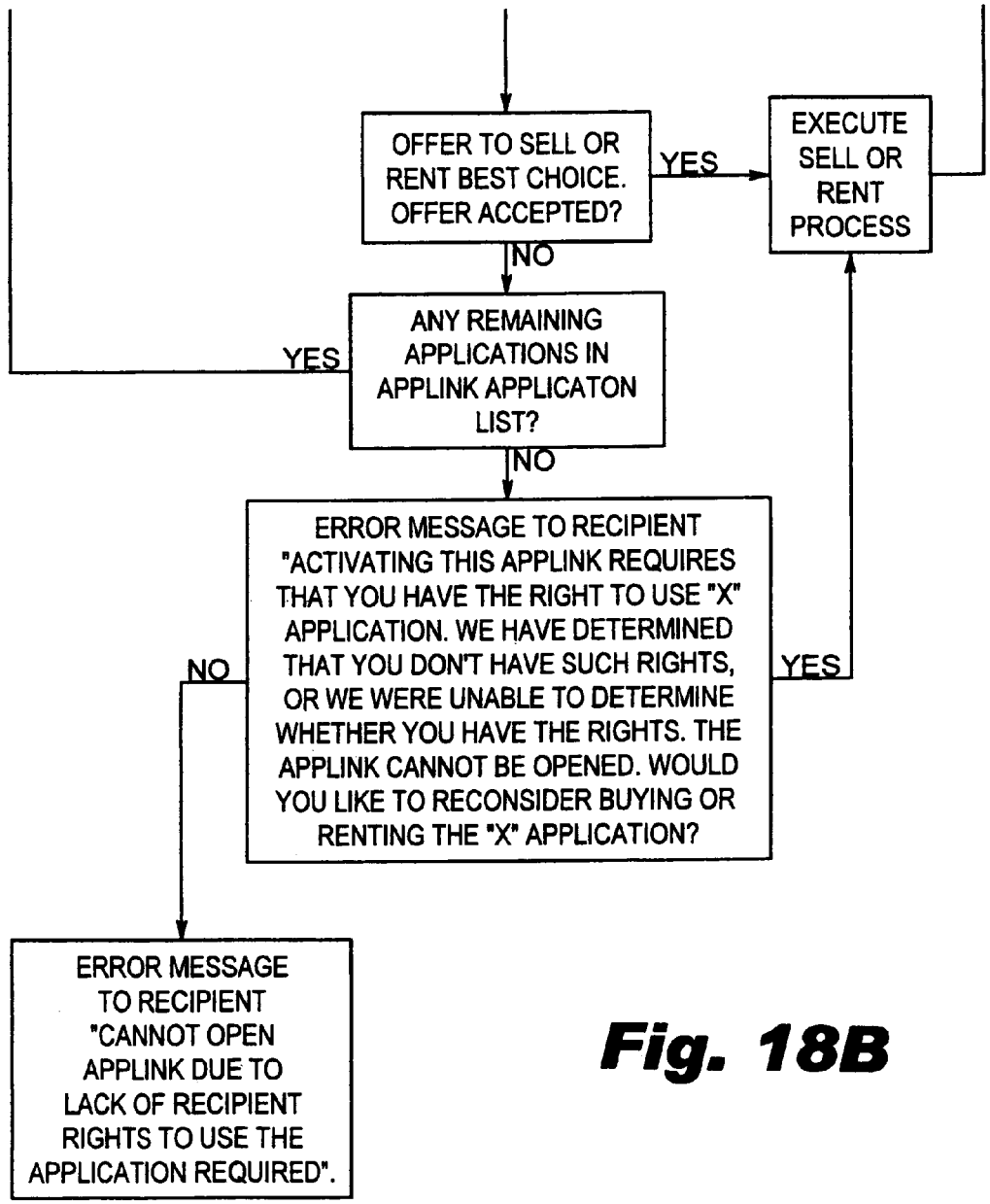

In an alternate embodiment, as depicted in FIG. 18, a software algorithm may be implemented to select the appropriate application to open a file within an AppLink, based on appropriate criteria, which could include but is not limited to: recipient ownership of application user rights to possible application choices; any license agreements for possible application choices including but not limited to end-user agreements and service provider agreements; and application file compatibility, or which file types possible application choices can open. When an AppLink is sent to a recipient, the selection of the server-based application to open the file depends on server-based application software license terms. Many end-user software license agreements contain the limitation that it cannot be used by more than one person at a time, thus losing potential sales. If a user sends an AppLink which requires an application which has such a license, one way to comply with that license provision is to ensure that the recipient has the right to use that application also. Before the application is presented to the recipient, if the algorithm had access to an AppLink recipient application rights database, as depicted in FIG. 18, it could be verified that the recipient owns or is renting the application or otherwise has rights to use the application. If the recipient did not have rights to use that application, the AppLink application selection algorithm could search for another application which had terms that allow that user to use the application. Such terms could include applications licensed by the application service provider on a "per seat" basis, that is, not assigning rights to individual users, but, for example, to a maximum number of simultaneous users, whose identity could change. The terms might include free "demo" licensing for AppLink recipients. Another type of application which might be considered by the algorithm could be an "Open Source" application which typically has a license permitting unrestricted use.

The algorithm could also consider other applications for which the recipient has rights, and which are compatible with the file being AppLinked, but not necessarily the application used by the AppLink sender to create the file ("native application"). As a lower priority, a compatible "viewer" application with appropriate licensing could be selected, with the limitation that the user may not be able to interact with the file to the degree that he could if a fully capable native file application were used. This embodiment of the present invention, by which licensing impacts application functionality, may be implemented in conjunction with a previously-discussed embodiment, by which various application versions have different functionality in order to effect file permission security. That is, licensing terms may give differing levels of functionality for different payments to the vendor or different circumstances. A "demonstration" license might require disabled functionality.

As an example, illustrative in that many possible file access avenues are explored, assume that a user "Joe" has created a flowchart with the Microsoft® Visio® for Windows® application. He creates an AppLink to the file and sends it to recipient "Larry". The selection algorithm would first see if Larry is on file with an Application License Tracking Database that the algorithm has access to. If Larry is found, the algorithm looks to see if he has rights to Visio, the application used to create the file. In the event that he does not, the algorithm looks to see if the Visio software vendor is perhaps allowing AppLink to be used to non-owners as a marketing mechanism. If the Visio vendor is not, the algorithm then looks for other applications that Larry owns or has rights to which are capable of opening the file. In the event that he has none, the algorithm then looks at applications that the application service provider has licensed on a per-seat basis that are file-compatible. If the ASP has none, the algorithm then looks at open source programs that the ASP has available to it to see if any are file-compatible. If none are, the algorithm then looks to see if the ASP has any less-capable "viewer"-type applications with appropriate licenses that could be used to at least display the file to the recipient. In the event that the ASP does have such a viewer, the algorithm selects it and the AppLink Server presents the file to Larry inside the viewer. As a further implementation of this license tracking function, a database may be provided for use by an AppLink Recipient Application Selection Algorithm as described above, which contains the software applications and license terms that an AppLink recipient has rights to. An AppLink Recipient Application Selection Algorithm according to the present invention could function without knowledge of the application rights of AppLink Recipients, but access to such a database would improve the performance of such an algorithm by increasing the number and quality of the choices available to it, ensuring that the optimal legal application is used for file access.

The Application Choices available to an AppLink Recipient may be enhanced according to an embodiment of the present invention: The AppLink Recipient Application Rights Database described above may be enhanced by way of a method to increase the number and quality of application choices available to an AppLink recipient as follows: When an AppLink recipient activates an AppLink, the AppLink Server determines the optimal application to open the file. Normally, the best choice for file compatibility and ability to interact with the file will be the native application, i.e., the application used in the creation of the file. However, if that application has restrictive, fully paid-up, perpetual "ownership" type licensing, that is, a recipient must legally own, rent, or be a licensee of, a copy of the application in order to use it, then there are several methods that could be used to allow the recipient to use that application to open the file. For example, it may be determined whether the recipient already has rights to use the application because he already has taken a license or is renting the application. This procedure would involve asking the AppLink recipient for identification information, and querying a database of users and their application permissions to see if there is an entry for the recipient.

If there is an entry for the recipient, it may be determined whether the recipient has rights to use the optimal AppLink application, which may typically be the native application. If so, the file may be opened in the optimal application. However, if there is no entry for the recipient, they may be notified that the optimal application to open the AppLink requires that he have rights to use it. The recipient is preferably informed as to which application is considered the optimal application. The recipient may then be prompted to enter application rights information into a database, which would typically include at least Recipient Identification information, and any suitable applications he has legal rights to use. Optionally it could include software ownership verification information such as product key codes, and, the duration of the product license or "rent" (a limited license term) period. If the recipient does enter this information, it may be confirmed whether the recipient in fact has rights to use the optimal AppLink application, by, for example, cross-checking a software vendor's database of registered application owners. If this information is confirmed, the file may be opened in the optimal application.

If, on the other hand, the recipient does not have rights to the optimal application, according to a preferred embodiment of the present invention, they may be presented with an offer to attain such rights, including offering to license the application to the recipient through sale or rental, preferably immediately to facilitate his opening the AppLink. "AppLink" application rental licenses could be provided, according to the participation of software application licensors, on a "fee per use," based on a session or duration basis.

In an additional embodiment of the subject invention, depicted in FIG. 30b at 3004, an AppLink may be used to minutely track file access in great detail. Since an AppLink is a server-based application, the server can record various details of AppLink access for later review. This is an advantage AppLink has over e-mail, where typically the sender does not know whether the e-mail has ever been read. There are receipt provisions in some e-mail programs, but this still does not tell the sender whether the e-mail has been read, or an attachment opened. In conjunction with the file access tracking functionality described above, the AppLink Server may record details of AppLink use for later review or analysis by the AppLink sender or creator. This may include, but is not limited to, whether the document has been opened, how long it stayed open, the time a viewer spent on each page, and in fact could record the recipient's entire session, including cursor or screen view or framing movement for later playback.

Figure 32:
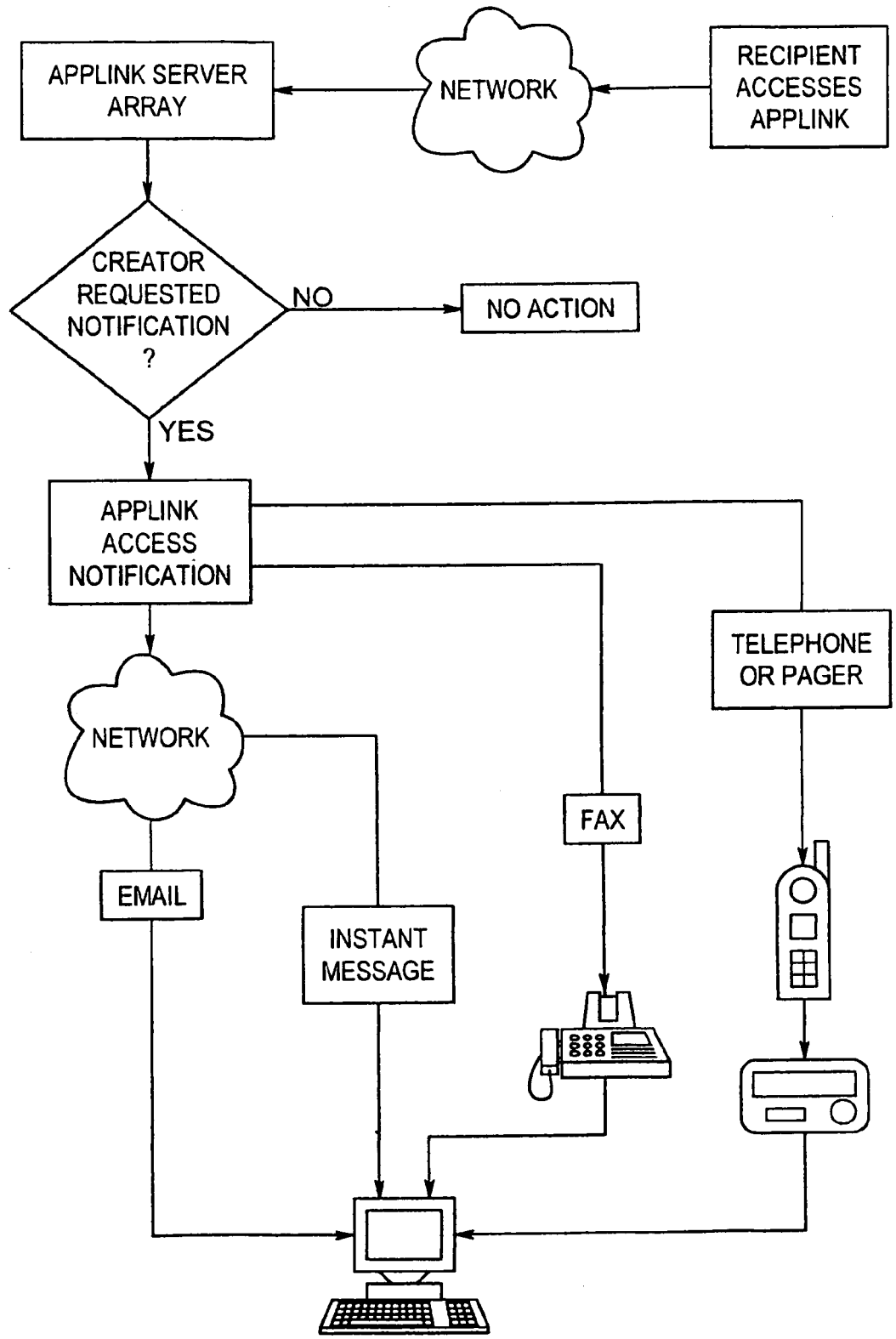
FIG. 32 is a process flow diagram depicting the notification to an application/file hyperlink creator or sender that the link has been activated, according to one embodiment of the present invention.

In a related embodiment, due to the server-based nature of the AppLink function, the sender may also be notified of AppLink Accesses via a notification of AppLink use to the AppLink sender or creator by some communications means e.g., SMTP e-mail, wireless pager, or telephone call, as depicted in the flow diagram of FIG. 32. Such notification could include any information item or combination of items about the access, including but not limited to who accessed it, when it was accessed, for how long, and which pages of the document were accessed. This could be useful, for example, to a salesman who has sent an AppLink of a presentation to a client, and is enroute to that client for a sales call. His approach will be different if he knows that the client viewed his presentation, or never got around to it. An automatic email, as in FIG. 37, or pager or cell phone notification that the client has viewed the presentation, plus specifics such as time spent viewing it, would be of interest.

Central control of AppLink Settings will allow organizations, such as a company, to centrally control its intellectual property and other confidential information, e.g., identifiable electronic patient records in the health care setting. This is effected, for example, by preventing employees from sending proprietary or confidential files to unauthorized parties, such as competitors. This will typically require that employees' interaction with a company's files is restricted to server-based applications, where the ability to download the file to an employee's local computer is not permitted, so that the files remain on the server. If some sensitive files reside on employees local computers, additional restrictions will be required, such as the requirement that all employee's e-mail programs do not have the capability to attach files to e-mails, and/or that an AppLink E-mail Gateway as described herein is established.

In the central administration of AppLinks in an organization, for example, preferably all or some variable settings to outgoing AppLinks which will be sent by a group can be controlled centrally by an AppLink group administrator or File Librarian. Central control of AppLink Settings may be set according to Role or Group membership: For example, a company's central AppLink administrator may set more restrictive permissions for employees that work with more confidential company files, or for a group of customers of the company. The central control may alternatively, or in addition, be implemented according to File Type. For example, a central AppLink administrator may set more restrictive permissions for more confidential documents or files. The file AppLink settings could further be varied according to any file metadata criteria, such as author, when created, subject matter, etc.

The sender of an AppLink may also optionally require the recipient to view an introductory web page before viewing an AppLink, as depicted in FIG. 5, which could include a requirement or optional request to enter information or perform an action, such as to enter various details about the document or the sender as a form of authentication; a means for collecting sender-specified information, such as a web-based form or embedded or linked-to server-based spreadsheet or database templates; text entry boxes for entering a name, a telephone number, an email address, a password, or any other sender-required or requested information; an explanation or a link to an explanation of what an AppLink is and how to operate within the AppLink environment; an explanation or a link to an explanation of the technical requirements for receiving an AppLink, such as the requirements to run the AppLink client; a hyperlink or GUI button which, when executed, submits any form data to the server and activates the AppLink; a library of other useful elements. Two examples as shown in FIG. 5*b*: A clickwrap Non-Disclosure Agreement (NDA) form which the recipient must agree to by executing an "Agree" GUI button or typing "Agree" and entering their name, or digitally signing the agreement. And a legal "terms/ conditions of use" agreement required for the use of the server-based software or digitally signing the agreement.

Typically, files involved in collaboration would not have an introductory web page, or might only have the password or authentication provision, to minimize access steps required for persons that will be working with a document frequently.

The present invention also admits, in an alternate embodiment, of providing an Application Window in a Web Site's Web Page. This may be referred to herein according to the tradename "Embed-an-App™." According to this embodiment, the AppLink is embedded into a web page, as a thin-client-enabled application window which displays a specific file in a file-compatible application, for example, as a frame within a web page. The thin-client-enabled application windows may be included in a persistent web page which is a part of a web site containing one or more pages, as a permanent element of that page. The source code, e.g., html or JavaScript, for the web page may contain window creation code which specifies the size of the window, plus embedded code or a link which essentially acts as an AppLink to a specific server-based application, and possibly, though not necessarily, to a specific file within the application. In the event that the web page viewer's computer did not have the requisite thin client program installed, upon first opening the web page with an application window, the viewer would be asked if he/she wishes the required thin client to be downloaded and installed.

This embodiment may be distinguished from the AppLink transmission system where the AppLink is transmitted to a recipient as a hyperlink or hyperlinked graphic on a web page on a web site which is viewed by the recipient. Applications have been known to be displayed in a web page, as in the Tarantella web-enabling system or Java-based thin-clients that depend on the web browser's Java Virtual Machine. However, this display has been primarily a way to access the application, by calling up a Java-enabled web page window with the application displayed therein, when an application is desired. This is comparable to the way a user might call up a word processing application on his local machine. Just as that user could have several programs which he has minimized onto the taskbar at the bottom of the local machine's GUI, so could the user have several web pages or windows with embedded applications minimized at the bottom of the GUI.

According to an embodiment of the present invention, however, one or more thin-client-enabled application windows are included in a web page which is a part of a persistent web site containing one or more pages, as a permanent element of that page, or as generated on-the-fly automatically or as requested by viewers, by a web page generation script or programming language, such as Microsoft's Active Server Pages, or ASPs. This inclusion of thin-client-enabled application windows into a web page provides expanded uses: For example, a company web site could have a presentation program presented in a web page's window, with a presentation file loaded and ready to run when desired by a viewer. A financial advisor might have a spreadsheet presented in a window on his web site, with a template loaded which would allow a viewer to enter his personal financial information and run a macro which would calculate how much money the financial advisor may save the viewer. A software vendor could have web page windows on the corporate web site which show each of the vendor's software applications. In this case, there may be no specific file displayed, or there may be an example file loaded.

In other words, this embodiment of the present invention, which may be termed the "Application Window in a Web Site's Page", or "Embed-an-Application", may be distinguished from the AppLink transmission system where the AppLink is transmitted to a recipient as a hyperlink or hyperlinked graphic on a web page on a web site which is viewed by the recipient. In that case, the application window does not appear in the web page. In the instant embodiment, however, a window containing a server-based running application is embedded within a web page. The applications are actually running on a remote server, and when the viewer opens a web page with such a program "embedded", a Java-based or native client program downloads itself to the viewer's local machine and displays within one or more windows in the web page the interface to one or more applications, with perhaps a specific file opened and in view. A web page or browser window could contain many such windows.

A specific embodiment of the present invention that has been referred to above, is the use of an application window in a web site's web page, or "Embed-an-App" as used to implement a medical record confidentiality and control system. A patient's medical record may consist of several files in different locations. Some files would be viewed and manipulated by high-end, perhaps proprietary applications, such as an x-ray imaging and interpretation program. Documentation of a patient's laboratory work-up or clinician interview examination might be presented within a word processing program specialized for rapid medical dialog entry. The totality of the patient's files could be presented to a doctor with access to any Internet-connected computer within a single web page, with each file presented within a compatible server-based application. A central or unifying patient's medical record web page may be created that may contain a series of hyperlinks (AppLinks) that call up a file in an application, or windows that display the application and file. For example, when a clinician clicks on an AppLink icon for the patient's x-rays, the x-ray interpretation program would come up in its own window. This solves the problem of files located in different places and accessed by different applications. In this specific embodiment relating to medical record control, an AppLink may be created to Multiple Files Within a GUI Desktop as described in a previous embodiment.

Figure 19A:
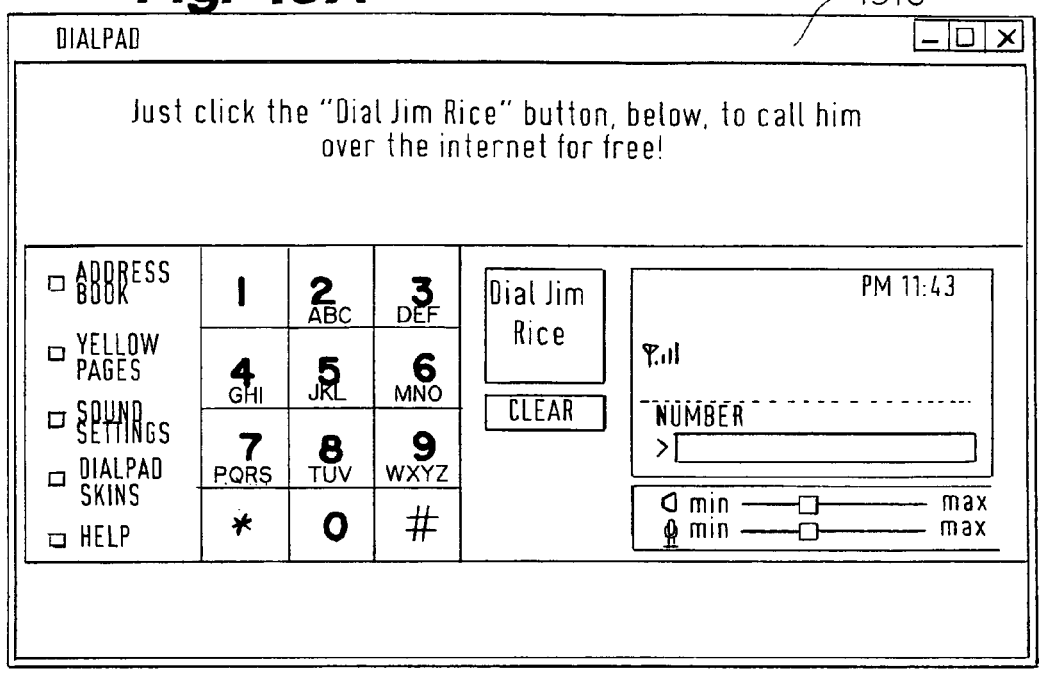
FIG. 19a is a depiction of a user interface for a communication link according to an embodiment of the present invention.
Figure 19B:
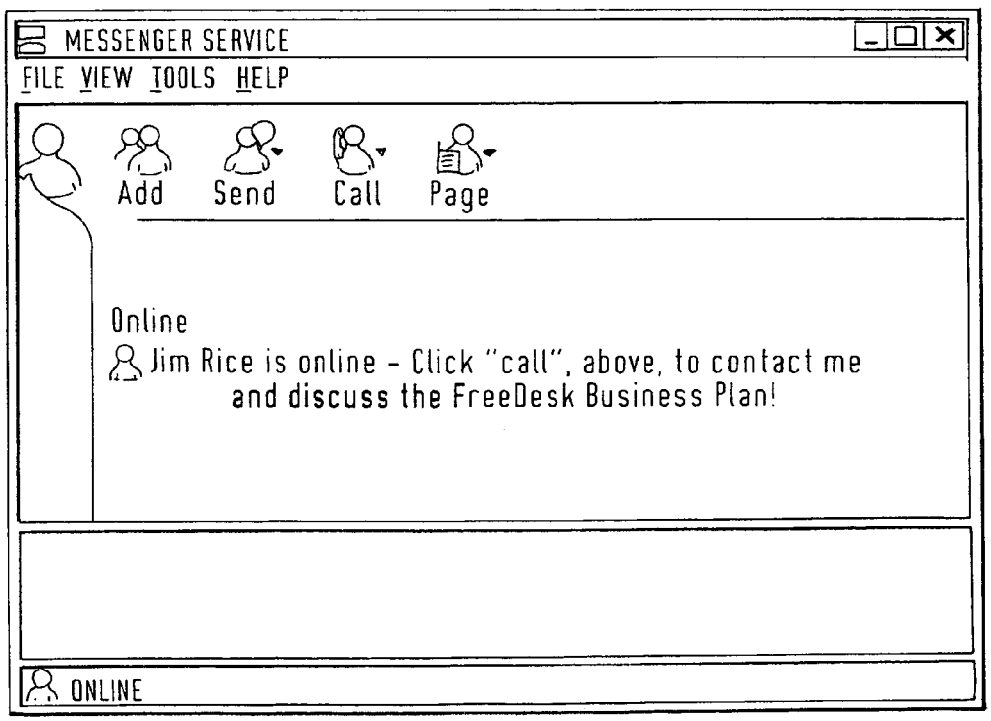
FIG. 19b is a depiction of a screen view for an alternate implementation of a communication link according to an embodiment of the present invention.
Figure 23:
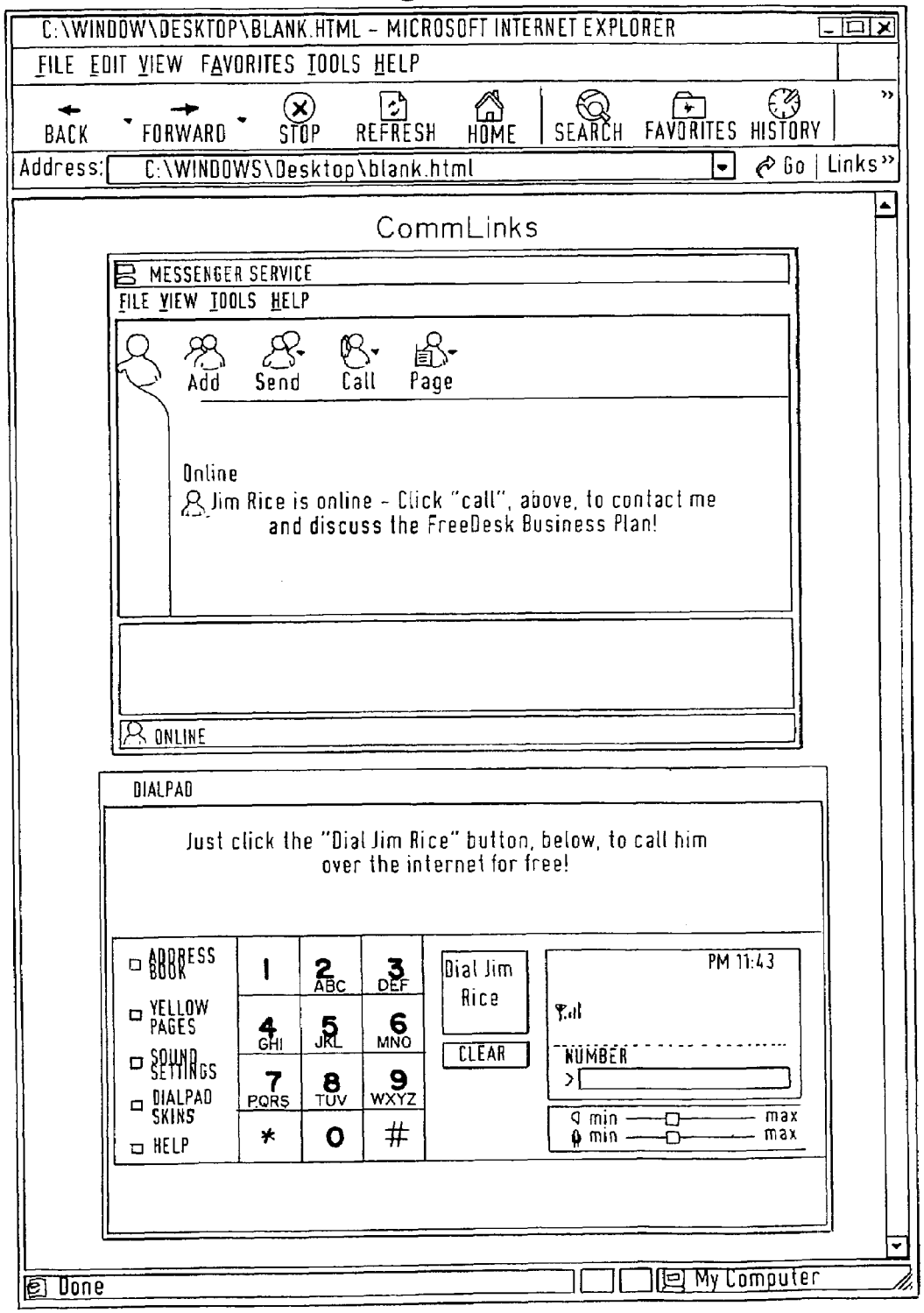
FIG. 23 is a depiction of user interface for an alternate implementation of a communication link according to an embodiment of the present invention.

In a further embodiment of the instant invention, a Communications AppLink, which may also be referred to herein according to the name of trade "CommLink". In this embodiment, the server-based application is one or more communications programs, such as an e-mail, Instant Messaging, Chat (IRC), Voice Chat (Voice Over Internet Protocol), or Video Chat application or executable. The communications program may preferably be preconfigured with the communications address of the sender. The Communications AppLink can then be used by the AppLink recipient to communicate with the sender, who will have a compatible communications program, either server-based, or locally installed. This "CommLink" could be sent along with an AppLink to another file that the sender wishes to collaborate with the recipient about, or have the recipient view and discuss. A depiction of a screen view of a suitable CommLink GUI implementing a Voice Over Internet Protocol application (voice messaging or chat) is depicted in FIG. 19a at 1910. FIG. 19a is a depiction of a user interface for a communication link according to an embodiment of the present invention. Using AppLink, access to one user's communication tools could be sent to another user via server-based communications programs in a web page or e-mail. Suitable applications may include Instant Messaging, as in FIG. 19b, email, or voice over IP and video conferencing in those instances in which the local client program can access the relevant components of the local machine, such as the microphone or WebCam. FIG. 23 is a depiction of a screen view for an alternate implementation of a communication link according to an embodiment of the present invention. The recipient could communicate with the sender despite having no compatible communications programs installed on his local machine. This would allow guaranteed reliable communication with any number of recipients in a manner fully supported by both/all users, with no problems with incompatible or conflicting proprietary communications applications or executables. The communications applications could be configured, according to the desires of the sender, to allow the recipient to only communicate with the sender, for example according to the sender's addresses already set up in the application.

An AppLink provides for file independence, since the application can be "sent" along with the file. Similarly, in the Communications AppLink embodiment, or the alternative Communications Embed-an-App embodiment of the present invention, the sender "sends" the communications program along with the web page or URL. Accordingly, in communications-oriented embodiments, the recipient need not have a communications program resident on their local machine. Additionally, the communications program linked to by the CommLink can be optimized for communication with the sender. It can be automatically or manually configured to contain the communications address of the sender, or of a specific group of collaborators.

Figure 20:
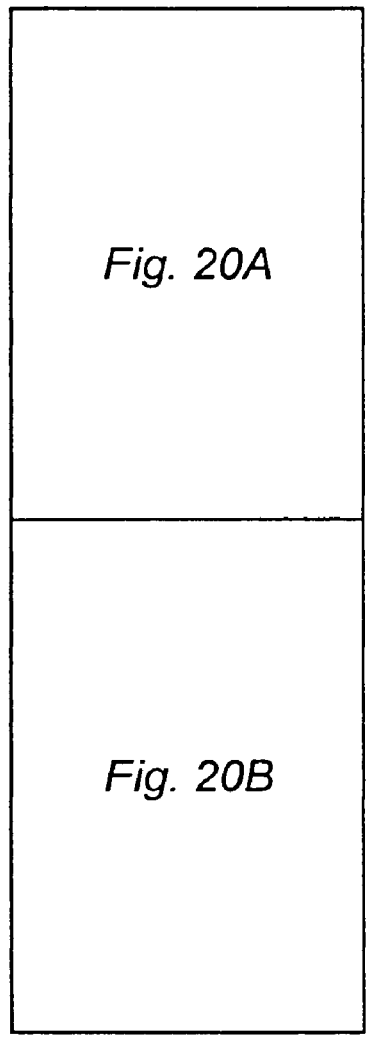
FIG. 20 is a depiction of a process flow, with corresponding user interfaces, for a collaborative communication system according to an embodiment of the present invention.
Figure 20A:
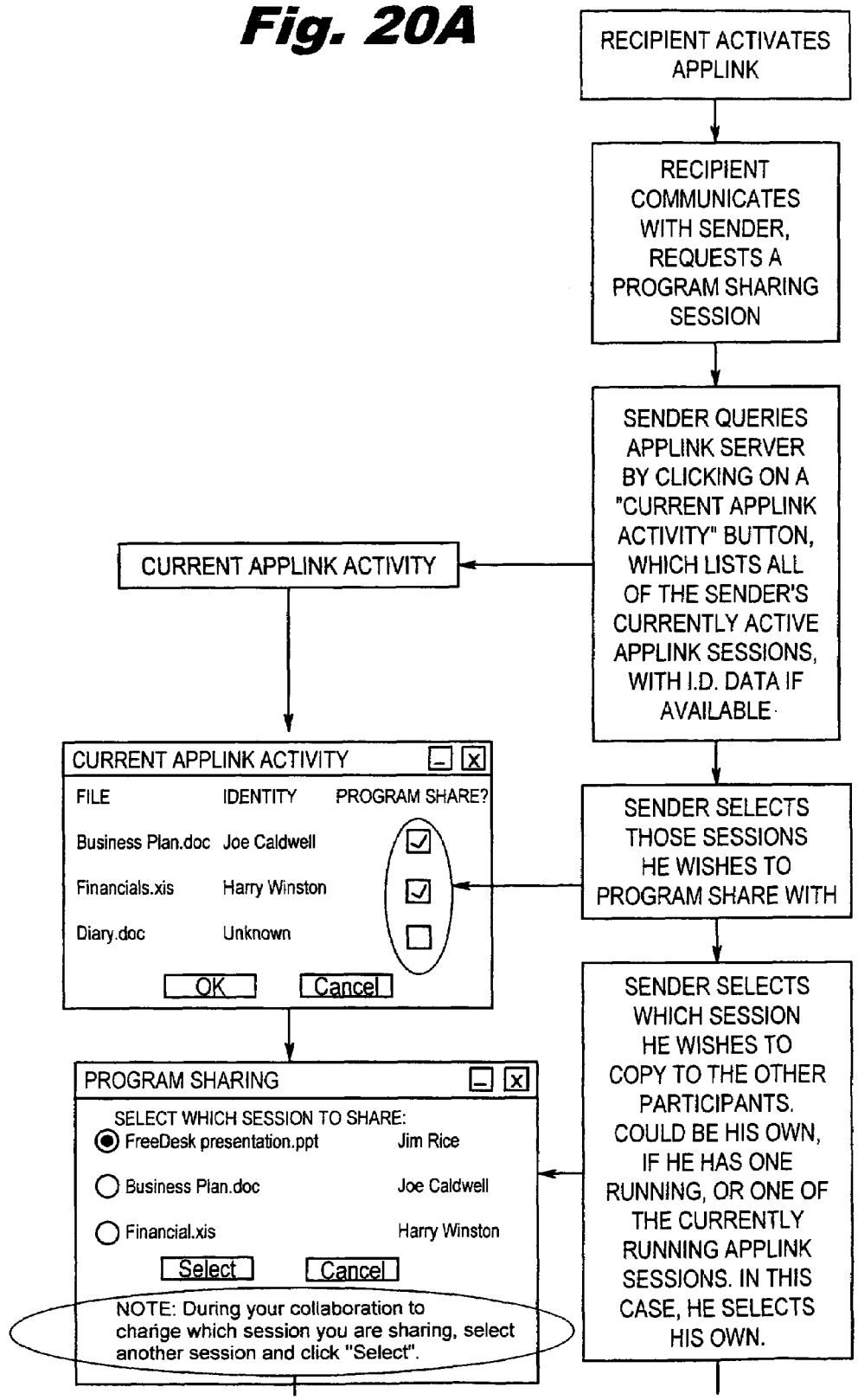
Figure 20B:
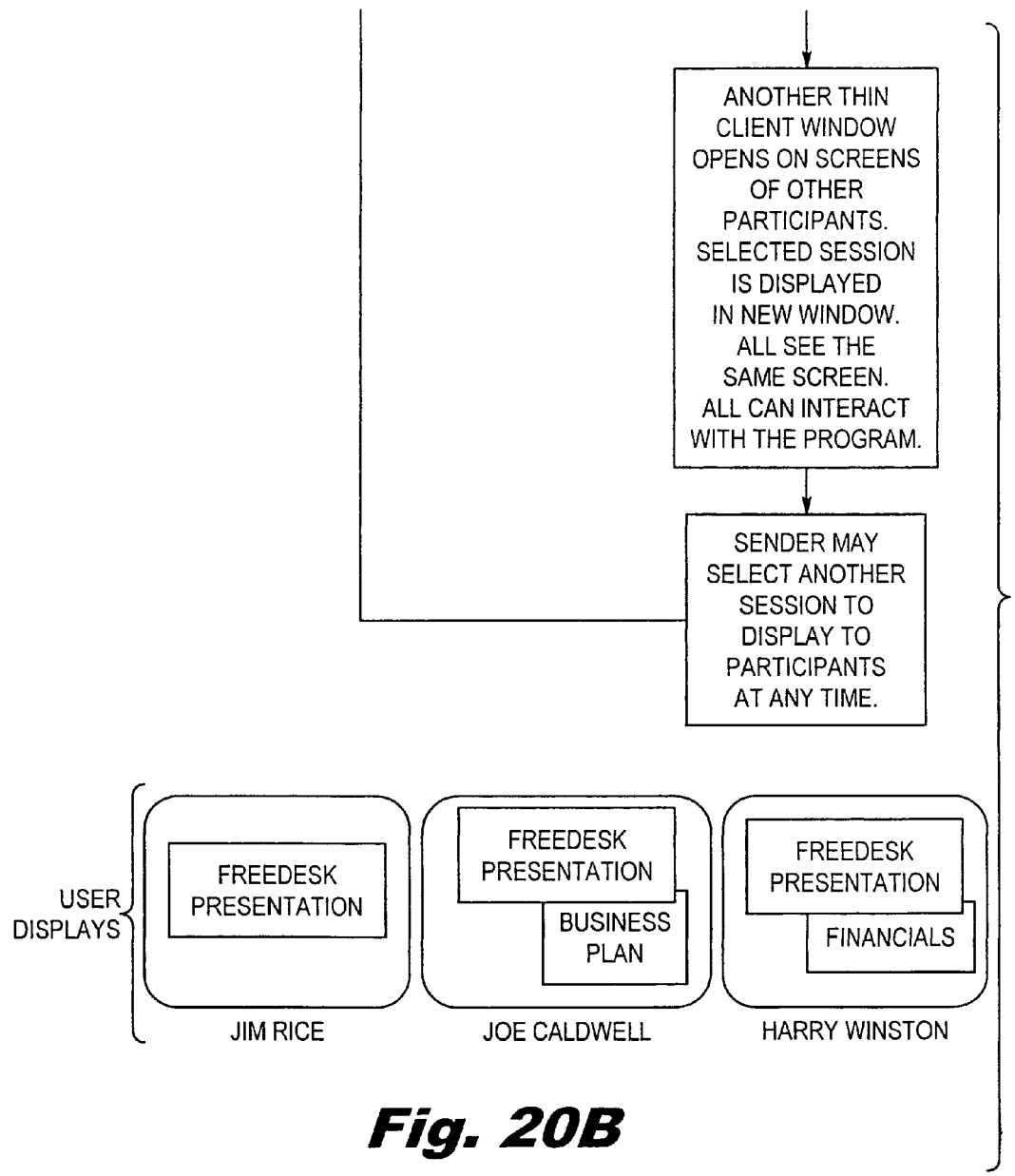

Another embodiment of the present invention provides for the combination of Program Sharing and AppLinking. A Program Sharing AppLink would allow the server-based application that presents an AppLinked file to the recipient to be "shared" real-time between two or more users, typically the sender and the AppLink recipient(s) for the purpose of collaboration. "Program Sharing," or "Session Shadowing", allows multiple users to interact with the same document simultaneously, as depicted in FIGS. 20, 21, and 22. FIG. 20 is a depiction of a process flow, with corresponding user interfaces, for a collaborative communication system according to an embodiment of the present invention. FIG. 20 shows a suitable GUI for the administration of a collaborative communication session according to an embodiment of the present invention, together with a process flow for the creation of such a session. An AppLink recipient may activate an AppLink as discussed previously. To establish a communication session, the recipient may communicate with the sender, requesting a program sharing session. In response, the sender may query the AppLink server by executing, e.g., a "current AppLink activity" GUI button, which will display the sender's currently active AppLink sessions. Identification information regarding the sessions may also be supplied.

The sender may indicate, e.g., via GUI radio button or check box, which sessions he wishes to be collaborative through the use of program sharing. The sender may then be presented with an interface to indicate which sessions he wishes to copy to the would-be collaborators. This may be the sender's session or another AppLink session currently running. The selected collaborators are presented with a thin client environment housing the selected session, which all collaborators can see at the same time on their remote device. The sender may select an additional session for collaboration as well. Collaborative users may have a single thin client running one collaborative session, or they may have multiple sessions, which may differ from the combinations of other session participants.

Figure 21A:
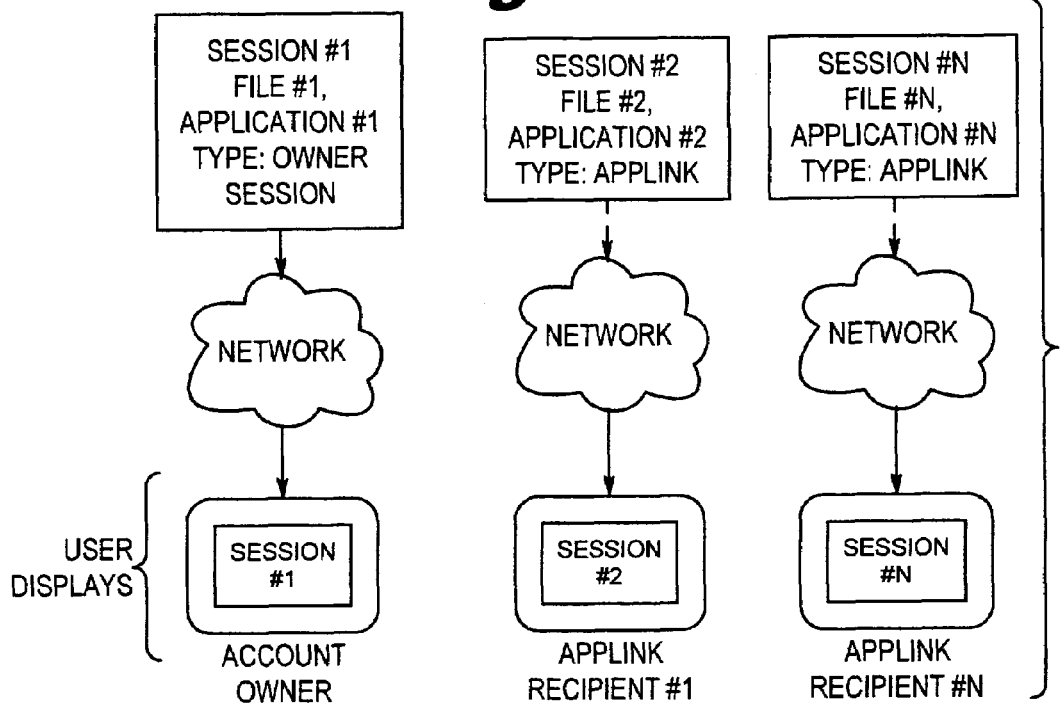
FIG. 21 is a depiction of a process flow for a collaborative communication system according to an embodiment of the present invention.
Figure 21B:
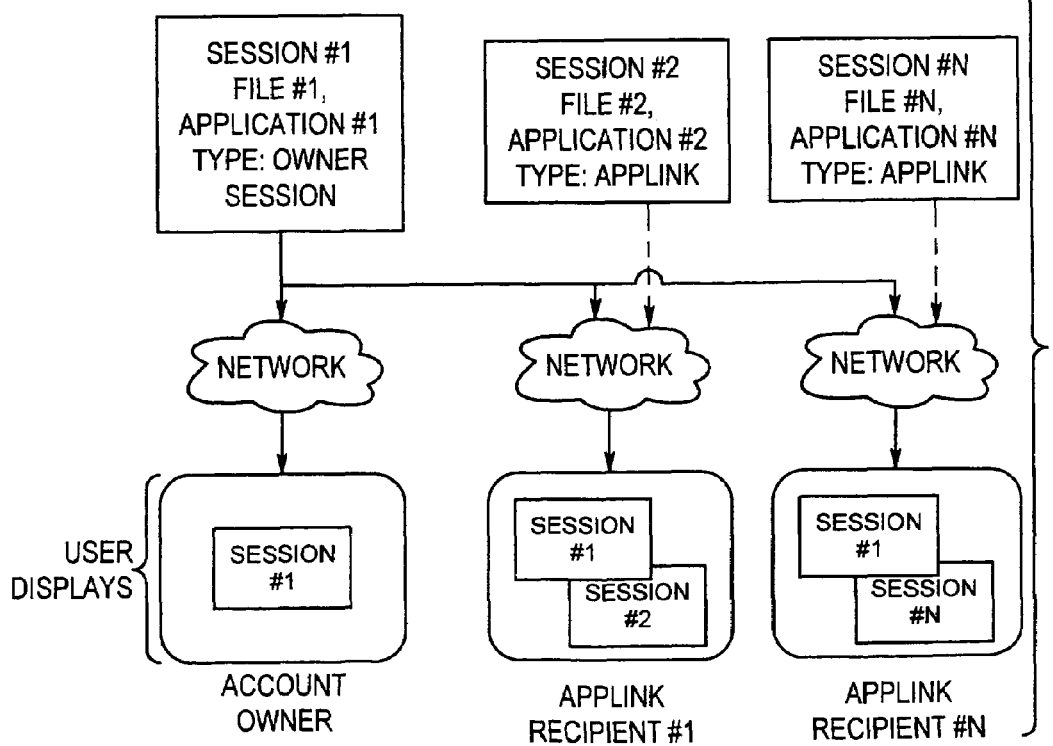
Figure 22A:
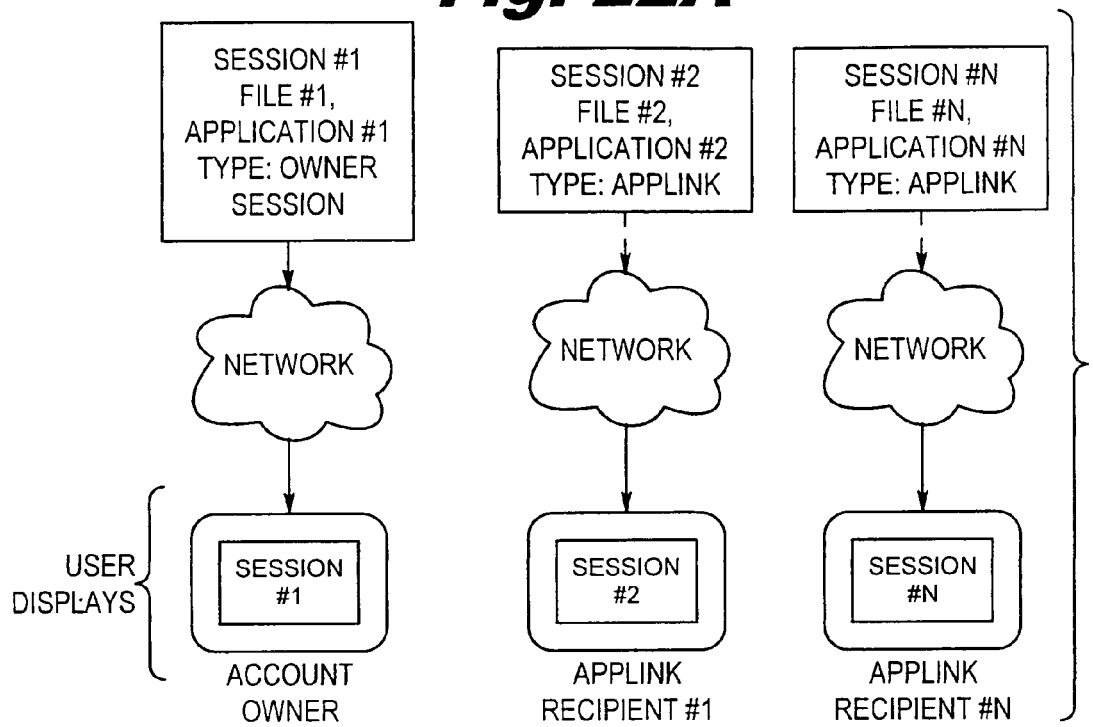
FIG. 22 is a depiction of a process flow for a collaborative communication system according to an embodiment of the present invention.
Figure 22B:
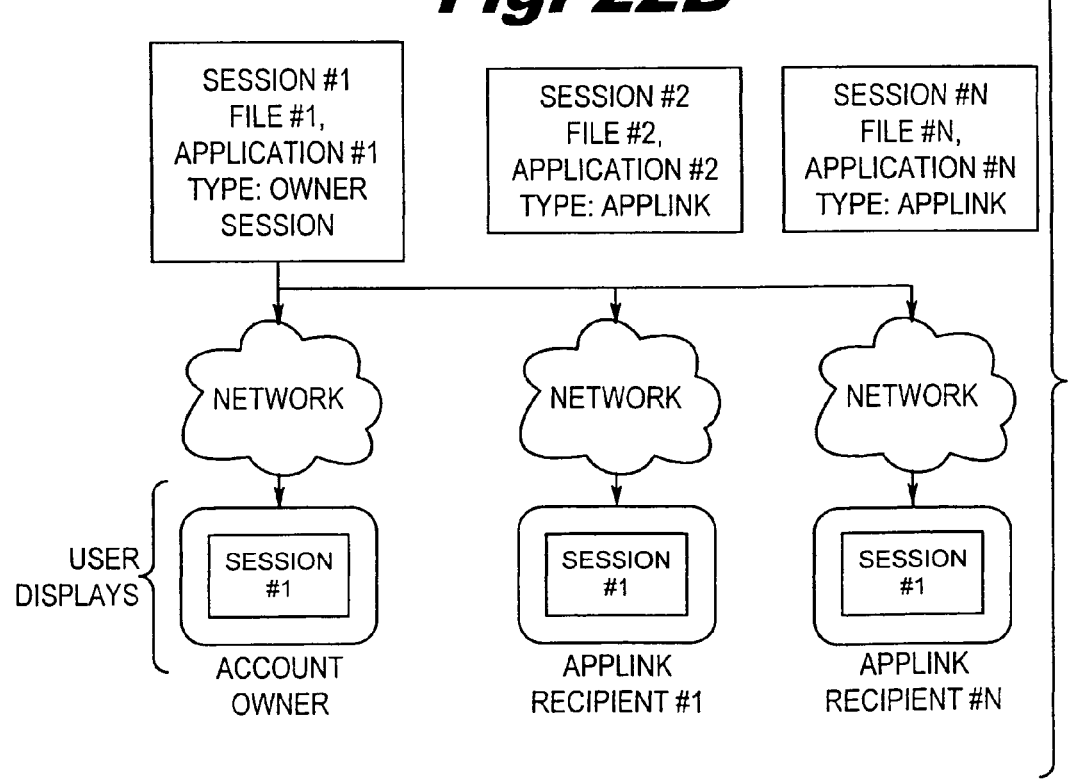

FIG. 21a is a depiction of a process flow for a collaborative communication system according to an embodiment of the present invention. FIG. 21a depicts a network environment as it exists prior to the effecting of a program sharing session. Each user, or would-be collaborator, is presented with a separate session, which is not shared by any other user. The users maintain network links through a network such as a public network or internetwork to sessions running on the AppLink server array or application server, shown in the top tier of FIG. 21a. The user's respective displays are shown in the bottom tier of FIG. 21a. FIG. 22 is a depiction of a process flow for a collaborative communication system according to an embodiment of the present invention. FIG. 21b depicts the network environment following creation of the session or sessions, creating a virtual network architecture as shown. The owner of the AppLink account or administrator of the session may enable the sessions, the data flow of which is shown by the solid line. The recipient collaborators continue to maintain their sessions and corresponding session thin-client GUIs. Each user can move the application's cursor and otherwise interact with the program. Coordination between multiple users about who is currently interacting with the program can be done informally, or in some variants, control of the application must be formally requested and granted by the current controller. According to the present invention, AppLink functionality is combined with a program sharing capability. Since the program is running on the server, it is possible to split, or "copy" the data flow from the application server to the first interface thin client to one or more additional thin clients, running on different remote machines. The AppLink can serve as an initial connection mechanism to the AppLink Server, and thus to the AppLink sender, who can view which AppLinks are being used at any point in time. The actual program session that is shared can be the AppLinked file program session, or any other session extant among the online AppLink sender and recipients. The session can be changed at any time.

There are two ways to implement a combination AppLinking and Program Sharing event with regard to the recipient's existing sessions, that is the sessions that were in existence prior to program sharing. One is to take over the application windows of the persons being shared with and replace that windows contents with the session to be shared. The recipient's sessions would continue to run, but not be visible to the recipients until the session sharing is terminated. A second, preferred mode, is to generate a second application window on each recipient's computer GUI desktop with the shared session. That way, each recipient can continue running and interacting with their own session, and perhaps sharing that session with others later.

The present invention provides application and file access to a much broader range of users than a normal Application Service Provider (ASP) model, where each user must be signed up with a particular ASP.

FIG. 23 and FIG. 24 are a depiction of user interface for an alternate implementation of a communication link according to an embodiment of the present invention. CommLinks could be included in a web page that also has an embedded application with a file that the sender wishes to collaborate with a recipient on as depicted in FIG. 23. Through session shadowing or program sharing of that program window, both users can be viewing and working with the file simultaneously as shown in FIGS. 21 and 22. They can also be communicating with each other via the embedded or AppLinked communications programs.

Figure 24A:
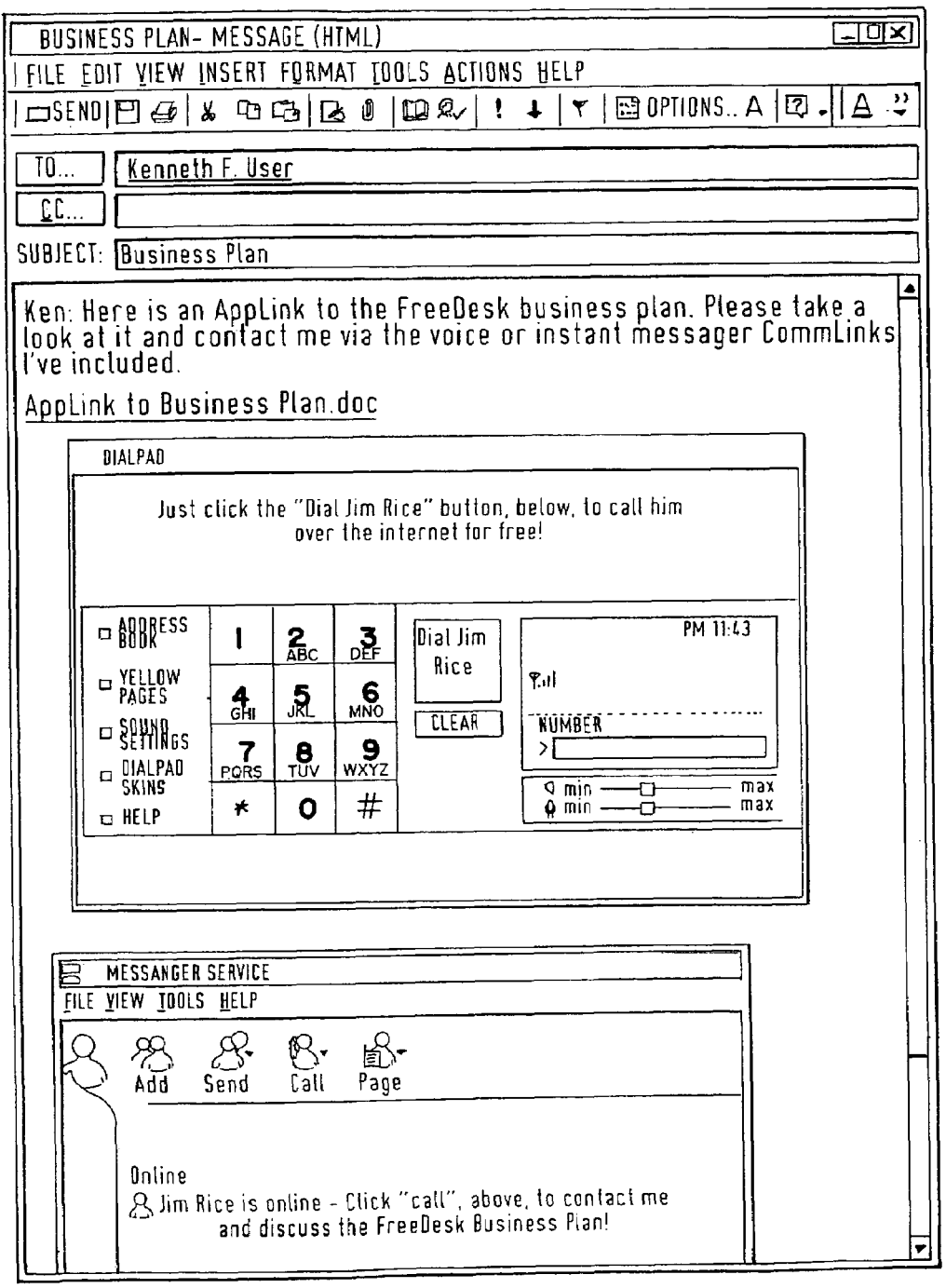
FIG. 24a is a depiction of user interface for an alternate implementation of a communication link according to an embodiment of the present invention.
Figure 24B:
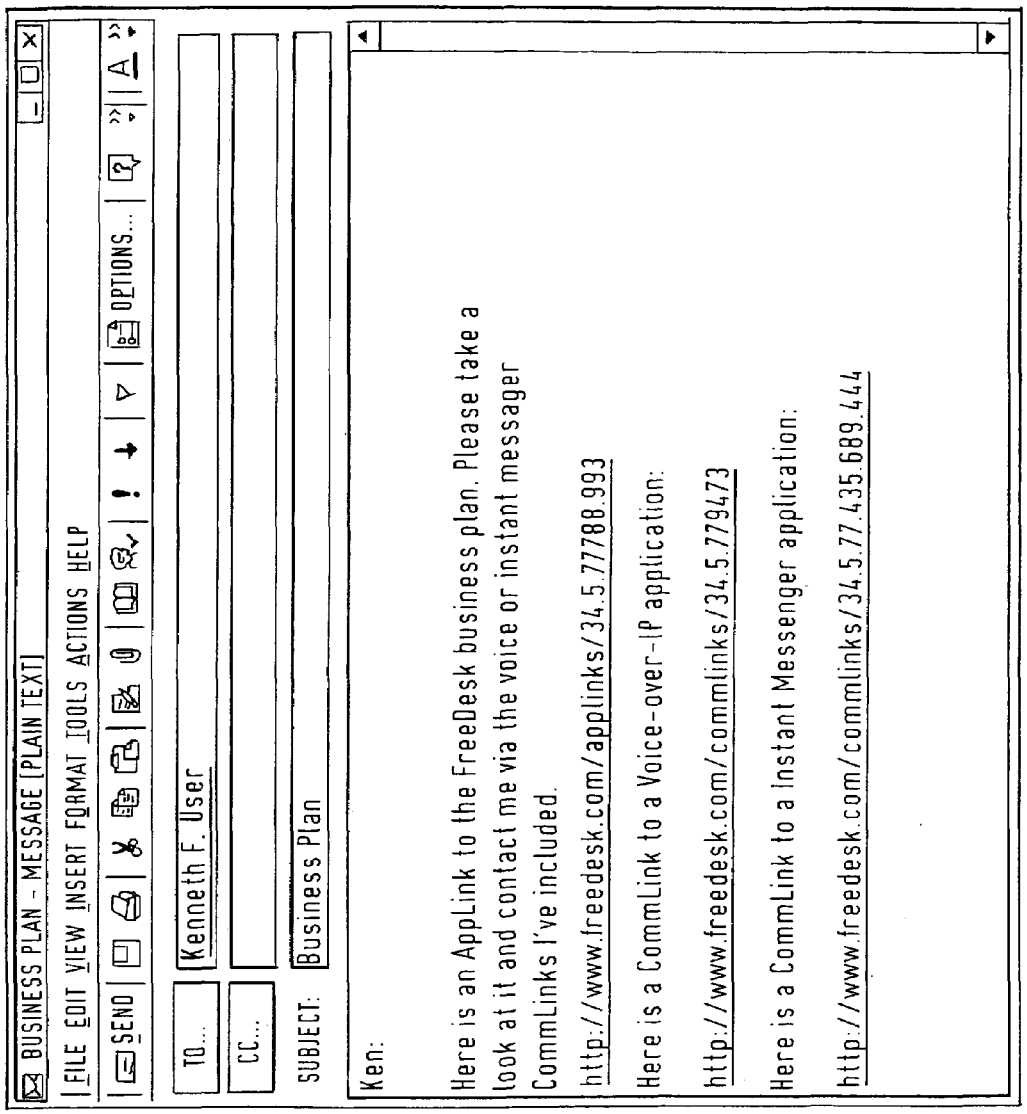
FIG. 24b is a depiction of an alternate implementation of a user interface for a communication link according to an embodiment of the present invention.

Several of the embodiments of the present invention described above may be combined into what may be termed a multiple application or multiple file AppLink, which may be implemented by the integration of a CommLink embodiment with a Program Sharing embodiment. A depiction of a suitable GUI for transmission of a multifile AppLink is also shown in FIGS. 11a and 11b. FIG. 24a is a depiction of user interface for an alternate implementation of a communication link according to an embodiment of the present invention. FIG. 24b is a depiction of an alternate implementation of a user interface for a communication link according to an embodiment of the present invention. Alternatively, the multifile AppLinks and attendant CommLinks may be combined into a single communication, e.g., a SMTP e-mail message as depicted in FIGS. 24a and 24b.

According to this embodiment of the present invention, an AppLink can be created which combines one or more server-based communications programs plus a file or files in one or more application windows, frames, or displays, which can be program-shared. The communications program can be used to communicate with an AppLink sender, for example via a text or audio chat, or via an instant messaging application. The sender and one or more recipients can collaborate over a document via the Program Sharing capability.

FIG. 26 is a depiction of a user interface for an alternate embodiment of the present invention. In a further refined embodiment of the present invention, application interface settings may be altered according to file metadata. According to this embodiment, a user can associate a custom program interface setting with a file, for example, in the form of metadata for that file. File metadata is information about the file that may be contained in the file, for example as a file header, or external to it, for example, in a file database. For example, FIG. 26 depicts a typical GUI interface to examine the file metadata of a particular type of file. An application interface setting will preferably specify which menu items or tools would be present in the application as experienced by the user. The file metadata application interface settings could communicate with the application's APIs (Application Programming Interfaces, or protocols to communicate with and control a program) to customize the interface prior to opening a file. If that file is opened, the program would display the application interface specified for that file. Another user accessing the file through an AppLink, for example, would be limited to the application settings created by the file owner or administrator, such as the author. Interface specifications file metadata could additionally have an additional association with a person or group, so that when that person or group opens the file, the user may be presented with a particular interface for the target application optimized for that person or group, for example, according to their work roles. For example, tasks that are never performed by members of a certain group may be eliminated, thus reducing clutter and simplifying the interface for that group. In certain situations, AppLink recipients may actually pay for and/or subscribe to certain functions or subsets of functions, eliminating those that they would not use from the interface and simplifying their experience of the application.

The ability to "send" an application via AppLink for opening and working with a file means that the application can now serve different roles than originally envisioned by creators of the program. For example, in an embodiment of the present invention in which application Interface Settings are altered according to file metadata, a presentation file AppLink may be sent, with the sole purpose of having the recipient view the presentation. There is no necessity for the recipient to modify the presentation, indeed, the presence in the AppLink presentation application of tools necessary to create and modify the presentation could confuse the recipient who might be unfamiliar with the full functionality of the application. Accordingly, it would therefore be beneficial if the AppLink creator could modify the program that the recipient sees to eliminate confusing and unnecessary menu items and tools. The ability of the AppLink creator to customize the program interface to achieve particular goals also increases the usefulness of the ability to place an application window in a web site's web page.

Figure 27:
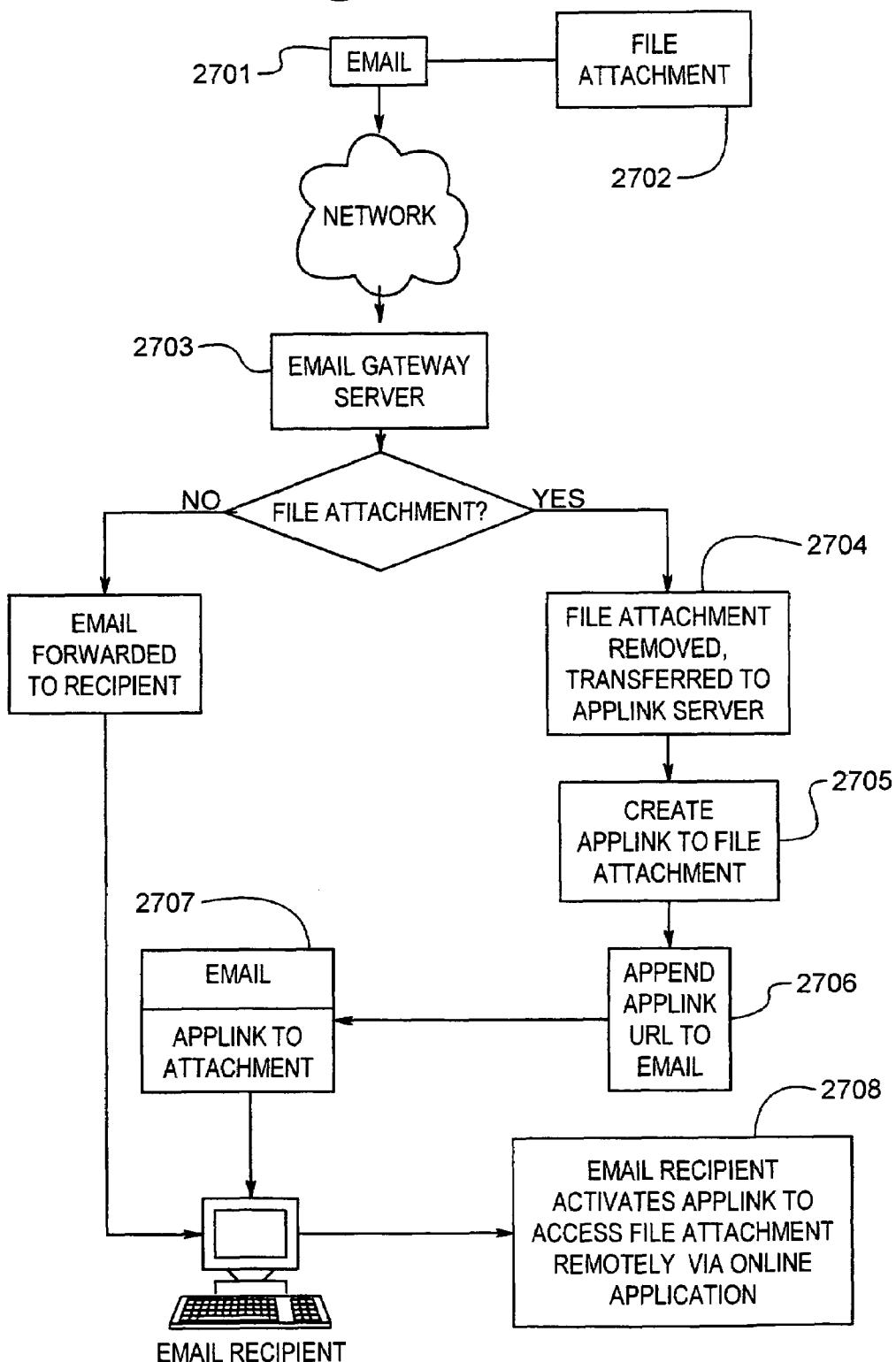
FIG. 27 is a process flow diagram for an e-mail server according to a further embodiment of the present invention.

FIG. 27 is a process flow diagram for an e-mail server according to a further embodiment of the present invention. In a further embodiment of the present invention and as depicted in FIG. 27, an AppLink E-mail Gateway may be provided, by which a server, referred to as an AppLink E-mail Gateway Server 2701, screens all incoming e-mails for attachments. If an e-mail 2701 has an attached file 2702, this file is removed from the e-mail and stored on the server 2704 after being scanned for viruses. An AppLink to the file is created 2705 and the AppLink is appended to the e-mail 2706. The e-mail is then forwarded to its intended recipient 2707, who opens the attachment via the AppLink 2708, thus eliminating the danger of computer viruses for the recipient's computer. In a related embodiment, but for a contrasting purpose, outgoing e-mail can be treated similarly, by removing and storing the attachments, and creating an AppLink which is added to the e-mail instead. For outgoing e-mails, the replacement of all attachments with AppLinks may aid in the control of a company's intellectual property, by ensuring that the attached files remain with the company, and AppLink recipient file permissions or properties may be restricted centrally according to company policy and the recipient permissions in general.

According to the present invention, an AppLink may be implemented as a viral marketing mechanism for service providers as follows: A link or other mechanism may be included in some or all sent AppLinks, depending for example on the subscription level of the sender or creator, whereby an AppLink recipient is advised or solicited regarding signing up with the service provider that is providing the AppLink capability to enable the recipient to send their own AppLinks. In this manner, incentive is provided to the recipient to sign up or register. According to this embodiment of the present invention, the novel capability of AppLink to deliver server-based applications and files to a broad range of anonymous or random recipients allows AppLink to be used as a viral marketing mechanism. Viral marketing typically may be thought to require two components: (1) a user motivated to use a service to communicate with others that are not currently members of the service, and (2) provision for nonmembers that are communicated with to sign up for the service.

Since an AppLink is essentially a new and useful way to communicate with any number of recipients, it intrinsically provides the first component. The second condition can be satisfied by including a registration form or a link included in a recipient's introductory web page, as depicted in FIGS. 5 and 5b, for sent AppLinks which, if activated by the AppLink recipient, brings an AppLink recipient to some sort of informational web page which would include that ability to register with the service, perhaps through a limited time offer.

Another means to facilitate viral marketing is to combine the thin client (required by AppLink recipients to activate and interact with an AppLinked file) with the means to create AppLinks. Each first-time AppLink recipient will have to download some sort of thin client. If that download also includes means to create an AppLink, perhaps as a plug-in to an email application, the "viral marketing" propagation of users of the AppLink service provider should be considerably enhanced. The e-mail plug-in could be preconfigured to use, for example, a free trial account offered by the AppLink service provider for a limited time.

Another means of facilitating viral marketing for the AppLink service provider is to use the occasion of a recipient trying to activate an inactive AppLink as a marketing opportunity. The recipient could get a web page containing an error message, FIG. 36, but one that also includes an offer to let the recipient try out AppLinking, perhaps with AppLinks to several "demonstration" files, such as a spreadsheet, word document, and presentation file.

Another embodiment where the use of AppLinks can act as a viral marketing mechanism for Software Vendors or publishers is by way of an AppLink Recipient Demo Application License. According to this embodiment, a free "demo" license for AppLink recipients allows software vendors to present their application to potential customers via the viral marketing mechanism of AppLink. In a further refinement of this embodiment, a server-delivered application may be provided to AppLink recipients (who have not yet paid for application access rights) which contain various limitations on functionality, e.g., "demo-ware", where an application has a free demo period, after which a key code must be entered for further use; "annoy-ware", where some irritating feature, such as a fixed delay after opening the program until it can be used, is present until a key code is entered; "cripple-ware", where critical features such as a "print" function is disabled until a key code is entered; or "limited time-ware" where entry of a key code enables application usage for a specified time period. Information about increased functionality is preferably provided that may be enabled via entry of a key code which may, for example, be purchased from the software vendor or the application service provider.

Following creation of an AppLink, a list of suitable applications may be ranked from most to least suitable for the AppLink file. Upon execution, as depicted in FIG. 1 at 124 and in FIG. 18, the AppLink server may go down the list, and as soon as the user has the right to use an application choice, the application server is prompted to start this application. If the user does not have the best choice, their license or purchase of this choice may be solicited. A database may be accessed to determine the current application rights of the user. If no application can be validate or otherwise provided to the user, they may be provided with an error message.

Where a user has multiple AppLinks to multiple files or applications or computer "desktops" on one or more servers located in the same or different data centers operated by the same or different service providers, this constitutes an "AppLink Library". A user could create multiple AppLinks to his files from different servers operated by different service providers. By keeping a list of AppLinks to each file, or to a desktop work area for each server, the user has a central library of his files and applications. Such a list could be kept in a web browser's or web home page's URL "bookmark" list. This aggregation of AppLinks could serve as a user's document library, and could be stored locally or on a central database.

Generally, AppLink creation can be optimally joined with or linked to the means of transmission to intended recipients, to minimize the number of steps the AppLink creator is required to perform, or to minimize the number of applications the creator is required to use. Often, this transmission method will be e-mail. Therefore, incorporating AppLink generation into an e-mail program to automate some of these steps would have efficiency and convenience benefits for the end user in the creation and transmission of AppLinks via e-mail.

According to an alternate embodiment of the present invention, an AppLink is created and executed via communication with the AppLink Server by the native code of an e-mail application, or an addition to the e-mail program, such as through a plug-in or add-on program. This add-on could interact with the e-mail program through program APIs, thus the creation code could facilitate any of the possible transmission formats. Generating an AppLink through an e-mail interface would include the following steps: 1) Selection of the file to be AppLinked; 2) Setting of AppLink properties (or the acceptance of previously set parameters); 3) Generation of the AppLink address or URL; 4) Inclusion of the AppLink address in an e-mail, either as a naked link or linked to an inserted image. If including an Application Window in the e-mail according to the e-mail implementation of the embed-an-app embodiment described above, the sender would be prompted to size and place the window in the e-mail. Finally, recipients could be selected and the e-mail sent.

The inclusion of the AppLink address in the e-mail may be effected in one of several ways. One AppLink presentation method may be used if the AppLink transmission e-mail is in plain text format. In this case, the AppLink is inserted by the E-mail AppLink Insertion procedure as a naked link, for example as depicted in FIGS. 11b and 24b.

An alternate AppLink presentation method may be used if the AppLink transmission e-mail is in a richer format such as HTML, RTF, or XML. In this case, as depicted in FIG. 11a, the e-mail AppLink Insertion procedure can generate and insert an image into the e-mail representing the AppLink, with the actual naked AppLink address linked to the image via underlying code. The image could incorporate features to aid in communication with the recipient, such as a preview of the AppLinked document, or a thumbnail image of the document bearing a label with the name of the AppLinked file. Suitable source code implementing this embodiment, for an HTML-format e-mail would be:

<A HREF="WWW.FREEDESK.COM/APPLINKS/345.678.893334"><IMG SRC="APPLINK BUTTON TO BUSINESS PLAN.JPG"></A>

Various user interfaces may be used in implementing embodiments of the present invention; however, several suitable user interfaces are described herein. FIG. 34 depicts a suitable user interface 3410 serving as a confirmation screen so that the sender of an AppLink may ensure the parameters of the AppLink are as intended. The sender may then execute a GUI button 3412 to mail the AppLink, edit the parameters 3414, or cancel the AppLink 3416.

Figure 25:
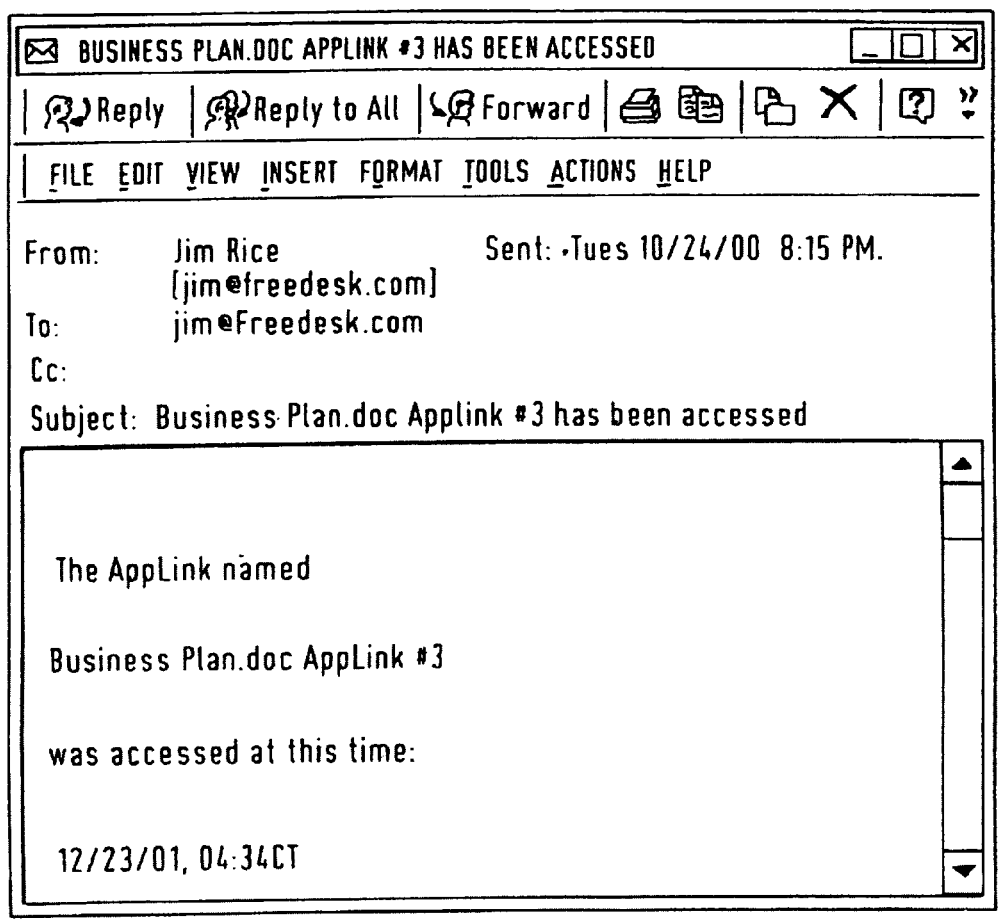
FIG. 25 is a depiction of a notification email.

A suitable GUI interface for the receiver of an AppLink is depicted in FIG. 35. The user may enter a password in the text box, download the document if permitted via a link, and observe information about the file that is the subject of the AppLink. Various informational links may also be provided for general information. However, if a recipient tries to access an AppLink that has expired or otherwise terminated, they may be presented with informational GUI depicted in FIG. 36, which may also serve as an informational source about the invention by way of links. If the AppLink is successfully accessed by the recipient, the sender of the AppLink may be notified by SMTP message as depicted in FIG. 25, or by other communication as detailed above.

An AppLink sender may be provided with a GUI interface or other suitable interface as depicted in FIG. 26 giving a comprehensive list of all AppLinks which the sender is currently administering or are active or pending. The status of the particular AppLinks may be shown. The sender may execute check boxes or otherwise indicate if any files are to be manually deleted prior to their automatic expiration.

While a preferred embodiment of the present invention has been described, it should be understood that various changes, adaptations and modifications may be made therein without departing from the spirit of the invention and the scope of the appended claims.

What is claimed is:

1. A method to allow a user of a local computer to access a remote computer file with a remote application, the method comprising:
    (a) providing a computer server system connected to a communications network;
    (b) the server system detecting the activation by the user of a hyperlink associated with the computer file;
    (c) operating on said computer server system at least one application program that is compatible with or capable of loading and operating upon said computer file, and that has a graphical user interface;
    (d) opening the computer file in the application program; and
    (e) operating a thin client of the terminal emulation type on the local computer, the thin client displaying the graphical user interface of said application program to said user and allowing the user to provide input to the application program running on the remote computer; and
    (f) restricting said recipient user's access to and manipulation of the computer file, wherein said file access and manipulation restrictions comprise restrictions that are selected from the group consisting of:
        (1) whether the computer file may be accessed;
        (2) a number of times the computer file may be accessed;
        (3) a time period during which the computer file may be accessed;
        (4) whether the computer file may be printed locally;
        (5) whether the computer file may be saved onto said remote recipient user computing device;
        (6) whether the computer file or portions thereof may be copied onto the local computer memory clipboard of the remote recipient user computing device;
        (7) whether, after alteration by said recipient user, the computer file or portions thereof may be saved onto said computer server system, whereby the original copy of said data file is replaced by the altered file, and said application file hyperlink is now associated with said altered file, and
        (8) whether, after alteration by said recipient user, the computer file or portions thereof may be saved onto said computer server system, whereby the original copy of said data file is not replaced by the altered file and remains on the storage system of said server system,
    whereby control and protection of the computer file is retained, while providing simple and easy access to the user via said server based applications delivered via thin client.

2. The method of claim 1, wherein the hyperlink points to a network location or address associated with metadata identifying the computer file.

3. The method of claim 1, wherein the application program is selected after the activation of the hyperlink is detected.

4. The method of claim 1, wherein the application program is selected from a plurality of application programs based on selection criteria comprising criteria chosen from the group consisting of:
    (a) legal rights of the user to use the application programs;
    (b) capabilities of the application programs; and
    (c) properties that are associated with the hyperlink.

5. A method for handling incoming emails at an email gateway comprising:
    (a) identifying a data file attachment on an incoming email addressed to a recipient;
    (b) creating a copy of the identified attachment on a storage device accessible by the email gateway;
    (c) creating a reference or hyperlink associated with the attachment copy;
    (d) deleting the attachment from the incoming email and adding said hyperlink to the email;
    (e) operating on a remote computer remote from the recipient an application program associated with and compatible with the attachment copy;
    (f) opening the attachment copy in the application program running on the computer remote from the recipient upon activation of the hyperlink; and
    (g) operating a thin client on a local computer used by the recipient, the thin client allowing the recipient to provide input to and receive output from the application program running on the remote computer, (h) setting variable restrictions on the access to and manipulation of said attachment copy file, wherein said restrictions comprise restrictions selected from the group consisting of:
  (1) whether said attachment copy may be accessed; and
  (2) access restrictions based upon a security level associated with the recipient, whereby the email attachment cannot pose a virus danger to said local computer since it is manipulated remotely, and whereas the local computer has no need of a compatible program to open said attachment.

6. A method for handling outgoing emails at an email gateway comprising:
  (a) identifying a data file attachment on an outgoing email addressed to a recipient;
  (b) creating a copy of the identified attachment on a storage device accessible by the email gateway;
  (c) creating a hyperlink associated with the attachment copy;
  (d) replacing the identified attachment in the outgoing email with the hyperlink;
  (e) forwarding the outgoing email with the hyperlink to the recipient;
  (f) detecting an activation of the hyperlink by the recipient;
  (g) operating on a remote computer remote from the recipient an application program compatible with said attachment copy or file;
  (h) opening said attachment copy in said application program; and
  (i) operating a thin client on a local computer used by the email recipient, the thin client allowing the recipient to provide input to and receive output from said application program,
  (j) setting variable restrictions on the access to and manipulation of said attachment copy file, wherein said restrictions comprise restrictions selected from the group consisting of:
    (1) whether said attachment copy may be accessed; and
    (2) access restrictions based upon a security level associated with the recipient,
  whereby control and protection of outgoing data attachments is retained by removing said data from outgoing emails, while giving appropriate access to recipients via server based applications delivered via thin client.

7. The method of claim 6, further comprising the step of setting a variable level of access restrictions based upon a security level associated with the identified attachment, whereby attachment access can be varied according to the sensitivity of a particular attached document.

8. An application server comprising:
  (a) a network interface to communicate over a computer network;
  (b) at least one processing unit for running software programs and components;
  (c) an application remote operation enabling program capable of operating an application program which has a GUI and transmitting the GUI of said application program in a terminal emulation mode to a thin client operating on a remote computer, and providing remote interaction with the application program via the thin client over the computer network;
  (d) a storage device containing a computer file;
  (e) an association component that associates a hyperlink with the computer file;
  (f) a listener component that detects an activation of the hyperlink over the computer network by the remote computer;
  (g) an initiator component that, upon detection of the hyperlink activation, opens the computer file in said application program and transmits the graphical user interface of said application program to the thin client operating on the remote computer; and
  (h) a restriction component that restricts the remote computer's access to and manipulation of the computer file, wherein said file access and manipulation restrictions comprise restrictions selected from the group consisting of:
    (1) whether the computer file may be accessed;
    (2) a number of times the computer file may be accessed;
    (3) a time period during which the computer file may be accessed;
    (4) whether the computer file may be printed locally;
    (5) whether the computer file may be saved onto said remote recipient user computing device;
    (6) whether the computer file or portions thereof may be copied onto the local computer memory clipboard of the remote recipient user computing device;
    (7) whether, after alteration by said recipient user, the computer file or portions thereof may be saved onto said computer server system, whereby the original copy of said data file is replaced by the altered file, and said application file hyperlink is now associated with said altered file, and
    (8) whether, after alteration by said recipient user, the computer file or portions thereof may be saved onto said computer server system, whereby the original copy of said data file is not replaced by the altered file and remains on the storage system of said server system,
  whereby control and protection of the computer file is retained, while giving appropriate access to recipients via said server based applications delivered via thin client.

9. The application server of claim 8, wherein the at least one processing unit is selected from the group consisting of:
  (a) a single server;
  (b) a personal computer; and
  (c) multiple, separate computers operating as a single, logical server.

10. A method comprising the steps of:
  (a) providing a computer server system which is connected to a communications network and which contains executable code of at least one server based computer application which operates natively with a graphical user interface,
  (b) providing an application hyperlink that is associated with said server based application,
  (c) providing a computing device to at least one recipient user which is connected to said communications network,
  (d) providing computer software executable code on the recipient user's computing device that activates said application hyperlink,
  (e) providing computer software executable code on said computer server system which detects the activation of the hyperlink by said recipient user's computing device, and
  (f) providing computer software executable code on said computer server system which selects and launches said server based computer application,
  (g) providing computer software executable code on said computer server system which transmits the graphical user interface of said server based computer application to said recipient user's computing device in a terminal emulation mode, and receives inputs to said graphical user interface from the user; and (h) providing thin client computer software executable code on said recipient's computer which receives and displays said graphical user interface from said computer server system, and transmits the inputs of said recipient user back to the server based application, (i) providing computer software executable code on said computer server system which sets variable restrictions on the operation of said server based computer application, wherein said restrictions comprise restrictions selected from the group consisting of:
   (1) whether said server based computer application may be accessed; and
   (2) access restrictions based upon a security level associated with the recipient.

11. The method of claim 10, comprising the additional steps of:
   (a) providing computer software executable code on said computer server system for creating said application hyperlink; and
   (b) transmitting said application hyperlink to said at least one recipient user.

12. The method of claim 10, wherein said server based computer application comprises a first communications program or application.

13. The method of claim 12, comprising providing a second communications program or application hyperlink to said program to at least one additional user which is compatible with or capable of communicating with said first communications program; and further configuring at least one of said first of second communications programs with the communications address of the other communications program.

14. The method of claim 13, wherein said first and second communications program or application comprises programs selected from the group consisting of:
   (a) an email program;
   (b) an instant messaging program;
   (c) a voice over internet protocol program;
   (d) a video conferencing program; and
   (e) an internet relay chat application.

15. The method of claim 10, wherein said server based computer application comprises a computer visual interface desktop work area, and further comprising the steps of:
   (a) operating at least one native software server based application and
   (b) providing access to or links to said one or more native software server based applications within said computer visual interface desktop work area.

16. The method of claim 15, wherein said native software applications comprise applications selected from a group consisting of:
   (a) an email program,
   (b) an instant message program,
   (c) stock quote program,
   (d) news delivery program,
   (e) weather delivery program,
   (f) a group scheduling program,
   (g) a data file storage program; and
   (h) a calendar program.

17. The method of claim 15 used in conjunction with a commercial service, further comprising providing access to said computer visual interface desktop to subscribers of said commercial service,
   whereby said application hyperlink recipient may utilize said visual interface desktop.

18. A method to allow remote users to access computer files with server based applications by activating a hyperlink, the method comprising:
   (a) providing a computer server system connected to a communications network, the server system having access to at least one computer file and to executable code for at least one file compatible server based application which operates natively with a graphical user interface, the at least one application being adapted to open said at least one computer file;
   (b) providing an application file hyperlink that is associated with said at least one computer file;
   (c) providing at least one remote recipient user computing device to at least one hyperlink recipient user;
   (d) providing computer software executable code on said at least one remote recipient user computing device which is connected to said communications network for activating said application file hyperlink over said communications network;
   (e) providing computer software executable code on said computer server system which detects the activation of the hyperlink by said hyperlink recipient user over said communications network;
   (f) providing a thin client application or program on said at least one remote recipient user computer adapted to receive and display said graphical user interface of said file compatible server based computer application in a terminal emulation mode, and accept and transmit inputs of said user back to the server based application;
   (g) providing computer software executable code on said computer server system adapted to select and start said file compatible server based computer application in a user session;
   (h) providing computer software executable code on said computer server system which opens said computer file in said file compatible server based computer application;
   (i) providing computer software executable code on said computer server system for transmitting the graphical user interface of said file compatible server based computer application to the at least one remote recipient user computer in a terminal emulation mode and to receive inputs to said interface from the at least one hyperlink recipient user; and
   (j) providing computer software executable code on said computer server system which restricts said recipient user's access to and manipulation of said at least one computer file, wherein said file access and manipulation restrictions comprise restrictions selected from the group consisting of:
      (1) whether the data file may be accessed;
      (2) a number of times the data file may be accessed;
      (3) a particular time period during which the file may be accessed;
      (4) whether said hyperlink recipient user may print the data file locally;
      (5) whether said hyperlink recipient user may save said first data file locally onto said remote recipient user computing device;
      (6) whether said data file or portions thereof may be copied onto the local computer memory clipboard of the remote recipient user computing device;
      (7) whether, after alteration by said recipient user, said data file or portions thereof may be saved onto said computer server system, whereby the original copy of said data file is replaced by the altered file, and said application file hyperlink is now associated with said altered file, and (8) whether, after alteration by said recipient user, said data file or portions thereof may be saved onto said computer server system, whereby the original copy of said data file is not replaced by the altered file and remains on the storage system of said server system.

19. The method of claim 18, further comprising the step of providing computer software executable code for creating said application file hyperlink and associating the hyperlink with said at least one computer file.

20. The method of claim 19, wherein the graphical user interface of said hyperlink generation computer software executable code comprises a web page form.

21. The method of claim 18, further comprising the step of transmitting said application file hyperlink to said at least one hyperlink recipient user.

22. The method of claim 21, wherein the hyperlink transmission means comprise means selected from the group consisting of:
(a) an email message;
(b) an instant messaging application;
(c) a hyperlink embedded in a web page;
(d) a telephone;
(e) an appropriately formatted document or file; and
(f) a pager.

23. The method of claim 18, wherein said communications network comprises an internet.

24. The method of claim 18, wherein said communications network comprises a local area network.

25. The method of claim 18, wherein said hyperlink comprises a uniform resource locator.

26. The method of claim 18, further comprising:
(a) disassociating said application file hyperlink from said at least one computer file; and
(b) associating said application file hyperlink with at least one different computer file.

27. The method of claim 18, additionally comprising the step of modifying the application interface capability function settings of said file compatible server based computer application.

28. The method of claim 18, wherein the recipient user computer comprises a type selected from the group consisting of:
(a) a personal computer;
(b) a personal digital assistant;
(c) a web or internet appliance device; and
(d) a television set top box.

29. The method of claim 18, wherein said at least one file compatible server based application is comprises a partially disabled file compatible server based application.

30. The method of claim 18, wherein said thin client application comprises a partially disabled thin client application.

31. The method of claim 18, wherein said file access and manipulation restrictions comprise restrictions which are selected based upon variables selected from the group consisting of:
(a) the identity of said hyperlink recipient user;
(b) the network address of said hyperlink recipient user;
(c) whether a qualifying action has been performed by said recipient user; and
(d) whether authentication information has been provided by said hyperlink recipient user.

32. The method of claim 31, wherein said authentication information comprises criteria selected from the group consisting of:

(a) a password;
(b) the network address of said hyperlink recipient user;
(c) a digital signature, and
(d) information provided via the HTTP authentication protocol.

33. The method of claim 31, wherein said qualifying action is comprises accepting an agreement.

34. The method of claim 33, wherein said agreement obligates the recipient user to limit disclosure of the content of said data file.

35. The method of claim 33, wherein said agreement is a license agreement.

36. The method of claim 18, further comprising:
(a) providing executable code on said computer server system for producing a computer visual interface desktop work area,
(b) providing access to or links to said file compatible application on the visual interface desktop,
(c) providing access to or links to zero or more additional applications on the visual interface desktop,
(d) providing access to or links to said at least one computer file or document on the visual interface desktop; and
wherein said thin client means on said at least one remote recipient computer are adapted to receive and display said computer visual interface desktop work area.

37. The method of claim 18, further comprising:
(a) after detecting said hyperlink activation, assigning a guest account to said recipient user; and
(b) creating a copy of said at least one computer file in the guest account; and
(c) opening the file copy in said file compatible server based application instead of the original computer file.

38. The method of claim 37, wherein the guest account is created after detecting said hyperlink activation.

39. The method of claim 37, further comprising the step of terminating the remote application access session, and after said termination either:
(a) deleting said guest account, or
(b) returning said guest account to available status.

40. The method of claim 37, further comprising the step of predefining a plurality of guest accounts, and further wherein one of the predefined guest accounts is assigned to the user after hyperlink activation.

41. The method of claim 18, wherein said at least one computer file comprises a first computer file and at least one additional computer file, and wherein said application file hyperlink is associated with both the first and the additional computer files, and further comprising:
(a) operating on a remote computer at least one application program which is compatible with or capable of opening each of said computer files;
(b) opening each computer file in said application program; and
(c) transmitting the graphical user interface of said at least one application program to said thin client program in a terminal emulation mode.

42. The method of claim 18, further comprising providing means for at least one additional user using at least one additional remote user computing device to view and optionally interact with the interface of said file compatible server based computer application in a terminal emulation mode, whereby the additional user and the first hyperlink recipient user may engage in simultaneous collaboration over said file or document.

43. The method of claim 18, wherein said method is provided by an entity as a service and further comprising the step of providing subscription means associated with said service whereby a remote hyperlink recipient user who is not a subscriber of said entity is solicited to subscribe to said service.

44. The method of claim 18, wherein a log of data about accesses to said computer file is kept on said computer server system.

45. The method of claim 18, further comprising notifying at least one designated user who is not said least one remote recipient user upon the occurrence of a hyperlink access event.

46. The method of claim 45, wherein said notification utilizes transmission means selected from the group consisting of:
   (a) an email application;
   (b) an instant message application;
   (c) a telephone; and
   (d) a pager.

47. The method of claim 45, wherein said notification includes data about said hyperlink access event.

48. The method of claim 47, wherein said data comprises data selected from the group consisting of:
   (a) details about said hyperlink recipient user;
   (b) the time of activation of said application file hyperlink;
   (c) information about said file associated with said application file hyperlink;
   (d) the network location of said hyperlink recipient user;
   (e) information about any changes to said data file.

49. The method of claim 45, wherein said hyperlink access events comprise events that are selected from the group consisting of:
   (a) hyperlink activation;
   (b) file access; and
   (c) file alteration.

50. The method of claim 18, wherein said computer server system comprises a computing machine configuration selected from the group consisting of:
   (a) a single server;
   (b) a personal computer;
   (c) multiple, separate computers operating as a single, logical server.

51. The method of claim 50, wherein one of said multiple, separate computers operating as a single, logical server comprises a computer operating as an application server.

52. The method of claim 50, wherein one of said multiple, separate computers operating as a single, logical server comprise a computer operating as a file server.

53. The method of claim 18, wherein the computer software executable code which detects the execution of the hyperlink by said hyperlink recipient user operates on a computing device physically separate from the remainder of said server system but connected through said communications network.

54. The method of claim 18, further comprising downloading the thin client from the server system to said at least one remote recipient user computing device.

55. The method of claim 54, wherein the step of downloading the thin client occurs only after said at least one remote recipient user computing device is examined and found not to already have the thin client available.

56. The method of claim 18, further comprising the step of determining whether said hyperlink is still active or enabled and wherein the step of opening the computer file occurs only if said hyperlink is active or enabled.

57. The method of claim 18, wherein changes are made to the computer file after the hyperlink is created, and the hyperlink remains associated with the latest version of the computer file.

58. The method of claim 18, further comprising operating the application program on the remote computer after the activation of the hyperlink is detected.

59. The method of claim 18, wherein the selection of said file compatible application is based on criteria comprising data selected from the group consisting of:
   (a) information about optimum applications for viewing of said file;
   (b) information about optimum applications for manipulation of said file;
   (c) said recipient user's legal rights to use available file compatible applications; and
   (d) usage permissions associated with said available file compatible applications.

60. The method of claim 59, wherein the recipient user's legal rights are established by criteria comprising:
   (a) providing valuable consideration from said recipient user in exchange for rights to use said available file compatible application;
   (b) providing information authenticating the recipient user's legal rights to use said available file compatible applications; and
   (c) executing an agreement conferring rights to use said available file compatible application.

61. The method of claim 18, further comprising the steps of:
   (a) providing a user group comprising at least one member user with access to an email account;
   (b) intercepting all incoming emails for said user group prior to delivery to the email accounts of the at least one member user of said user group;
   (c) screening said incoming emails for attached data files,
   (d) removing said attached data files and storing said attached data files on the said computer server system;
   (e) creating an application file hyperlink to said attached data files;
   (f) appending said application file hyperlink to an incoming email to which said attached data file had been attached;
   (g) forwarding said incoming email without the attached file to the intended member user's email account; and
   (h) said member user accessing said attached data file by activating said application file hyperlink.

62. The method of claim 61, further comprising the step of centrally setting parameters of the file access and manipulation restrictions for said user group.

63. The method of claim 18, further including the steps of:
   (a) providing a user group consisting of at least one member user with access to an email account;
   (b) intercepting all outgoing emails for said user group;
   (c) screening said outgoing emails for attached data files;
   (d) removing the attached data file from the outgoing email and storing said attached file on the server;
   (e) creating an application file hyperlink to said attached files;
   (f) appending said hyperlink to said outgoing email;
   (g) forwarding said incoming email without the attached file to its intended recipient's email account; and
   (h) accessing said attached file by activating said application file hyperlink.

64. The method of claim 18, wherein the recipient user's file access and manipulation restrictions are variable.

* * * * *